United States Patent
Anno et al.

(10) Patent No.: US 10,255,534 B2
(45) Date of Patent: Apr. 9, 2019

(54) CONTROL APPARATUS AND STORAGE MEDIUM

(71) Applicant: CANON KABUSHIKI KAISHA, Tokyo (JP)

(72) Inventors: Makoto Anno, Tokyo (JP); Toshihiko Iida, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 2 days.

(21) Appl. No.: 15/782,775

(22) Filed: Oct. 12, 2017

(65) Prior Publication Data

US 2018/0053077 A1  Feb. 22, 2018

Related U.S. Application Data

(63) Continuation of application No. 14/321,122, filed on Jul. 1, 2014, now Pat. No. 9,824,307.

(30) Foreign Application Priority Data

Jul. 3, 2013  (JP) .................................. 2013-139777

(51) Int. Cl.
*G06K 15/00* (2006.01)
*G06K 15/02* (2006.01)
*G06F 3/12* (2006.01)

(52) U.S. Cl.
CPC ......... *G06K 15/4065* (2013.01); *G06F 3/121* (2013.01); *G06F 3/1255* (2013.01); *G06K 15/1823* (2013.01); *G06F 3/1284* (2013.01)

(58) Field of Classification Search
CPC ............ G06K 15/4065; G06K 15/1823; G06F 3/121; G06F 3/1255; G06F 3/1284
See application file for complete search history.

(56) References Cited

U.S. PATENT DOCUMENTS

| 2004/0042811 | A1* | 3/2004 | Wiegand | ................ G03G 15/50 |
| | | | | 399/82 |
| 2010/0046977 | A1* | 2/2010 | Inenaga | ............. H04N 1/00408 |
| | | | | 399/81 |
| 2014/0168671 | A1* | 6/2014 | Kanamoto | ............ G06F 3/1204 |
| | | | | 358/1.9 |

* cited by examiner

*Primary Examiner* — Iriana Cruz
(74) *Attorney, Agent, or Firm* — Canon U.S.A., Inc. IP Division

(57) ABSTRACT

A control apparatus includes a display unit, a storing unit, a determining unit, and a control unit. The display unit displays a job. The storing unit stores attribute information about a sheet to be accommodated in a sheet holding unit. The determining unit determines whether attribute information about a sheet to be used in the job corresponds to attribute information about the sheet stored in the storing unit. The control unit controls the determining unit, wherein, after determination processing by the determining unit has been completed. the control unit controls the determining unit to further perform determination processing in response to a change of the attribute information about the sheet stored in the storing unit, or in response to a change of the attribute information about the sheet to be used in the job.

7 Claims, 36 Drawing Sheets

| SHEET ID | SHEET HOLDING UNIT DETERMINATION METHOD | SIZE DESIGNATION | MEDIA TYPE DESIGNATION | MEDIA MISMATCH PRESENCE |
|---|---|---|---|---|
| SHEET 1 | AUTO | A4 | PLAIN PAPER 1 | MATCH |
| SHEET 2 | AUTO | A4 | COATED PAPER 3 | MISMATCH |
| SHEET 3 | SHEET HOLDING UNIT 5 (MANUAL FEEDING) | A4 | TAB PAPER | |

JOB ID (612) = 00001009

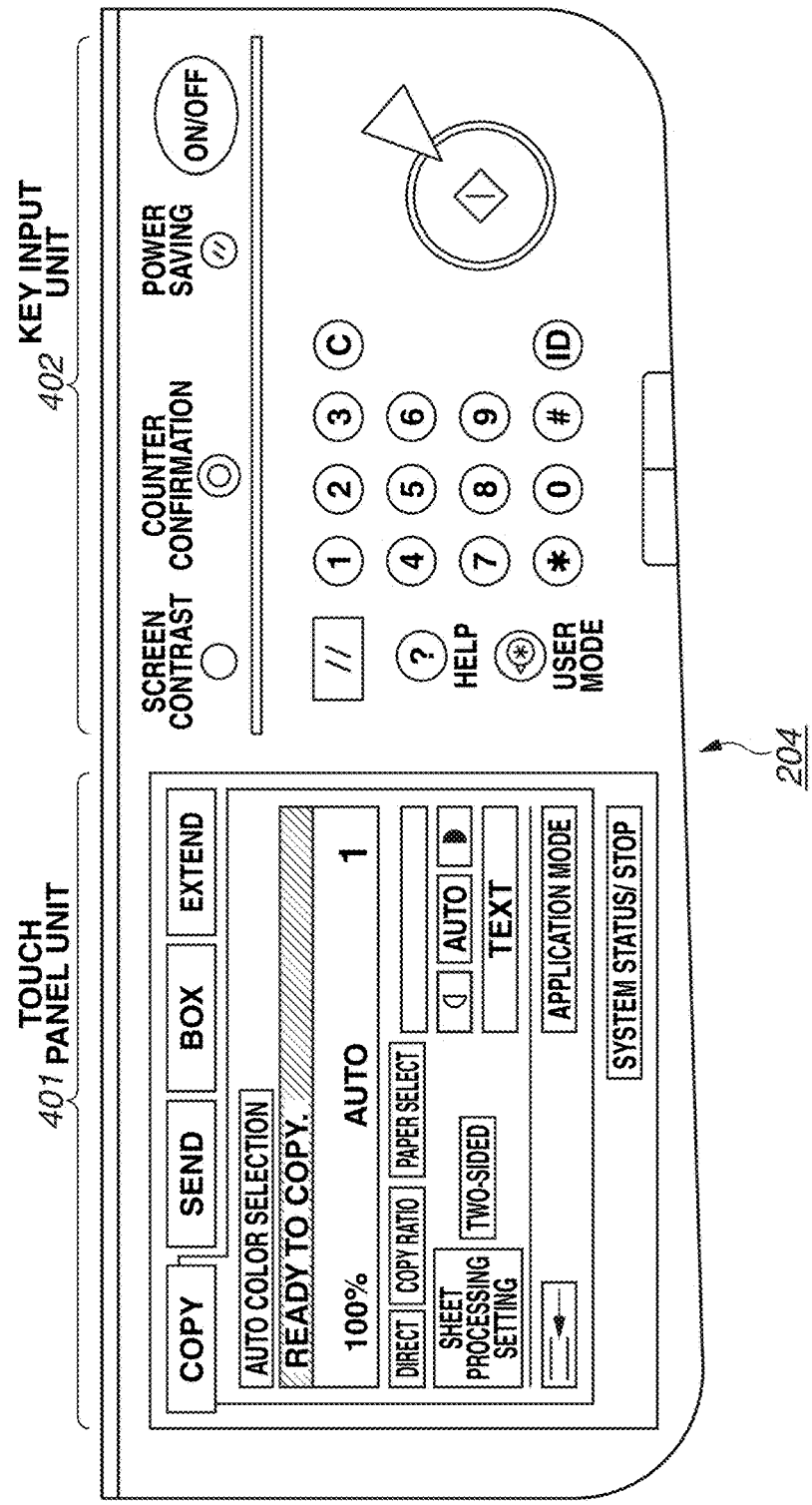

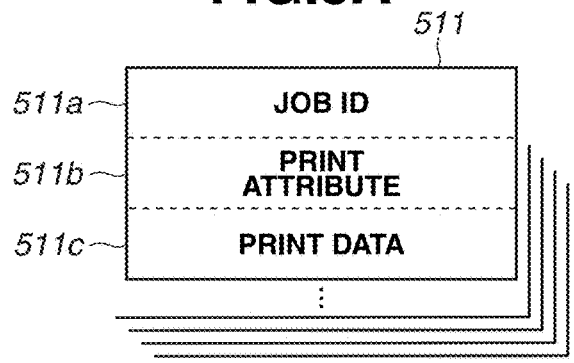
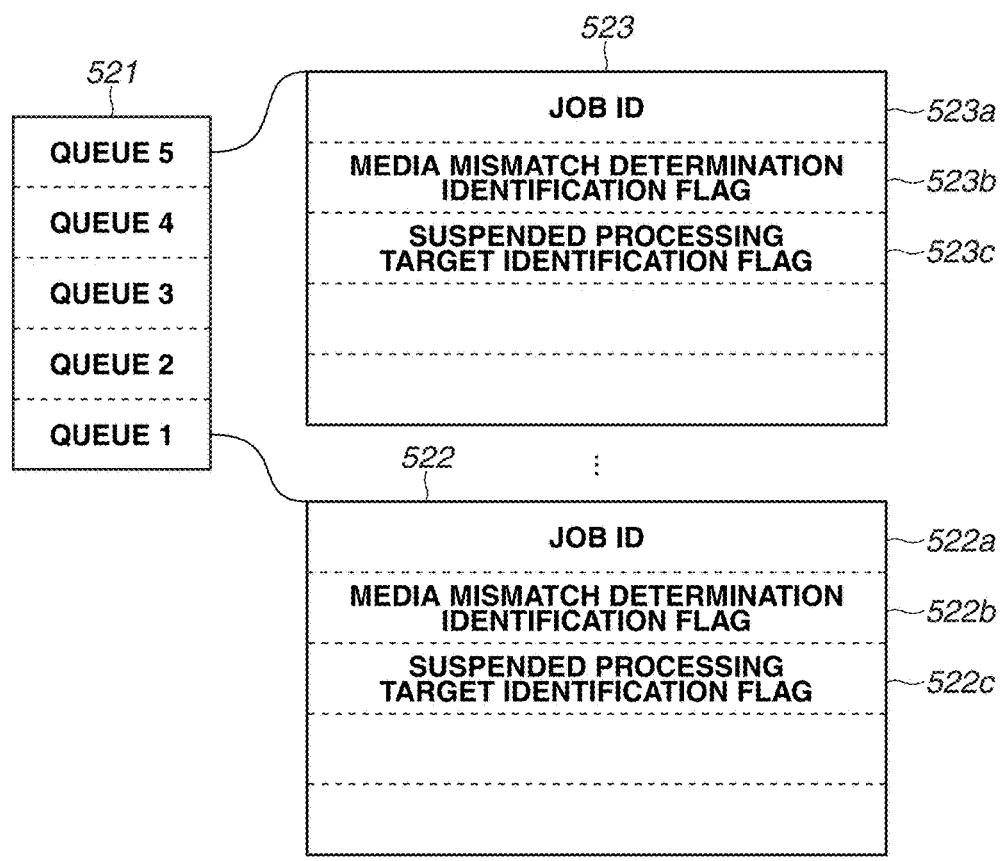

FIG.6A

| JOB ID | MONITORING CONDITION 1 | MONITORING CONDITION 2 | MONITORING CONDITION 3 |
|---|---|---|---|
| 00001001 | SHEET HOLDING UNITS 1 AND 2 | A4-PLAIN PAPER 1, A4-COATED PAPER 1 | |
| 00001005 | SHEET HOLDING UNITS 1 AND 3 | A4-PLAIN PAPER 1, A3-PLAIN PAPER 1 | |
| 00001009 | SHEET HOLDING UNITS 1, 2, AND 5 | A4-PLAIN PAPER 1, A4-COATED PAPER 1, A4-TAB PAPER | |

FIG.6B

JOB ID (612) = 00001009

| SHEET ID | SHEET HOLDING UNIT DETERMINATION METHOD | SIZE DESIGNATION | MEDIA TYPE DESIGNATION | MEDIA MISMATCH PRESENCE |
|---|---|---|---|---|
| SHEET 1 | AUTO | A4 | PLAIN PAPER 1 | MATCH |
| SHEET 2 | AUTO | A4 | COATED PAPER 3 | MISMATCH |
| SHEET 3 | SHEET HOLDING UNIT 5 (MANUAL FEEDING) | A4 | TAB PAPER | |

FIG.6C

| SHEET HOLDING UNIT ID | SIZE | MEDIA TYPE | REMAINING AMOUNT |
|---|---|---|---|
| 1 | A4 | PLAIN PAPER 1 | |
| 2 | A4 | COATED PAPER 1 | |
| 3 | A3 | PLAIN PAPER 1 | |
| 4 | A3 | PLAIN PAPER 1 | |
| 5 | A4 | TAB PAPER | |

FIG.15

HOLD — 1501

■ HOLD JOB LIST

| | JOB NAME (1511) | USER NAME | DATE/TIME (1512) |
|---|---|---|---|
| ✓ | Job A | Operator A | 01/26 16:29 PM |
| | Job B | Operator C | 01/10 17:01 PM |
| | Job C | Operator B | 01/28 11:13 AM |
| | Job D | Operator A | 01/27 14:58 PM |
| | Job E | Operator A | 12/19 09:41 AM |
| | Job F | Operator B | 01/30 09:09 AM |

1510, 1502

- 1504: ☐ DISPLAY SELECTED USER ONLY
- 1507: DETAILS/CHANGE ▸
- 1505: ☐ SELECT ALL (UP TO 100)
- ☐ DELETE AFTER PRINT
- 1508: PRINT START
- 1506

■ PRINT JOB LIST

| TIME | JOB NAME | STATUS | WAITING TIME (APPROX.) |
|---|---|---|---|

1503

- DETAILS/CHANGE ▸
- 1509: STOP
- LOG-OUT

THIS IS IN SYSTEM MANAGEMENT MODE

FIG.16

| SHEET HOLDING UNIT ID | SIZE | MEDIA TYPE | REMAINING AMOUNT |
|---|---|---|---|
| 1 | A4 | PLAIN PAPER 1 | 3 |
| 2 | A4 | COLORED PAPER (RED) | 1 |
| 3 | A3 | PLAIN PAPER 1 | 2 |
| 4 | B4 | PLAIN PAPER 1 | 0 |
| 5 | B5 | PLAIN PAPER 1 | 3 |
| 6 | A4 | INDEX PAPER | 3 |
| 7 | LTR | PLAIN PAPER 1 | 1 |
| 8 | A4 | TWO-SIDED COATED PAPER 1 | 1 |
| 9 | 11×17 | PLAIN PAPER 1 | 0 |
| 10 | A3 | THICK PAPER 2 | 0 |

FIG.17A

Job A

| | SIZE | MEDIA TYPE |
|---|---|---|
| 1701 | SIZE | MEDIA TYPE |
| 1704 | A4 | PLAIN PAPER 1 |
| 1705 | A4 | TWO-SIDED COATED PAPER 1 |

FIG.17B

Job D

| | SIZE | MEDIA TYPE |
|---|---|---|
| 1702 | SIZE | MEDIA TYPE |
| 1706 | LTR | PLAIN PAPER 1 |
| 1707 | 11×17 | PLAIN PAPER 1 |

FIG.17C

Job E

| | SIZE | MEDIA TYPE |
|---|---|---|
| 1703 | SIZE | MEDIA TYPE |
| 1708 | A4 | PLAIN PAPER 1 |
| 1709 | A4 | COLORED PAPER (RED) |
| 1710 | A3 | TWO-SIDED COATED PAPER 2 |

FIG.18

HOLD — 1501

■ HOLD JOB LIST

| | JOB NAME | USER NAME | DATE/TIME | |
|---|---|---|---|---|
| ✓ 1 | Job A | Operator A | 01/26 16:29 PM | |
| | Job B | Operator C | 01/10 17:01 PM | |
| | Job C | Operator B | 01/28 11:13 AM | |
| 2 | Job D | Operator A | 01/27 14:58 PM | 🗑 |
| 3 | Job E | Operator A | 12/19 09:41 AM | ❗ |
| | Job F | Operator B | 01/30 09:09 AM | |

1801, 1502, 1802, 1803, 1804, 1805, 1806

- DISPLAY SELECTED USER ONLY
- DETAILS/CHANGE — 1507
- SELECT ALL (UP TO 100)
- DELETE AFTER PRINT
- PRINT START — 1508

■ PRINT JOB LIST — 1503

| TIME | JOB NAME | STATUS | WAITING TIME (APPROX.) |
|---|---|---|---|

- DETAILS/CHANGE — 1509
- STOP
- LOG-OUT

1504

THIS IS IN SYSTEM MANAGEMENT MODE

FIG.20

| JOB ID | MONITORING CONDITION 1 | MONITORING CONDITION 2 | MONITORING CONDITION 3 |
|---|---|---|---|
| 00001009 | AUTO | A4-COATED SHEET 3 | SHEET 2 |
|  |  |  |  |
|  |  |  |  |

FIG.23
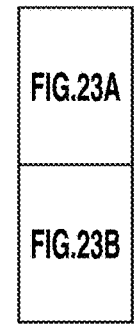
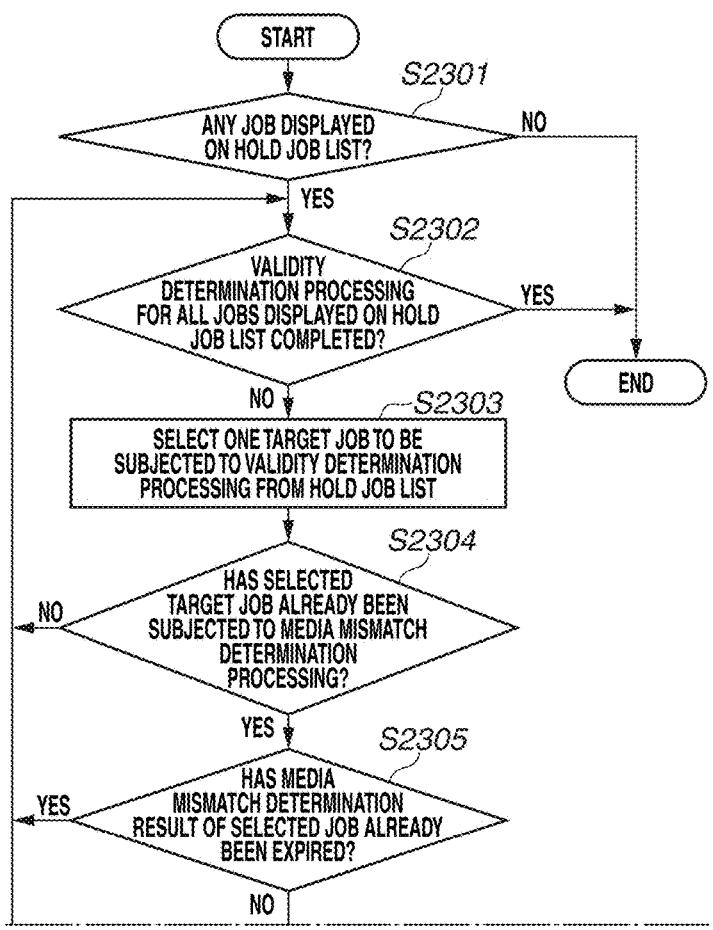
FIG.23A

FIG.25

HOLD — 1501

■ HOLD JOB LIST

| JOB NAME | USER NAME | DATE/TIME |
|---|---|---|
| Job A | Operator A | 01/26 16:29 PM |
| Job B | Operator C | 01/10 17:01 PM |
| Job C | Operator B | 01/28 11:13 AM |
| Job D | Operator A | 01/27 14:58 PM |
| Job E | Operator A | 12/19 09:41 AM |
| Job F | Operator B | 01/30 09:09 AM |

- DISPLAY SELECTED USER ONLY — 1507
- DETAILS/CHANGE
- SELECT ALL (UP TO 100) — 2503
- DELETE AFTER PRINT
- SETTING CHANGE — 1508
- PRINT START — 1505

■ PRINT JOB LIST — 1503

| TIME | JOB NAME | STATUS | WAITING TIME (APPROX.) |
|---|---|---|---|

- DETAILS/CHANGE
- STOP — 1509
- LOG-OUT

THIS IS IN SYSTEM MANAGEMENT MODE

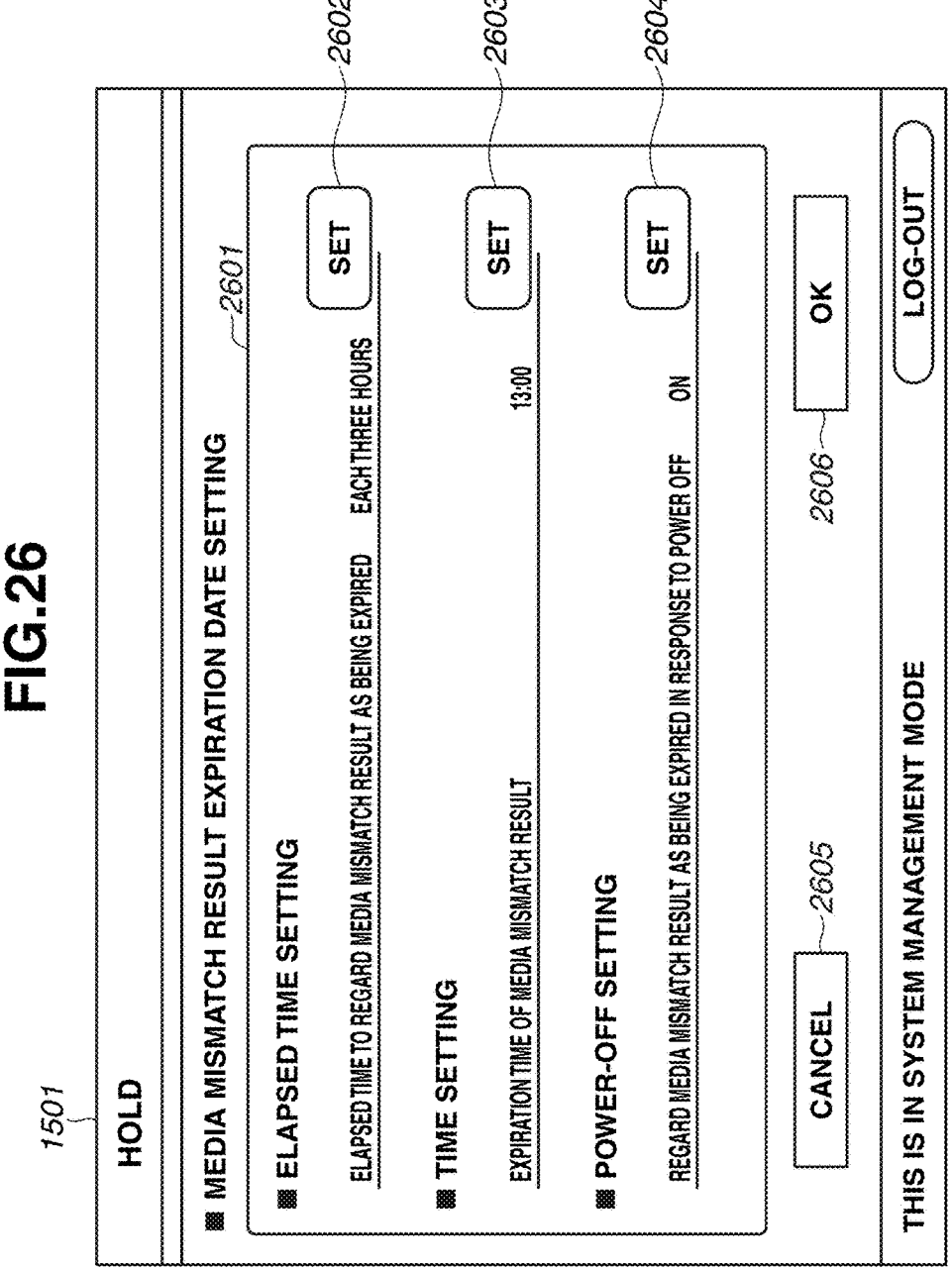

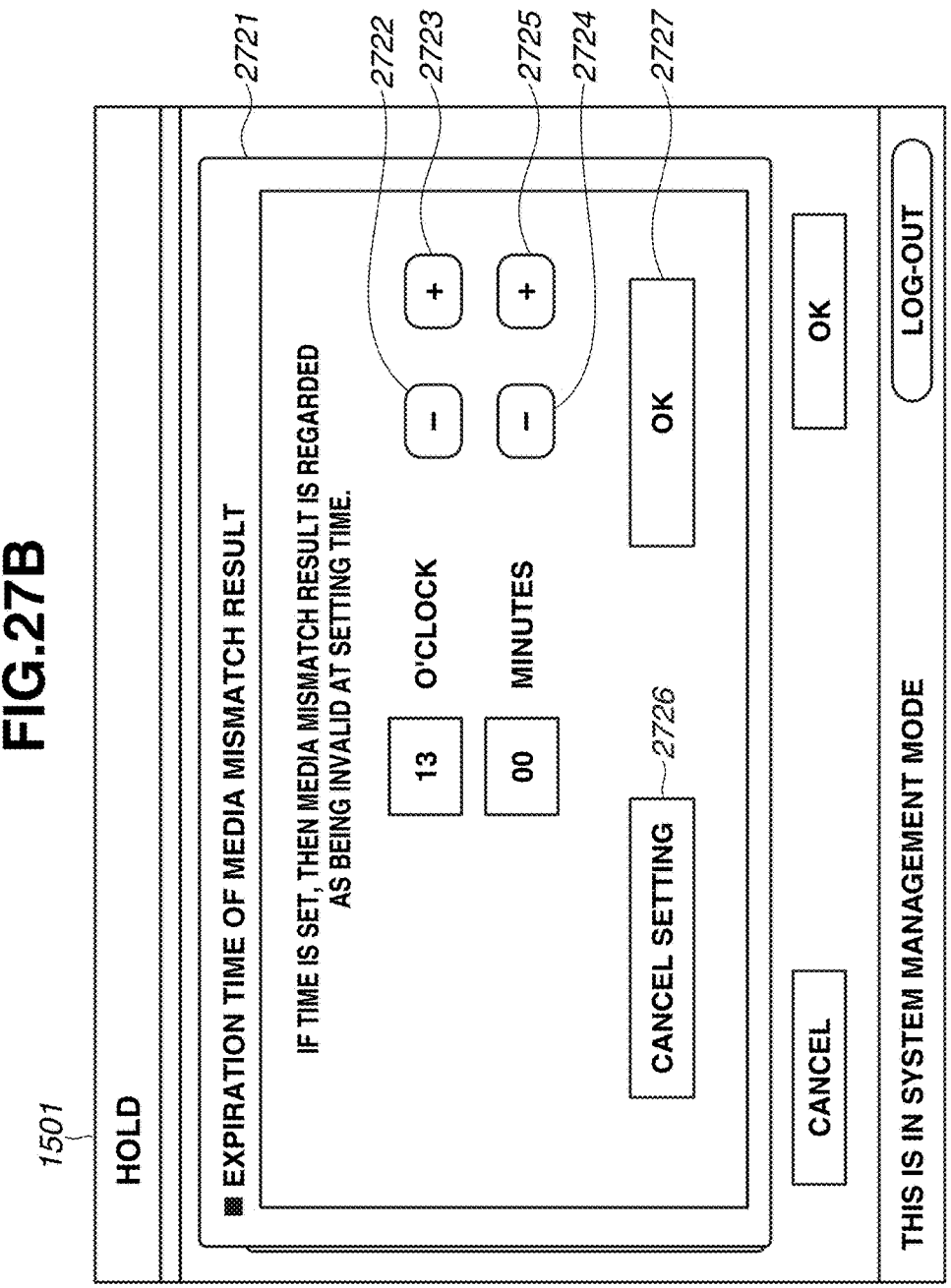

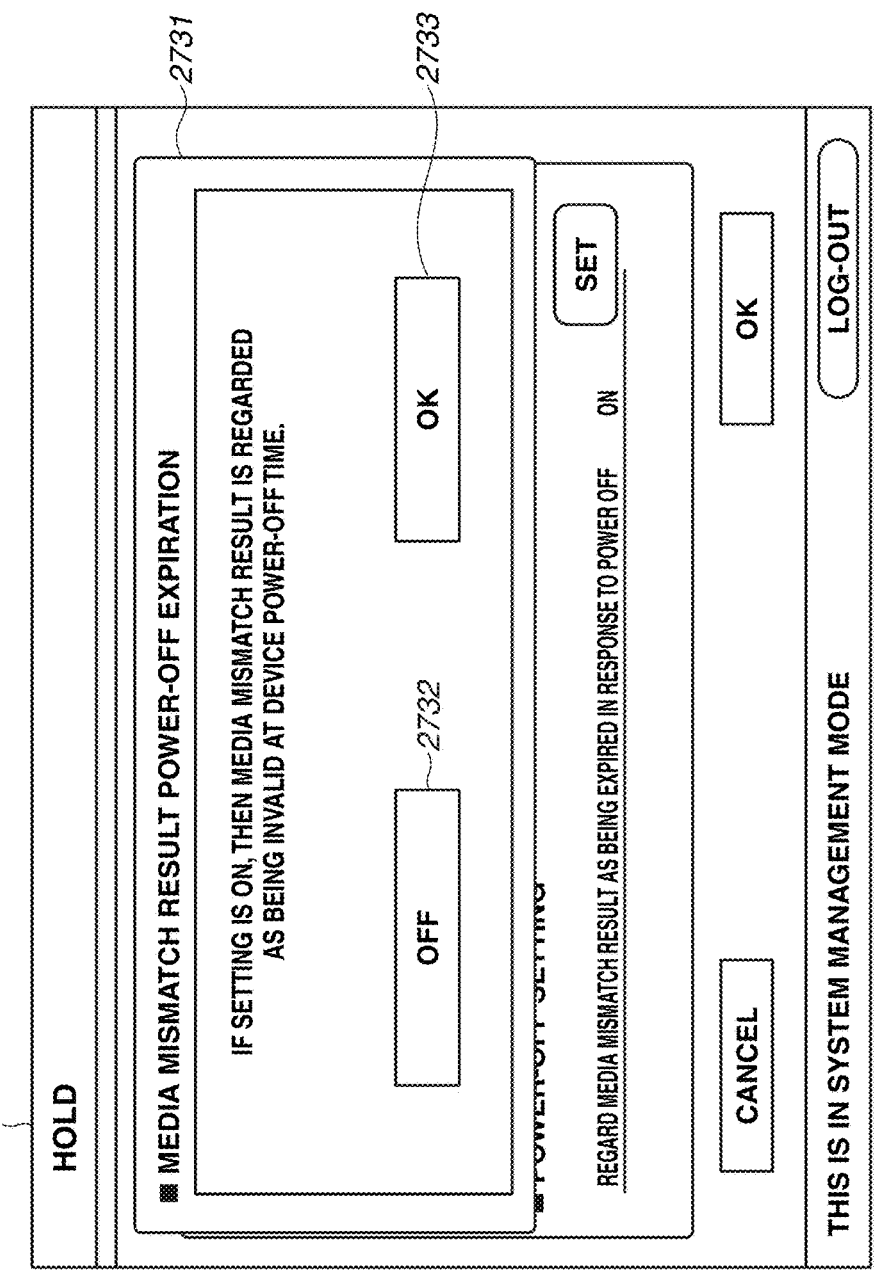

FIG.28

| HOLD | | | | | | 1501 |
|---|---|---|---|---|---|---|
| | | | | | 2801 | |
| ■ HOLD JOB LIST | | 1511 1512 1806 2501 1504 | | | ☐ DISPLAY SELECTED USER ONLY | |
| | JOB NAME | USER NAME | DATE/TIME | | DETAILS/CHANGE ▲ | 1507 |
| 1▼ | Job A | Operator A | 01/26 16:29 PM | 🔄 | ☐ SELECT ALL (UP TO 100) | |
| | Job B | Operator C | 01/10 17:01 PM | RECHECK | ☐ DELETE AFTER PRINT | |
| 2▼ | Job C | Operator B | 01/28 11:13 AM | 1805 | SETTING CHANGE | 2503 |
| 3▼ | Job D | Operator A | 01/27 14:58 PM | ▲ | PRINT START | 1508 |
| | Job E | Operator A | 12/19 09:41 AM | ▼ 1505 | | |
| | Job F | Operator B | 01/30 09:09 AM | 2502 | | |

1510 1502

■ PRINT JOB LIST

| TIME | JOB NAME | STATUS | WAITING TIME (APPROX.) | | DETAILS/CHANGE ▲ | 1509 |
|---|---|---|---|---|---|---|
| | | | | ▲ | STOP | |
| | | | | ▼ 1506 | | |

1503

THIS IS IN SYSTEM MANAGEMENT MODE     LOG-OUT

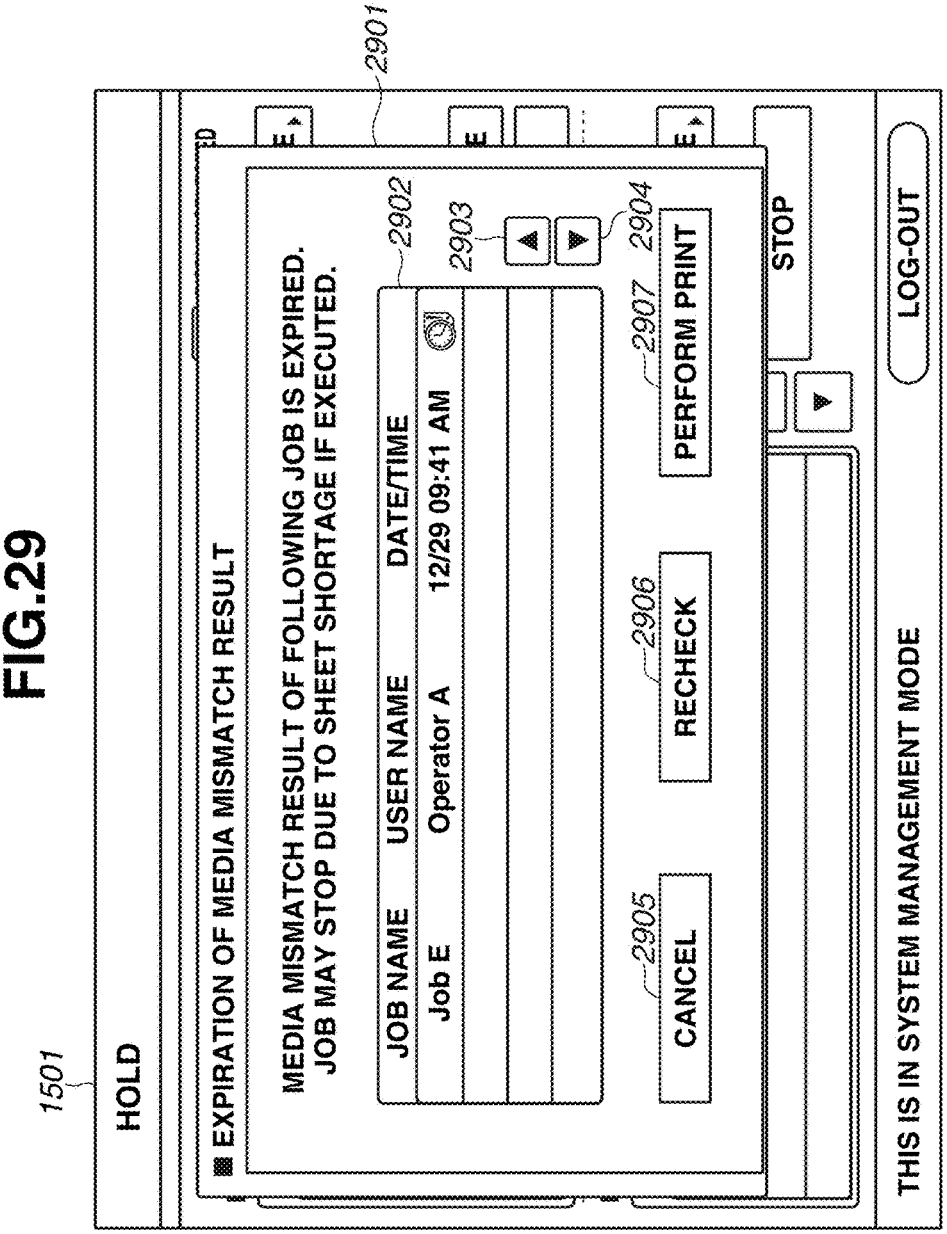

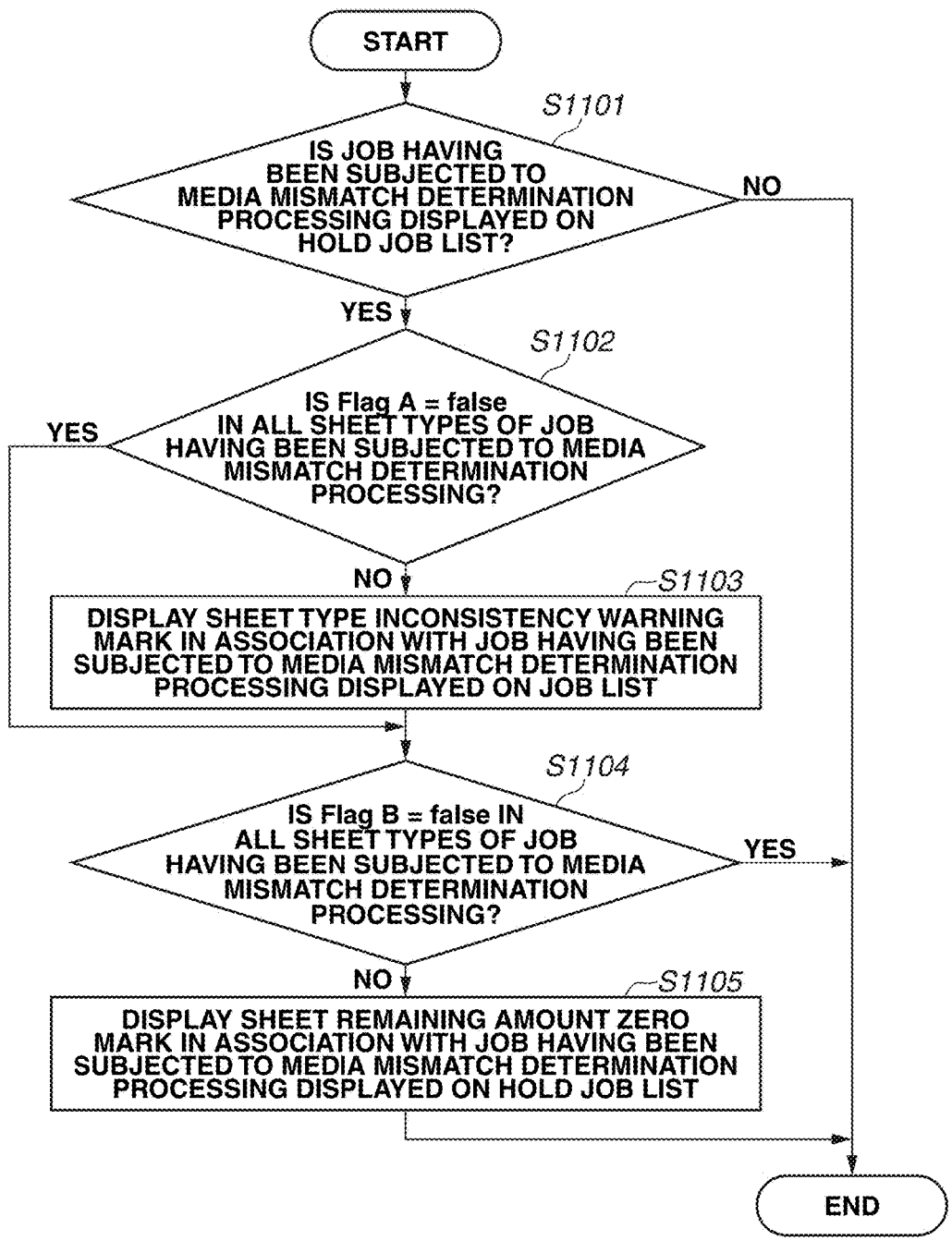

FIG.31

HOLD — 1501

■ HOLD JOB LIST

| | JOB NAME | USER NAME | DATE/TIME | |
|---|---|---|---|---|
| ✓ 1 | Job A | Operator A | 07/18 09:00 AM | |
| | Job B | Operator C | 07/18 09:12 AM | |
| | Job C | Operator B | 07/18 09:41 AM | |
| 2 | Job D | Operator A | 07/18 10:15 AM | 🗑 — 1806 |
| 3 | Job E | Operator A | 07/18 10:29 AM | |
| | Job F | Operator B | 07/18 10:55 AM | |

1504, 1805

☐ DISPLAY SELECTED USER ONLY — 1507

DETAILS/CHANGE ▸

SELECT ALL (UP TO 100)

DELETE AFTER PRINT

PRINT START

■ PRINT JOB LIST

| TIME | JOB NAME | STATUS | WAITING TIME (APPROX.) |
|---|---|---|---|

DETAILS/CHANGE ▸

STOP

THIS IS IN SYSTEM MANAGEMENT MODE

LOG-OUT

FIG.32

CONTROL APPARATUS AND STORAGE MEDIUM

CROSS-REFERENCE TO RELATED APPLICATION

This application is a continuation, and claims the benefit of U.S. patent application Ser. No. 14/321,122 filed Jul. 1, 2014, which claims the benefit of Japanese Patent Application No. 2013-139777 filed Jul. 3, 2013. Each of U.S. patent application Ser. No. 14/321,122 and Japanese Patent Application No. 2013-139777 is hereby incorporated by reference herein in its entirety.

BACKGROUND OF THE INVENTION

Field of the Invention

The present invention relates to a control apparatus that can store a job and execute the stored job, and also relates to a storage medium.

Description of the Related Art

As discussed in Japanese Patent Application Laid-Open No. 2010-284919, it is conventionally known to display a notification on an operation screen of a printing apparatus to notify a user of a situation that attribute information (e.g., sheet size) of sheets to be used in a job is not registered to any one of a plurality of sheet holding units provided in the printing apparatus.

Further, as discussed in Japanese Patent Application Laid-Open No. 2010-49167, it is conventionally known to display a job status list on the screen to notify a user of a situation that the size of a sheet to be used in a job is not registered to any one of sheet holding units or a situation that the remaining amount of sheets to be used in a job is zero.

However, if a significant time elapses after the confirmation about whether the size of the sheet to be used in the job is registered to any one of the sheet holding units, another user may change the registered information about the sheet holding unit or the settings of the job. Therefore, the sheet to be used in the job may not be present in the sheet holding unit.

SUMMARY OF THE INVENTION

According to an aspect of the present invention, a control apparatus includes a display unit configured to display a job, a storing unit configured to store attribute information about a sheet to be accommodated in a sheet holding unit, a determining unit configured to determine whether attribute information about a sheet to be used in the job corresponds to attribute information about the sheet stored in the storing unit, and a control unit configured to control the determining unit, wherein, after determination processing by the determining unit has been completed. The control unit controls the determining unit to further perform determination processing in response to a change of the attribute information about the sheet stored in the storing unit, or in response to a change of the attribute information about the sheet to be used in the job.

In an example, there is provided a control apparatus, in which after it is determined whether attribute information about a sheet to be used in a job is registered to any one of sheet holding units, it is further determined whether the attribute information about the sheet to be used in the job is registered to any one of the sheet holding units in response to a change of information registered to the sheet holding unit or in response to a change of job settings. Further features of the present invention will become apparent from the following description of exemplary embodiments with reference to the attached drawings.

BRIEF DESCRIPTION OF THE DRAWINGS

FIG. 4 is a plan view illustrating an operation unit of the digital printing machine according to the first exemplary embodiment.

FIGS. 5A, 5B, and 5C illustrate contents of data relating to an entry, a print queue buffer, and a hold queue buffer according to the first exemplary embodiment.

FIGS. 6A, 6B, and 6C are examples of a monitoring job attribute table, a job attribute details table, and a sheet management table in the digital printing machine according to the first exemplary embodiment.

FIG. 15 illustrates an example of a job hold function operation screen, which can be displayed on the operation unit of the digital printing machine according to the first exemplary embodiment.

FIG. 16 illustrates an example of a sheet management table that is usable to manage information about sheets stored in each sheet holding unit of the digital printing machine according to the first exemplary embodiment.

FIGS. 17A, 17B, and 17C illustrate information about sheets to be used in each of Job A, Job D, and Job E illustrated in FIG. 15.

FIG. 18 illustrates an example of the job hold function operation screen, which can be displayed on the operation unit of the digital printing machine according to the first exemplary embodiment.

FIG. 20 illustrates an example of the monitoring job attribute table, which can be displayed on the operation unit of a digital printing machine according to a second exemplary embodiment.

FIG. 25 illustrates an example of the job hold function operation screen, which can be displayed on the operation unit of the digital printing machine according to the third exemplary embodiment.

FIG. 26 illustrates an example of media mismatch determination result expiration date setting screen, which can be displayed on the operation unit of the digital printing machine according to the third exemplary embodiment.

FIGS. 27A, 27B, and 27C illustrate examples of a media mismatch determination result validity period elapsed time setting screen, an expiration date and time setting screen, and an expiration date power-off setting screen, which can be displayed on the operation unit of the digital printing machine according to the third exemplary embodiment.

FIG. 28 illustrates an example of the job hold function operation screen, which can be displayed on the operation unit of a digital printing machine according to a fourth exemplary embodiment.

FIG. 29 illustrates an example of a media mismatch determination result expiration warning screen, which can be displayed on the operation unit of the digital printing machine according to the fourth exemplary embodiment.

FIG. 30 is a flowchart illustrating media mismatch determination result notification processing (see step S1100), which can be performed by a digital printing machine according to a fifth exemplary embodiment.

FIG. 31 illustrates an example of the job hold function operation screen, which can be displayed on the operation unit of the digital printing machine according to the fifth exemplary embodiment.

FIG. 32 illustrates an example of the job hold function operation screen, which can be displayed on the operation unit of a digital printing machine according to a sixth exemplary embodiment.

DESCRIPTION OF THE EMBODIMENTS

Figure 1:
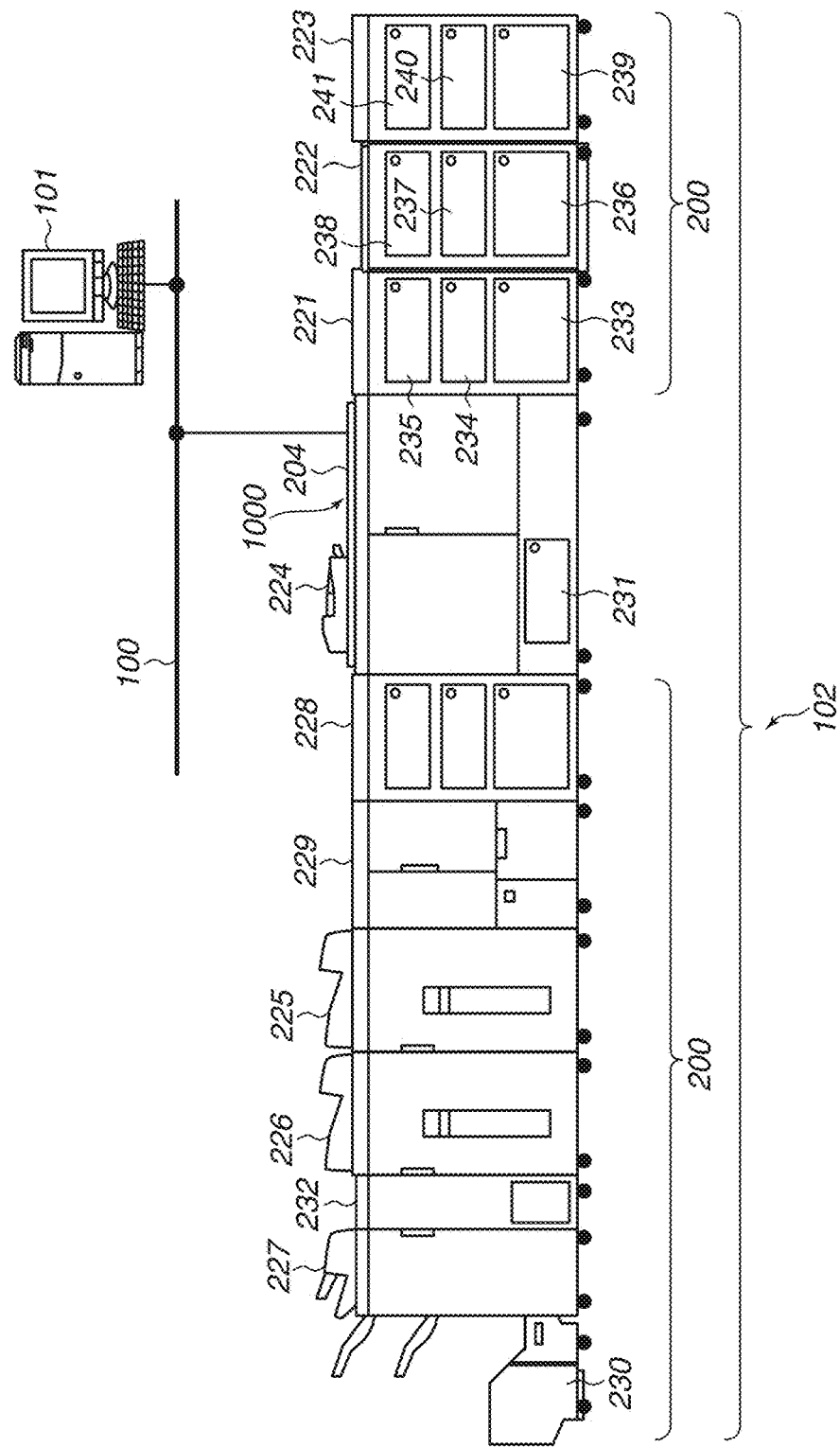
FIG. 1 illustrates a digital printing system according to a first exemplary embodiment of the present invention.

Various exemplary embodiments, features, and aspects of the invention will be described in detail below with reference to the drawings. The description of the following exemplary embodiments does not intend to limit the present invention. It should be noted that the present invention does not always require all combinations of characteristic features described in the present exemplary embodiments as essential features.

A digital printing system according to a first exemplary embodiment of the present invention is described in detail below with reference to FIG. 1. The printing system includes a digital printing machine (i.e., a printing apparatus) 102 and a computer 101, which are connected to each other via a network 100.

The digital printing machine 102 includes a plurality of apparatuses having different roles, which are mutually connected and constituted in such a way as to perform complicated sheet processing.

The digital printing machine 102 can be roughly divided into three sections, one of which is a printer unit 1000. As illustrated in FIG. 1, there is a plurality of sheet holding apparatuses disposed on the right side of the printer unit 1000. The main role of each sheet holding apparatus is successively supplying sheets stored therein to the printer unit 1000 at appropriate timing. Further, each sheet holding apparatus is equipped with a sensor (not illustrated) that can detect the remaining amount of sheets stored therein. The printer unit 1000 includes a sheet holding unit 231, which is functionally operable as a built-in sheet holding apparatus. In the following description, the sheet holding unit of the printer unit 1000 is referred to as one of the sheet holding apparatus. Each constituent component of the digital printing machine 102 is described in detail below.

The printer unit 1000 can form (or print) a toner image on a recording medium (e.g., a sheet), which can be supplied from the sheet holding unit, based on image data. The printer unit 1000 has the following configuration and can operate in the following manner.

The printer unit 1000 irradiates a photosensitive drum with scanning light, such as a laser beam, which has been modulated based on the image data and reflected by a rotary polygon mirror. The printer unit 1000 develops an electrostatic latent image with toner particles after the latent image is formed on the photosensitive drum, and transfers a developed toner image onto a sheet pressed against a transfer drum. The printer unit 1000 sequentially performs the above-mentioned sequential image forming processes using yellow (Y), magenta (M), cyan (C), and black (K) toners to form a full-color image on the sheet. Further, the toner colors to be used by the printer unit 1000 are not limited to the above-mentioned four colors. For example, the toner colors that the printer unit 1000 can use include special colors (or spot colors) in addition to the above-mentioned four colors. Further, the printer unit 1000 can be configured to transfer transparent toners. The printer unit 1000 conveys the printed sheet, after the above-mentioned full-color image has been formed thereon, from the transfer drum to a fixing device. The fixing device includes rollers and belts. The fixing device includes a heat source (e.g., a halogen heater) incorporated in the roller and can apply heat and pressure to melt and fix the image on the sheet after the image has been transferred on the sheet.

The printer unit 1000 of the digital printing machine 102 according to the first exemplary embodiment includes a scanner 224 and an operation unit 204 (see FIG. 4) that are disposed on an upper surface of the printer unit 1000. The operation unit 204 is not illustrated in FIG. 1 because the operation unit 204 is disposed on the upper surface of the printer unit 1000. The operation unit 204 provides various interfaces that enable a user to perform various settings and operations for the printer unit 1000 according to the first exemplary embodiment. The printer unit 1000 further includes a document feeder (not illustrated) that is provided on a main body thereof together with the scanner 224.

Further, the digital printing machine 102 is configured to be flexibly modified by providing various optional apparatuses in addition to the printer unit 1000.

Each of mass-storage sheet holding apparatuses 221, 222, and 223 is an example of the sheet holding apparatus that is attachable to and detachable from the printer unit 1000. These sheet holding apparatuses include a plurality of sheet holding units 233 to 241. Each of a plurality of sheet holding units 233 to 241 is equipped with a sensor that can detect the remaining amount of sheets stored therein. The printer unit 1000 having the above-mentioned configuration can perform print processing on massively stored sheets. Although the printing system illustrated in FIG. 1 includes only three mass-storage sheet holding apparatuses 221, 222, and 223 that are connected thereto, the number of the sheet holding apparatuses is not limited to the illustrated example.

Each of mass-storage stackers 225 and 226 is an apparatus that can stock printed sheets. The system including the above-mentioned mass-storage sheet holding apparatuses generates massive print products. This is the reason why the system requires the above-mentioned mass-storage stackers. However, the number of the mass-storage stackers and the number of the mass-storage sheet holding apparatuses are not limited to the configuration illustrated in FIG. 1. Although the printing system illustrated in FIG. 1 includes only two mass-storage stackers 225 and 226 that are connected thereto, the number of the stackers is not limited to the illustrated example.

Each of the mass-storage stackers 225 and 226 includes a door that can be opened to take a stacked sheet out of an internal stacking tray in response to a user's instruction operation. Further, the door of each mass-storage stacker can be automatically opened in response to an instruction from the printer unit 1000. When the printing system performs the above-mentioned door opening processing, the processing to stack printed sheets to respective mass-storage stackers 225 and 226 is stopped beforehand.

Further, when respective mass-storage stackers 225 and 226 stack printed sheets, the mass-storage stackers 225 and 226 are capable of shifting the stacking position of an arbitrary sheet. This function is referred to as a shift paper output function. A predetermined amount of massively stacked sheets can be sorted to form a single bundle.

A folding apparatus 232 is an apparatus that can perform various folding processing (e.g., center folding, Z folding, three-part folding, and four-part folding) on each sheet.

A saddle stitch bookbinding machine 227 includes various units that can perform staple processing, saddle stitch or saddle holding processing (required to output bookbinding products), punch processing, and shift paper output processing, on sheets printed by the printer unit 1000. When the saddle stitch bookbinding machine 227 generates a saddle stitch binding output product, the digital printing machine 102 described in the first exemplary embodiment forms the output product by combining a saddle holding function and a saddle stitch function of the saddle stitch bookbinding machine 227, without using a folding function of the folding apparatus 232.

A sheet cutting apparatus 230 is an apparatus that can convey a bookbinding output product, after the output product is stitched by the saddle stitch bookbinding machine 227, and can cut a predetermined edge region corresponding to the front edge portion to finish the front edge to have a flat surface.

An inserter 228 can hold an arbitrary sheet and insert the held sheet into a plurality of sheets supplied from the printer unit 1000 at appropriate timing, based on settings. For example, the inserter 228 can insert a sheet that does not require any printing into printed sheets. The inserter 228 includes a plurality of mass-storage sheet holding portions, which are similar to the mass-storage sheet holding apparatuses 221, 222, and 223, so that the digital printing machine 102 can realize mass-storage print processing.

A case bookbinding machine 229 is an apparatus that can perform front page pasting processing on a sheet bundle printed by the printer unit 1000 or output from the inserter 228 to form a case bookbinding output product. Further, the case bookbinding machine 229 can perform top paste bookbinding processing, which corresponds to working processing to perform pasting and bookbinding without using a front page.

The folding apparatus 232, the saddle stitch bookbinding machine 227, the sheet cutting apparatus 230, and the inserter 228 can be configured to be incorporated in or independent of the digital printing machine 102.

On the other hand, in FIG. 1, the mass-storage stackers 225 and 226 (i.e., the devices that stack sheets) and other devices disposed on the left side of the printer unit 1000 are referred to as sheet processing apparatuses. The sheet working apparatus may also be referred to as a sheet processing apparatus or a post-processing apparatuses. The sheet working apparatus can also apply various working processing to sheets that have been subjected to the print processing. The above-mentioned sheet holding apparatuses and the sheet working apparatuses are collectively referred to as a sheet processing apparatus 200.

Figure 2:
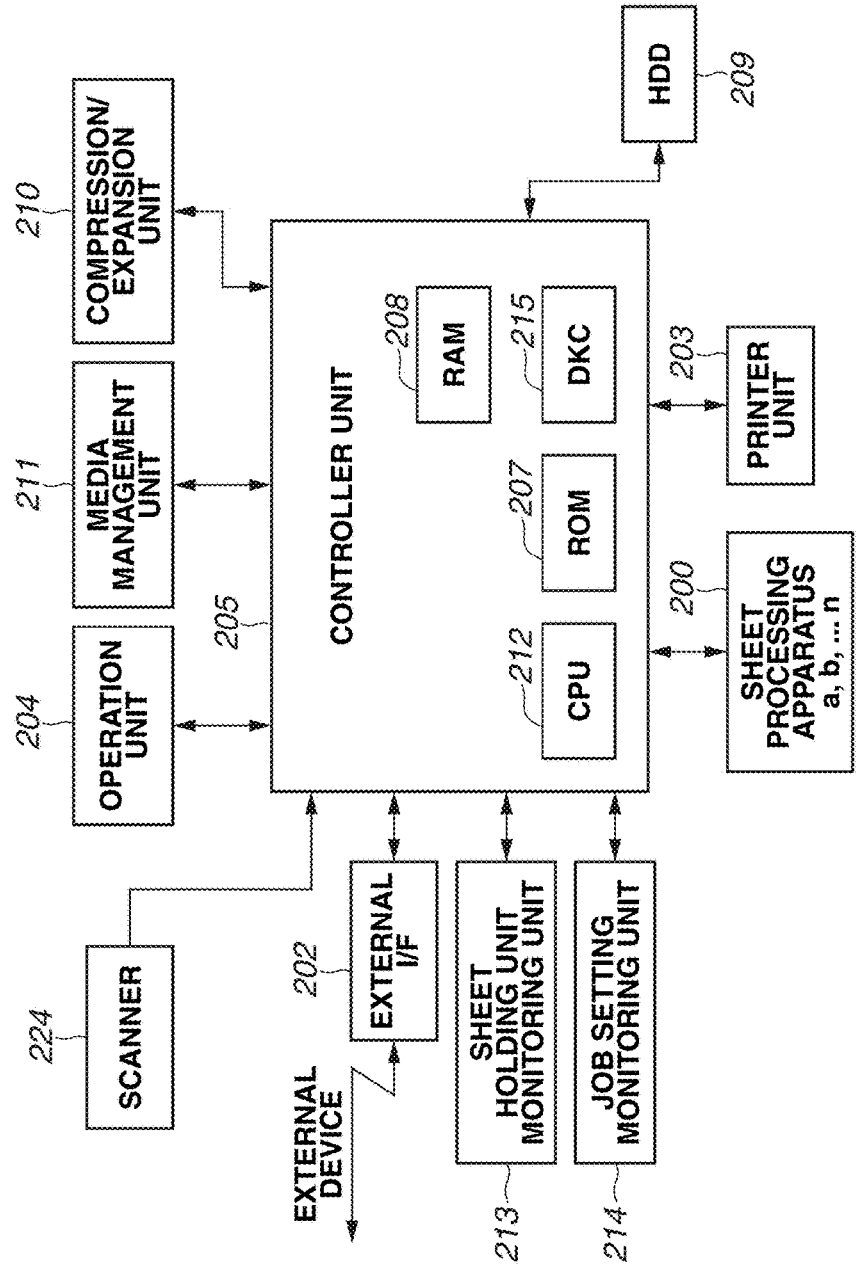
FIG. 2 is a functional block diagram illustrating a functional configuration of a digital printing machine according to the first exemplary embodiment.

Next, a configuration of the digital printing machine 102 according to the first exemplary embodiment is described in detail below with reference to a functional block diagram illustrated in FIG. 2. The configuration illustrated in FIG. 2 can be applied to the sheet processing apparatus, such as the above-mentioned various sheet holding apparatuses and the sheet processing apparatuses.

The digital printing machine 102 includes a built-in nonvolatile memory, such as a hard disk drive 209 (hereinafter, referred to as "HDD"), which can store a plurality of jobs (i.e., processing targets). However, the built-in memory of the digital printing machine 102, which has been employed in the first exemplary embodiment, is not limited to the hard disk drive. For example, the hard disk drive can be replaced by a similar mass-storage and nonvolatile storage apparatus.

Further, the digital printing machine 102 can receive data from the scanner 224 and store the received data in the HDD 209. Then, the digital printing machine 102 can cause a printer unit 203 to perform printing based on the data read from the HDD 209. The function of the digital printing machine 102 in this case is referred to as a copy function. Further, the digital printing machine 102 can receive a job from an external apparatus via an external I/F 202 (i.e., an example of a communication unit) and store the received job in the HDD 209. Then, the digital printing machine 102 can cause the printer unit 203 to perform printing based on the data read from the HDD 209. The function of the digital printing machine 102 in this case is referred to as a printing machine function. The digital printing machine 102 is a multi-function processing apparatus (MFP) having the above-mentioned plurality of functions, which may be referred to as an image forming apparatus. The digital printing machine 102 can perform color print processing or can perform monochrome print processing.

The scanner 224 can read an image of a document to be processed and perform image processing on the read image data to output a processed image. The external I/F 202 can transmit and receive image data to and from a facsimile machine, a network connection device, or an external dedicated device. Further, the HDD 209 stores various kinds of management information, which the digital printing machine 102 can permanently store, change, and manage. Further, the digital printing machine 102 includes the printer unit 203 that performs print processing for a print target job stored in the HDD 209. The operation unit 204 of the digital printing machine 102 includes a display section, which corresponds to an example of a user interface unit. A controller unit (i.e., a control unit) 205 of the digital printing machine 102 includes a CPU 212, which can integrally control processing and operations to be performed by various units provided in the digital printing machine 102. Further, the controller unit (i.e. the control unit) 205 includes a read only memory (ROM) 207 and a random access memory (RAM) 208. The ROM 207 and the RAM 208 store various control programs, which can be executed by the CPU 212 to execute various processing of flowcharts described in detail below. Further, the ROM 207 stores a display control program, which can be executed by the CPU 212 to display various UI screens on the display section of the operation unit 204.

The CPU 212 of the controller unit 205 reads and executes programs from the ROM 207 to cause the digital printing machine 102 to perform various operations according to the first exemplary embodiment. Further, the CPU 212 interprets page description language (hereinafter, referred to as "PDL") data when the PDL data is received from an external apparatus via the external I/F 202. The CPU 212 performs an operation to develop the PDL data into raster image data (bitmap image data). The program that causes the CPU 212 to perform the above-mentioned operations is stored in the ROM 207. Similarly, a program that causes the CPU 212 to interpret and process a print job received from an external apparatus via the external I/F 202 is stored in the ROM 207. The above-mentioned operations can be processed by software programs. The ROM 207 is a read only memory that stores a boot sequence program and a font information program beforehand. Various programs stored in the ROM 207 are described in detail below. The RAM 208 is a readable and writable memory, which can store image data received from the scanner 224 and the external I/F 202, various programs, and setting information.

Further, the HDD 209 preliminarily stores various programs described below. Image data compressed by a compression/expansion unit 210 can be also stored in the HDD 209. The HDD 209 is constituted to store a plurality of pieces of data, including print data of a processing target job. The controller unit 205 can store a processing target job input via various input units (e.g., the scanner 224 and the external I/F 202) in the HDD 209. The controller unit 205 can read the processing target job from the HDD 209 and output the target job to the printer unit 203 to cause printer unit 203 to perform printing. Further, the controller unit 205 can read a job from the HDD 209 and can transmit the job to an external apparatus via the external I/F 202. As mentioned above, the controller unit 205 can execute various output processing for processing target jobs stored in the HDD 209. The compression/expansion unit 210 can compress and expand image data stored in the RAM 208 and the HDD 209 using an appropriate compression method (e.g., JBIG or JPEG).

A disk controller (DKC) 215 of the controller unit 205 can control accesses to the HDD 209.

Further, the controller unit 205 can control various operations to be performed by the sheet processing apparatus 200. The sheet processing apparatus 200 corresponds to the sheet holding apparatuses and the sheet processing apparatuses illustrated in FIG. 1. A media management unit 211 is a module that can manage information about the type of each sheet that can be processed by the digital printing machine 102. The information about the type of each sheet that can be processed by the digital printing machine 102 is stored in the HDD 209. A sheet holding unit monitoring unit 213 and a job setting monitoring unit 214 can perform operations described below.

A configuration of the computer (PC) 101 illustrated in FIG. 1 according to the first exemplary embodiment is described in detail below with reference to a block diagram illustrated in FIG. 3.

The computer 101 is a general computer, which is connected to the digital printing machine 102 via the network 100. The computer 101 can execute various application programs and can transmit print jobs to the digital printing machine 102.

Figure 3:
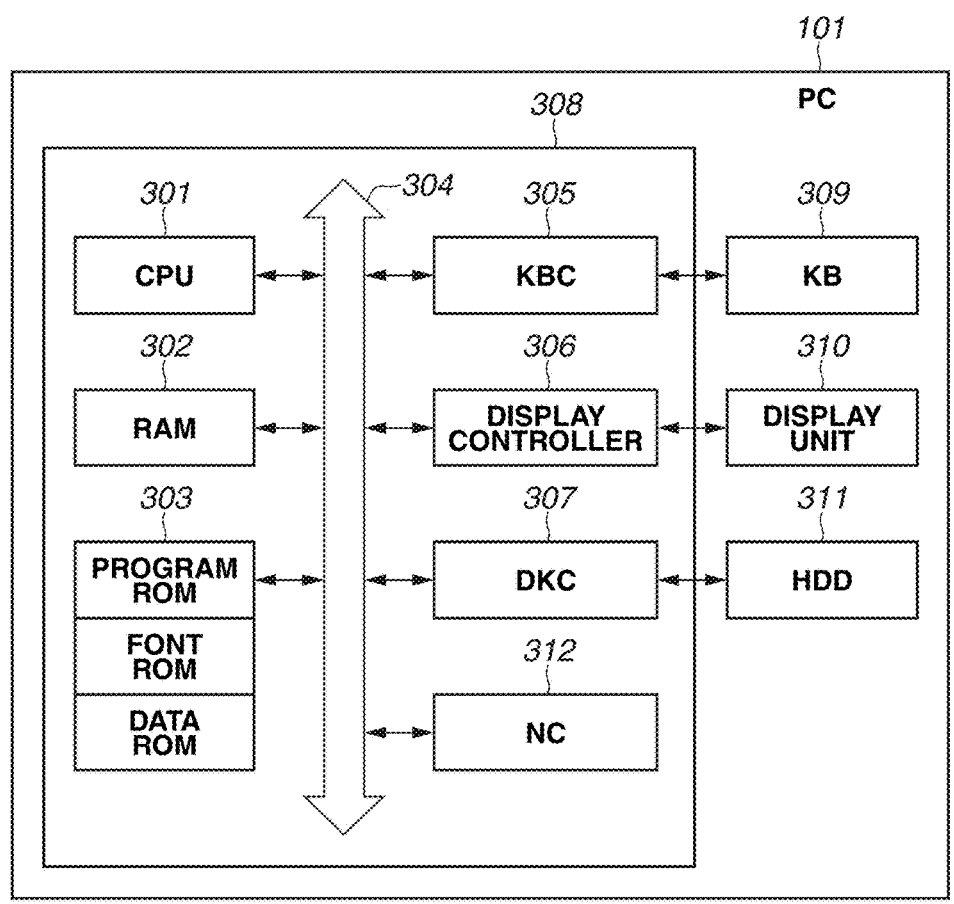
FIG. 3 is a block diagram illustrating a configuration of a computer (PC) according to the first exemplary embodiment.

In FIG. 3, a CPU 301 can execute various programs, including an operating system (OS), general applications, and bookbinding applications, which are stored in a program ROM of a ROM 303 or loaded into a RAM 302 from a HDD 311. The ROM 303 further includes a font ROM and a data ROM. The RAM 302 can function as a main memory or a work area for the CPU 301. A keyboard controller (KBC) 305 can control various instructions and information input via the keyboard 309 and a pointing device (not illustrated). A display controller 306 can control a display to be performed by a display unit 310. A disk controller (DKC) 307 can control every access to the HDD 311 that stores a boot program, various applications, font data, and user files. A network controller (NC) 312 is connected to the network 100 to perform control processing to communicate with other devices connected to the network 100. A bus 304 connects the CPU 301, the RAM 302, the ROM 303, and various controllers to convey data signals and control signals.

The operation unit 204 of the digital printing machine 102 according to the first exemplary embodiment is described in detail below with reference to a plan view illustrated in FIG. 4. The operation unit 204 includes a key input unit 402 that can receive user operations entered via hard keys. A touch panel unit 401 is a display unit that can receive user operations entered via software keys (displayed keys). The touch panel unit 401 can display an operation screen. The controller unit 205 controls the operation unit 204. A display section of the touch panel unit 401 illustrated in FIG. 4 can display an operation screen under the control of the controller unit 205. Items to be displayed on the display section or items that can be operated via the display section are changeable according to a user operation performed on the above-mentioned screen, or a momentary state of the digital printing machine 102. For example, if a user operates the touch panel unit 401, a UI function program described in detail below identifies the operational content input via the touch panel unit 401 and executes processing according to the identified content.

Although the operation unit 204 is constituted by the key input unit 402 and the touch panel unit 401, the configuration of the operation unit 204 can be modified appropriately. For example, the operation unit 204 can be entirely constituted by the touch panel unit 401.

Various programs that can be executed by the digital printing machine 102 are described below.

The programs are stored in the HDD 209 and can be read and executed by the CPU 212 of the controller unit 205 provided in the digital printing machine 102.

A JDF function program is a program that causes the controller unit 205 to realize a print function according to an instruction of the external I/F 202, when the digital printing machine 102 receives a Job Definition Format (JDF) job via the external I/F 202.

A Page Description Language (PDL) function program is a program that causes the controller unit 205 to realize the print function, when the digital printing machine 102 receives PDL data via the external I/F 202.

A User Interface (UI) function program is a control program dedicated to the operation unit 204. The UI function program can identify the content of an instruction input by a user of the digital printing machine 102 via the operation unit 204. The UI function program can perform appropriate screen change processing and can instruct the controller unit 205 to perform requested processing.

A sheet management program is a program that can realize a management function relating to sheets that can be used by the digital printing machine 102. The sheet related information that can be managed by the sheet management program is stored in the HDD 209. In the present exemplary embodiment, the sheet related information managed by the sheet management program is individual data (e.g., sheet size, media type, and remaining amount of sheets) stored for each sheet holding unit. However, the sheet management information is not limited to the above-mentioned examples. For example, the sheet related information managed by the sheet management program can include another data, such as sheet name and sheet grammage.

A job hold function program is a program that can be executed by the controller unit 205 when a user of the digital printing machine 102 instructs executing a job hold function via the operation unit 204. The job hold function can store print target data in the HDD 209 of the digital printing machine 102 until a print instruction is received from the user. Subsequently, the user selects data to be printed. In response to the print instruction, the digital printing machine 102 prints the instructed data. According to the job hold function, the controller unit 205 sequentially instructs each device to perform a predetermined operation according to an appropriate order in such a way as to realize job hold print processing, based on the processing order and processing conditions described by the job hold function program. The devices that can be controlled by the controller unit 205 in this case according to the job hold function, for example, include the printer unit 203, the sheet processing apparatus 200, the HDD 209, the compression/expansion unit 210, and the RAM 208. It is feasible to change settings of each stored job and execute the job according to the changed settings.

When the computer 101 (i.e., an external device) stores a print job in the digital printing machine 102 that has the above-mentioned job hold function, the computer 101 performs the following processing. More specifically, the computer 101 instructs storing the print job according to the job hold function instead of using a PDL function program or the JDF function program to perform job print processing. A printing application that operates on the computer 101 (i.e., a job entry source) designates whether to instruct print processing using the PDL function program or the JDF function program or instruct print job storing processing using the job hold function. The above-mentioned designation is reflected to a setting attribute of a target job to be processed by the PDL function program or the JDF function program. The PDL function program or the JDF function program switches the processing based on the setting attribute.

A media mismatch determination function program is a function that causes the controller unit 205 to perform the following determination processing when a user of the digital printing machine 102 instructs executing the media mismatch determination function via the operation unit 204. The media mismatch determination is determining whether attribute information about a sheet to be used in the print job is not registered to any one of the sheet holding units and determining whether the remaining amount of the sheets to be used in a print job is zero. The controller unit 205 reads attribute information about a sheet that can be used in the digital printing machine 102, which is stored in the HDD 209 of the digital printing machine 102 by the sheet management program. Then, it is determined whether the attribute information about the sheet to be used in the print job is not registered to any one of the sheet holding units by comparing the read attribute information with attribute information about a sheet to be used in the job held by the job hold function program. Further, the controller unit 205 detects the remaining amount of sheets based on a signal received from the sensor equipped in the sheet holding unit. The controller unit 205 determines whether the remaining amount of the sheets to be used in the print job is zero. A flag that indicates a result of the media mismatch determination performed by the above-mentioned media mismatch determination function program is stored in the RAM 208.

The attribute information about the sheet to be used in the print job includes at least one of sheet size, sheet grammage, sheet surface property, sheet shape, and sheet color.

A sheet holding unit monitoring program is a program that causes the sheet holding unit monitoring unit 213 to perform a function of monitoring a change of the sheet attribute information having been set for the sheet holding unit to be used in the job. Information about a monitoring result obtained by the sheet holding unit monitoring program is stored in the HDD 209. For example, if the sheet holding unit to be used in the job is a sheet holding unit 1, the sheet holding unit monitoring unit 213 monitors whether the sheet attribute information set for the sheet holding unit 1 has been changed from "A4 plain paper" to "A4 thick paper" and obtains a monitoring result.

A job setting monitoring program is a program that causes the job setting monitoring unit 214 to execute a function of monitoring a change of the print attribute information having been set for the job. Information about a monitoring result obtained by the job setting monitoring program is stored in the HDD 209. For example, if the print attribute information having been set for the job is "B4 plain paper", the job setting monitoring unit 214 obtains information about a monitoring result in response to a change from "B4 plain paper" to "B4 thick paper".

Although a part of the function programs has been described in detail, it is unnecessary for the system configuration to have all of the functions. A configuration that includes a part of the function programs or other function programs is employable.

Figure 5C:
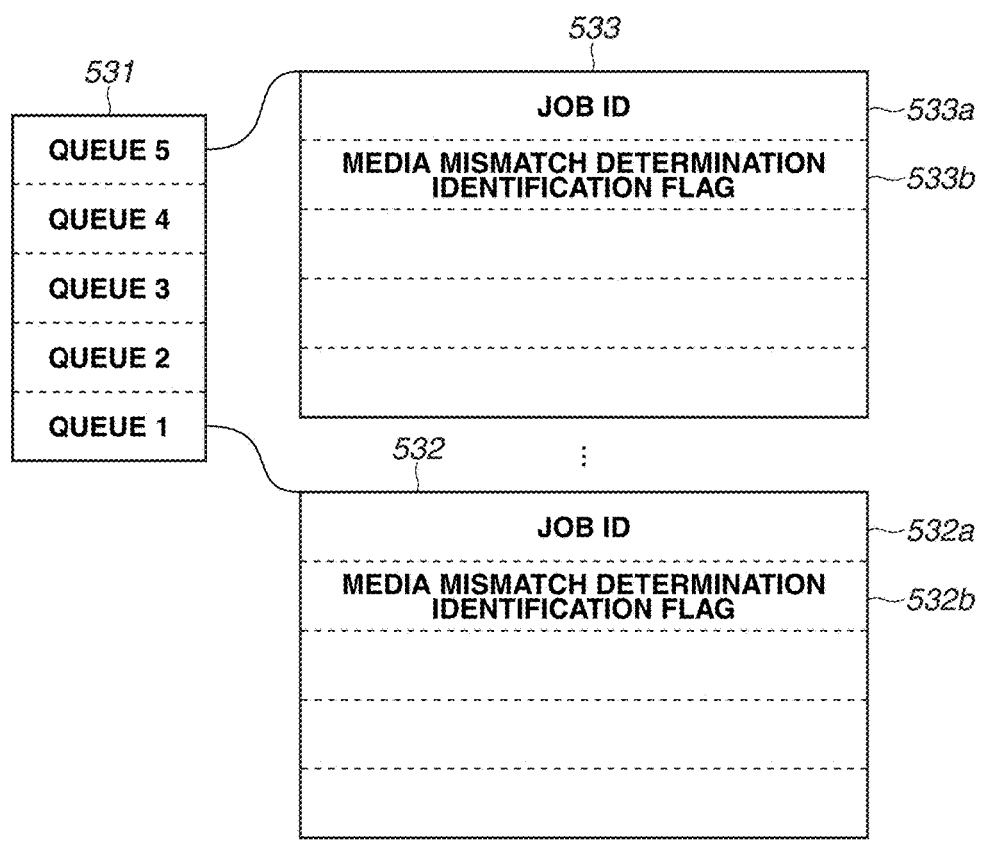

The data structure of a job, print queue data, and hold queue data of the digital printing machine 102 according to the first exemplary embodiment is described in detail below with reference to FIGS. 5A to 5C.

First, the data structure of a job is described in detail below with reference to FIG. 5A. A job, when it is entered in the digital printing machine 102, has the structure of an entry 511 illustrated in FIG. 5A. The number of entries 511 is equal to the number of jobs that are input and processed by the digital printing machine 102. The entry 511 is constituted by a job ID 511a, a print attribute 511b, and a print data 511c. The job ID 511a included in the entry 511 is a unique ID, which can be used to identify and specify each job in the digital printing machine 102. The print attribute 511b in the entry 511 stores print attribute information defined for the job. For example, the print attribute includes a job entry user name, a sheet size, a media type, and a number of pages. Further, the print data 511c included in the entry 511 stores print data that describes an image to be drawn on a printing paper.

Next, the data structure of the print queue data is described in detail below with reference to FIG. 5B. When a job is input to the print queue, a print queue buffer 521 manages the input job. If a new job is input in a state where no job is present in the print queue, the input job is registered to a queue 1 of the print queue buffer 521. The next job, if it is input, is registered to a queue 2. The job stacking operation is performed in this manner. The job stacked in the queue 1 is first subjected to print processing and the jobs stacked in the following queues are sequentially subjected to the print processing. If the print processing of a target job is completed, the processed job is deleted from the print queue buffer 521. Therefore, the order of each job remaining in the print queue buffer 521 is renumbered. Then, the job being currently stacked in the queue 1 is subjected to the print processing. Although FIG. 5B illustrates only five queues, the number of queues to be provided in the print queue buffer 521 can be set to an appropriate number considering the capability (e.g., memory capacity and print processing speed) of the digital printing machine 102.

A print queue job attribute table is usable to manage the job attribute to be registered to each print queue. For example, as illustrated in FIG. 5B, a print queue job attribute table 522 corresponding to one job is registered to the queue 1 and a print queue job attribute table 523 corresponding to another job is registered to the queue 5. The number of the print queue job attribute tables is equal to the number of queues actually provided in the print queue buffer 521. Hereinafter, the print queue job attribute table 522 is described in detail below.

The print queue job attribute table 522 includes a job ID 522a as ID information that can identify each job, a flag 522b that can identify a media mismatch determination result, and a flag 522c that can identify a suspended processing target.

The media mismatch determination is described in detail below. The job substance is not present in the above-mentioned print queue job attribute table 522. The following description of the present exemplary embodiment is based on the premise that the job substance is not present in the print queue job attribute table 522. However, a copied job substance can be present in the print queue job attribute table 522. The printing system searches a plurality of entries 511 with reference to a value of the above-mentioned job ID 522a to find a job that has the same job ID 522a. Then, the printing system acquires the print attribute 511b and the print data 511c from the corresponding entry 511.

Next, the data structure of a hold queue data is described in detail below with reference to FIG. 5C. If a print execution instruction is given to print data managed by a hold queue buffer 531, the print data moves to the print queue buffer 521. If a job is input to a hold queue, the job is managed by the hold queue buffer 531. The hold queue buffer 531 is a storage area for a storage job that can be managed by the job hold function program. The hold queue buffer 531 stores the storage target job, if it is received from an external apparatus, together with print settings. A structure of the hold queue buffer 531 is similar to that of the print queue buffer 521. Therefore, redundant description thereof will be avoided.

A hold queue job attribute table is usable to manage job attribute to be registered to each hold queue. As illustrated in FIG. 5C, a hold queue job attribute table 532 corresponding to one job is registered to the queue 1 and a hold queue job attribute table 533 corresponding to another job is registered to the queue 5. The number of the hold queue job attribute tables 533 is equal to the number of queues actually provided in the hold queue buffer 531. Hereinafter, the hold queue job attribute table 532 is described in detail below.

The hold queue job attribute table 532 includes a job ID 532a as ID information for identifying each job and a flag 532b for identifying a media mismatch determination result. The job substance is not present in the above-mentioned hold queue job attribute table 532. The following description of the present exemplary embodiment is based on the premise that the job substance is not present in the hold queue job attribute table 532. However, a copied job substance can be present in the hold queue job attribute table 532. The printing system searches a plurality of entries 511 with reference to a value of the above-mentioned job ID 532a to find a job that has the same job ID 532a. Then, the printing system acquires the print attribute 511b and the print data 511c from the corresponding entry 511.

The printing system performs the following processing to stack a job in the print queue buffer 521 or the hold queue buffer 531 in response to an entry of the job. To attain the above-mentioned processing, the CPU 212 of the controller unit 205 executes the job hold function program that can be read from the ROM 207 or the HDD 209 and loaded into the RAM 208.

First, a user inputs a job to cause the digital printing machine 102 to perform print processing. Then, a queue designation value indicating the storing destination of the job, which is the print queue buffer 521 or the hold queue buffer 531, is registered as job attribute. After the job entered by the user is received, the printing system generates a unique ID and allocates the generated unique ID to the input job. Then, the printing system generates one entry 511 for each job. The printing system inputs the generated job ID to the job ID 511a field of the entry 511. The printing system inputs the print attribute of the received job to the print attribute 511b of the entry 511. The printing system inputs the received print data to the print data 511c of the entry 511.

Next, the above-mentioned queue designation value is read. If the queue designation value is a print queue, the input job is stacked in a queue of the print queue buffer 521.

On the other hand, if the queue designation value is a hold queue, the input job is stacked in a queue of the hold queue buffer 531.

When the input job is stacked in a queue of the print queue buffer 521, the printing system generates one print queue job attribute table 522 (see FIG. 5B) for the input job. Then, the printing system registers the job ID to the job ID 522a of the print queue job attribute table 522.

On the other hand, when the input job is stacked in a queue of the hold queue buffer 531, the printing system generates one hold queue job attribute table 532 (see FIG. 5C) for the input job. Then, the printing system registers the job ID to the job ID 532a field of the hold queue job attribute table 532.

The above-mentioned processing to stack an entered job in the print queue buffer 521 or the hold queue buffer 531 is conventionally well known. Therefore, a flowchart illustrating the above-mentioned processing is not described.

An operation that can be realized by the configuration according to the present exemplary embodiment is described in detail below.

FIGS. 6A, 6B, and 6C illustrate a monitoring job attribute table 611, a job attribute details table 621, and a sheet management table 631, respectively, which are used in monitoring processing that can be performed according to the first exemplary embodiment.

First, the monitoring job attribute table 611 illustrated in FIG. 6A is described in detail below. The monitoring job attribute table 611 is constituted by a column of job ID 612 and a plurality of columns of monitoring conditions 613, 614, and 615. The monitoring job attribute table 611 can be used to register attribute values of a monitoring target job in the hold queue buffer 531. The job ID 612 corresponds to the job ID 511a of the entry 511. Sheet holding unit settings, i.e., the target to be monitored by the sheet holding unit monitoring unit 213, are registered to the column of monitoring condition 1 (see 613). On the other hand, a combination of sheet size and media type, i.e., the target to be monitored by the job setting monitoring unit 214, is registered to the column of monitoring condition 2 (see column 614). The monitoring processing that can be performed by the sheet holding unit monitoring unit 213 and the monitoring processing that can be performed by the job setting monitoring unit 214 are described in detail below.

The job attribute details table 621 illustrated in FIG. 6B is described in detail below.

The print attribute 511b of the entry 511 includes the job attribute details table 621. The job attribute details table 621 is provided for each job. Therefore, the job attribute details table 621 includes the job ID 612 for identifying each job. However, if the job attribute details table is included as a part of the print attribute 511b, the entry 511 includes the job ID 511a. Therefore, the job ID 612 is unnecessary for the job attribute details table 621.

The job attribute details table 621 includes a description of sheet related attribute information, for each sheet designated in the job. Size designation 624 and media type designation 625, which are a part of the sheet related attribute information registered to the job attribute details table 621, correspond to the print attribute 511b of the entry 511 illustrated in FIG. 5A.

The information in the job attribute details table 621 illustrated in FIG. 6B is an example of a job having a value "00001009" as the job ID 612. According to the settings in the job attribute details table 621, the above-mentioned job is set to use three types of sheet 1, sheet 2, and sheet 3. A sheet ID 622 indicates ID information of each sheet. The sheet ID 622 can uniquely identify a sheet included in one job. Therefore, "sheet 1", "sheet 2", and "sheet 3" are simply allocated as ID information of respective sheets in the example illustrated in FIG. 6B. The column of media mismatch presence 626 is blank when the media mismatch determination is not yet performed.

For example, the attribute information about the sheet 1 indicate that the sheet holding unit determination method 623 is "AUTO" (sheet type designation), the size designation 624 is "A4", the media type designation 625 is "plain paper 1", and the media mismatch presence 626 is "match". However, the sheet type designated job is a job that is designated to supply a sheet from a sheet holding unit for which the sheet to be used in the job is registered. Further, the attribute information about the sheet 2 indicates that the sheet holding unit determination method 623 is "AUTO" (sheet type designation), the size designation 624 is "A4", the media type designation 625 is "coated paper 3", and the media mismatch presence 626 is "mismatch". Further, the attribute information about the sheet 3 indicates that the sheet holding unit determination method 623 is "sheet holding unit 5 (manual feeding)" (sheet holding unit designation), the size designation 624 is "A4", and the media type designation 625 is "tab paper". However, the sheet holding unit designated job does not determine whether a sheet to be used in the job is registered to the sheet holding unit designated by the job. Therefore, the media mismatch presence 626 is blank.

The printing system starts the media mismatch determination processing in a state where a job hold function operation screen illustrated in FIG. 15 is displayed on the display section of the operation unit 204. When a hold function selection button 1402 is pressed, the display section of the operation unit 204 changes from a main screen 1401 illustrated in FIG. 14 to the job hold function operation screen illustrated in FIG. 15. The main screen 1401 illustrated in FIG. 14 includes various function selection buttons that allows a user to press a desired function selection button so that the operation screen can be changed to a screen to be used for the selected function. The main menu configuration and the functions that can be provided by the main menu are not limited to the example illustrated in FIG. 14.

An example of the job hold function operation screen that can be displayed on the operation unit 204 of the digital printing machine 102 according to the first exemplary embodiment is described in detail below with reference to FIG. 15. The job hold function operation screen includes a plurality of display areas and a plurality of operation buttons. Hereinafter, important features in describing the first exemplary embodiment are described in detail below. The job hold function is a function of storing print target data in the HDD 209 of the digital printing machine 102 until a user inputs a print instruction and subsequently performing printing based on data corresponding to the print instruction received from the user. The job hold function enables the digital printing machine 102 to store a plurality of data in the HDD 209. As mentioned above, the job hold function allows each user to select an intended print job from a plurality of print jobs stored in the HDD 209 and designate the execution order. Therefore, it is feasible to perform printing regardless of the order stored in the HDD 209.

A hold job list 1502 is an area provided to display a list of print jobs stored in the above-mentioned hold queue buffer 531, in the digital printing machine 102. According to the example illustrated in FIG. 15, six print jobs are displayed. However, the digital printing machine 102 can store many print jobs in the HDD 209 although the number of print jobs that can be simultaneously displayed on the hold job list 1502 is limited. For example, the number of print jobs stored in the HDD 209 is seven or more, a user can press a scroll button 1505 or 1506 to sequentially display all of the stored print jobs on the hold job list 1502. The hold job list 1502 includes a plurality of fields of job name 1510, user name 1511, and date/time 1512 to express each print job. The information stored in the date/time 1512 field indicates storage date and time of the print job stored in the digital printing machine 102.

A user who operates the above-mentioned job hold screen can identify the user's job by checking the user name 1511 and can select a target print job.

If a user presses the hold job list 1502 with a finger to point a print job portion displayed thereon, the pointed print job turns into a selected state. More specifically, the pointed print job is designated as a print target.

A print job list 1503 is an area provided to display print jobs that the digital printing machine 102 has already started their print processing or print jobs that are in a standby state before the digital printing machine 102 starts their print processing. Further, the print job list 1503 is an area provided to display a list of print jobs stored in the above-mentioned print queue buffer 521.

According to the example illustrated in FIG. 15, there is not any print job that the digital printing machine 102 has already started its print processing. In other words, it indicates that the printer unit 203 of the digital printing machine 102 is in an idle state.

A details/change button 1507 is a button that is operable to confirm details about a print job being in a selected state on the hold job list 1502 or change the screen display to a screen usable to change the contents of printing.

A print start button 1508 is a button that is operable to instruct to start print processing of a print job selected on the hold job list 1502. If the print start button 1508 is pressed in a state where a target print job is selected from among a plurality of print jobs displayed on the hold job list 1502, the selected print job is moved to and displayed on the print job list 1503. A stop button 1509 is a button that is operable to stop the execution of the print job being in the state where the print processing has been started by the print start button 1508.

A media mismatch determination button 1504 is a button that is operable to perform media mismatch determination processing on a print job selected from the hold job list 1502.

Hereinafter, sequential processing relating to the media mismatch determination according to the first exemplary embodiment, which can be performed for a job stacked in the hold queue buffer 531, is described in detail below with reference to a flowchart illustrated in FIG. 7. To attain the above-mentioned processing, the CPU 212 of the controller unit 205 executes the UI function program that can be read from the ROM 207 or the HDD 209 and loaded into the RAM 208.

First, in step S701, the CPU 212 determines whether there is a job stacked in the hold queue buffer 531. If the determination result in step S701 indicates that a stacked job is present (YES in step S701), the operation proceeds to step S702. On the other hand, if the determination result in step S701 indicates that there is not any stacked job (NO in step S701), the CPU 212 repeats the processing in step S701. In step S702, the CPU 212 waits for an operation that may be performed by a user on the screen illustrated in FIG. 15, which can be displayed on the operation unit 204. The CPU 212 repeats the processing in step S702 until any operation is performed by the user. If a user operation on the operation unit 204 is detected (YES in step S702), the operation proceeds to step S703. The CPU 212 determines whether the user operation is pressing the media mismatch determination button 1504. If the determination result in step S703 indicates that the media mismatch determination button 1504 has been pressed (YES in step S703), the operation proceeds to step S800. In step S800, the CPU 212 performs media mismatch determination processing. The media mismatch determination processing to be performed in step S800 is described in detail below.

After the media mismatch determination processing in step S800 has been completed, the operation proceeds to step S1100. In step S1100, the CPU 212 performs media mismatch determination result notification processing. The media mismatch determination result notification processing to be performed in step S1100 is described in detail below.

After the media mismatch determination result notification processing in step S1100 has been completed, the operation proceeds to step S704. In step S704, the CPU 212 performs the processing to register the attribute information of each job that has been determined as being not media mismatch to the monitoring job attribute table 611, from among the jobs being subjected to the media mismatch determination in step S800. The job attribute to be registered to the monitoring job attribute table is, for example, a sheet holding unit to be used in the job and a combination of sheet size and media type. The CPU 212 registers the settings of a monitoring target sheet holding unit of the sheet holding unit monitoring unit 213 or the job setting monitoring unit 214 in the column of the monitoring condition 1 (column 613) of the monitoring job attribute table 611. The CPU 212 registers the combination of sheet size and media type in the column of the monitoring condition 2 (column 614) of the monitoring job attribute table 611. For example, as illustrated in FIG. 6A, a record in the first line of the monitoring job attribute table 611 indicates that the sheet holding units to be used in the job having a job ID (=00001001) are the sheet holding unit 1 and a sheet holding unit 2. Further, the combinations of sheet size to be used and media type to be used are two types of A4 plain paper 1 and A4 coated paper 1. The above-mentioned information is registered to the column of the monitoring condition 1 (column 613) and the column of the monitoring condition 2 (column 614), so that "sheet holding unit 1, A4 plain paper 1" and "sheet holding unit 2, A4 coated paper 1" can be monitored. The monitoring job attribute table 611 includes the column of a monitoring condition 3 (column 615) so that monitoring conditions can be added. As mentioned above, after the processing to register the job attribute in the monitoring job attribute table 611 in step S704 has been completed, the operation returns to step S701.

On the other hand, if the determination result in step S703 indicates that the media mismatch determination button 1504 is not yet pressed (NO in step S703), the operation proceeds to step S705. In step S705, the CPU 212 determines whether the user operation is pressing a print start button. If the determination result in step S705 indicates that the print start button has been pressed (YES in step S705), the operation proceeds to step S706. The CPU 212 executes print processing.

In step S706, the CPU 212 deletes the job, which has been selected by the user from the hold job list 1502 illustrated in FIG. 15 and the print processing has been already started, from the hold queue buffer 531. Then, the CPU 212 registers the job in the print queue buffer 521. In this case, the job registered to the print queue buffer 521 is displayed on the print job list 1503 illustrated in FIG. 15.

Subsequently, the operation proceeds to step S707. The CPU 212 performs processing to delete the attribute information of the job if the print processing thereof has been completed, from the monitoring job attribute table. Then, the operation returns to step S701.

However, the processing to be performed by the CPU 212 in step S707, i.e., the processing to delete the job attribute information from the monitoring job attribute table, is limited only when the registered attribute information of the job is present in the monitoring job attribute table.

On the other hand, if the determination result in step S705 indicates that the print start button is not pressed (NO in step S705), the operation proceeds to step S708. The CPU 212 performs processing other than the media mismatch determination processing and the print processing, if it is instructed by a user operation. For example, the processing to be performed in step S708 includes selecting a job that has been once subjected to the media mismatch determination processing and pressing the details/change button 1507 to display a screen that calls details of a print job being in a selected state.

Figure 8:
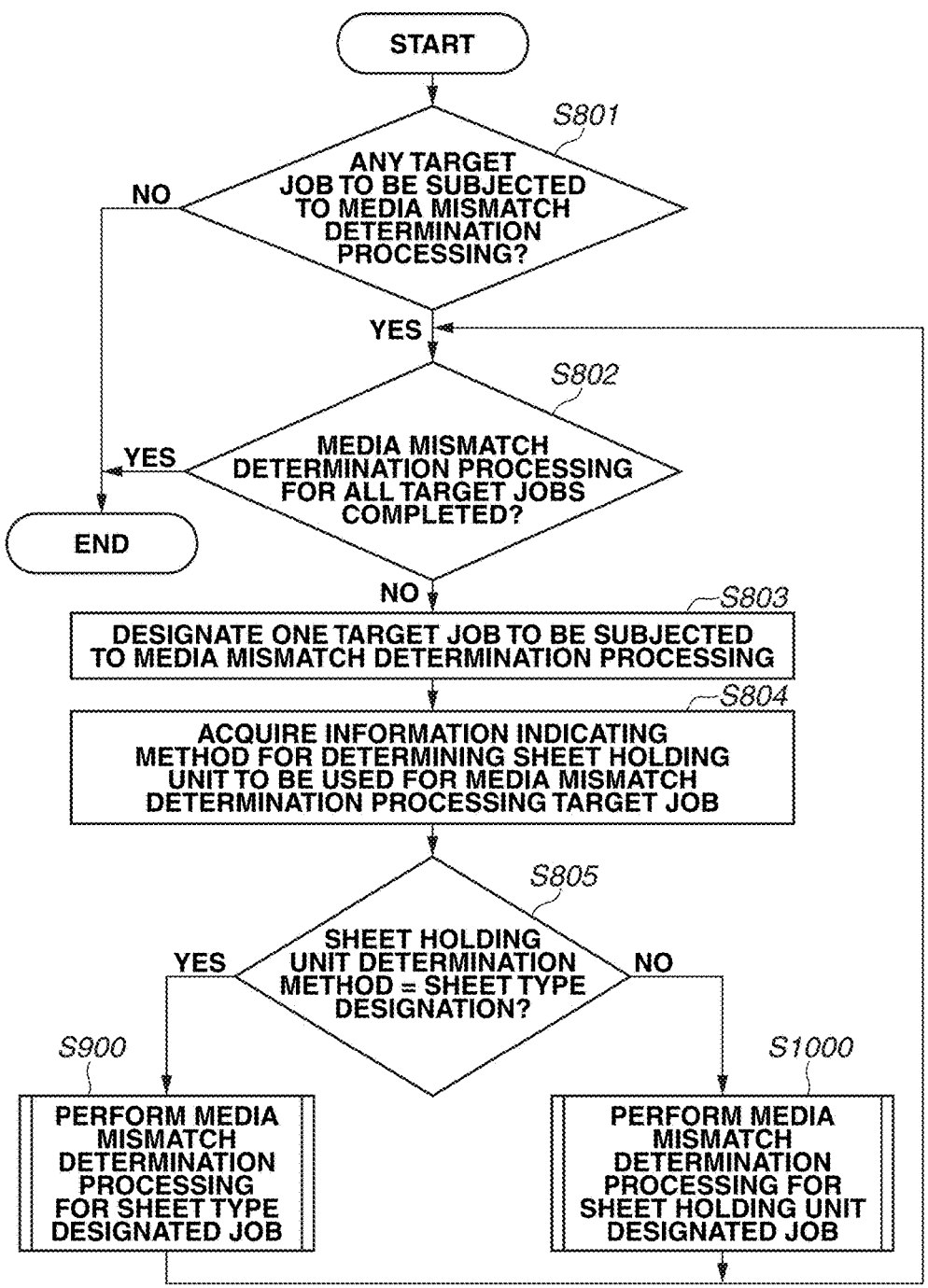
FIG. 8 is a flowchart illustrating media mismatch determination processing (see step S800) illustrated in FIG. 7, which can be performed by the digital printing machine according to the first exemplary embodiment.

FIG. 8 is a flowchart illustrating details of the media mismatch determination processing to be performed in step S800 according to the first exemplary embodiment. To attain the above-mentioned processing, the CPU 212 of the controller unit 205 executes the media mismatch determination function program that can be read from the ROM 207 or the HDD 209 and loaded into the RAM 208. The media mismatch determination processing to be performed in step S800 according to the first exemplary embodiment can be started when the media mismatch determination button 1504 is pressed. Further, if the media mismatch determination button 1504 is pressed again, the CPU 212 performs the media mismatch determination processing again, and the determination result can be updated.

In the first exemplary embodiment, the CPU 212 performs the following processing for a target print job selected by the user from among the print jobs displayed on the hold job list 1502. The target print job is not limited to the one having been selected by the user. The target in the above-mentioned processing can be each of the print jobs displayed on the hold job list 1502.

First, in step S801, the CPU 212 determines whether the number of target print jobs to be subjected to the media mismatch determination processing is equal to or greater than 1. If the determination result in step S801 indicates that the number of the target print jobs to be subjected to the media mismatch determination processing is equal to or greater than 1 (YES in step S801), the operation proceeds to step S802. On the other hand, if the determination result in step S801 indicates that the number of the target print jobs to be subjected to the media mismatch determination processing is zero (NO in step S801), the CPU 212 terminates the media mismatch determination related processing illustrated in FIG. 8.

Then, in step S802, the CPU 212 determines whether the media mismatch determination processing has been completed for all target print jobs to be subjected to the media mismatch determination processing. If the determination result in step S802 indicates that the media mismatch determination processing is not yet completed for all target print jobs to be subjected to the media mismatch determination processing (NO in step S802), the operation proceeds to step S803. On the other hand, if the determination result in step S802 indicates that the media mismatch determination processing has been completed for all target print jobs to be subjected to the media mismatch determination processing (YES in step S802), the CPU 212 terminates the media mismatch determination related processing illustrated in FIG. 8.

In step S803, the CPU 212 designates one target print job to be subjected to the media mismatch determination processing. Then, the operation proceeds to step S804. In step S804, the CPU 212 acquires information indicating a determination method (i.e., sheet type designation or sheet holding unit designation) for determining a sheet holding unit to be used in the print job that has been determined as a target to be subjected to the media mismatch determination processing in step S803. Then, the operation proceeds to step S805.

In step S805, the CPU 212 determines whether the method for determining the sheet holding unit to be used in the print job is "sheet type designation" or "sheet holding unit designation". The CPU 212 instructs the sheet type designated print job to the media management unit 211, which refers to a sheet management table illustrated in FIG. 16.

An example of the sheet management table that manages information about sheets stored in each sheet holding unit of the digital printing machine 102 is described in detail below with reference to FIG. 16. The above-mentioned sheet management table is stored in the HDD 209 and can be referred to by the CPU 212. The example of the sheet management table illustrated in FIG. 16 includes sheet holding unit ID 1611 that serves as a key to manage information about size 1612, media type 1613, and remaining amount 1614 for each of ten sheet holding units that are provided in the digital printing machine 102. The remaining amount of sheets can be detected by the sensor provided in each sheet holding unit.

For example, a row 1601 indicates that the sheet stored in a sheet holding unit (ID=1) is A4 in the sheet size, plain paper 1 in the media type, and 3 in the remaining amount. Numerical values indicated by the above-mentioned remaining amount 1614 have the following meanings with respect to the remaining amount; 3: full (100%), 2: small (25%), 1: extremely small (less than 5%), 0: zero (0%), respectively. The accuracy in the above-mentioned sheet remaining amount detection can be increased by improving the performance of the remaining amount sensor. However, the digital printing machine 102 according to the first exemplary embodiment performs the remaining amount detection with reference to the numerical values indicated by the above-mentioned remaining amount 1614. For example, if the storage capacity of a sheet holding unit is 3000 sheets, the remaining amount=full (100%) means that the number of sheets remaining in the sheet holding unit is 3000. The remaining amount=small (25%) means that 750 sheets remain in the sheet holding unit having the storage capacity of 3000 sheets. The remaining amount=extremely small (less than 5%) means that the number of sheets remaining in the sheet holding unit having the storage capacity of 3000 sheets is less than 150. The remaining amount=zero (0%) means that there is not any sheet remaining in the sheet holding unit having the storage capacity of 3000 sheets. As mentioned above, it is feasible to detect the remaining amount of sheets stored in each sheet holding unit, at three stages, using the sensor provided in each sheet holding unit.

For example, when the print job uses an A4 colored paper (red), the CPU 212 determines whether the A4 colored paper (red) is registered to any one of the sheet holding units, with reference to the sheet management table illustrated in FIG. 16. Then, based on a determination result that the sheet size stored in a sheet holding unit (ID=2) is A4 and the media type is colored paper (red), the CPU 212 determines that the sheet holding destination is the sheet holding unit (ID=2). On the other hand, when the print job is designated by the sheet holding unit, for example, if a print job designates a sheet holding unit (ID=3) in the sheet management table illustrated in FIG. 16, it means that the sheet to be supplied is "A3 plain paper 1" stored in the sheet holding unit (ID=3).

If the determination result in step S805 indicates that the target print job is a sheet type designated job (YES in step S805), the operation proceeds to step S900. On the other hand, if it is determined that the target print job is a sheet holding unit designated job (NO in step S805), the operation proceeds to step S1000. The processing to be performed in step S900 and the processing to be performed in step S1000 are described in detail below with reference to FIGS. 9 and 10. If the processing in step S900 or step S1000 has been completed, the operation returns to step S802.

Figure 9:
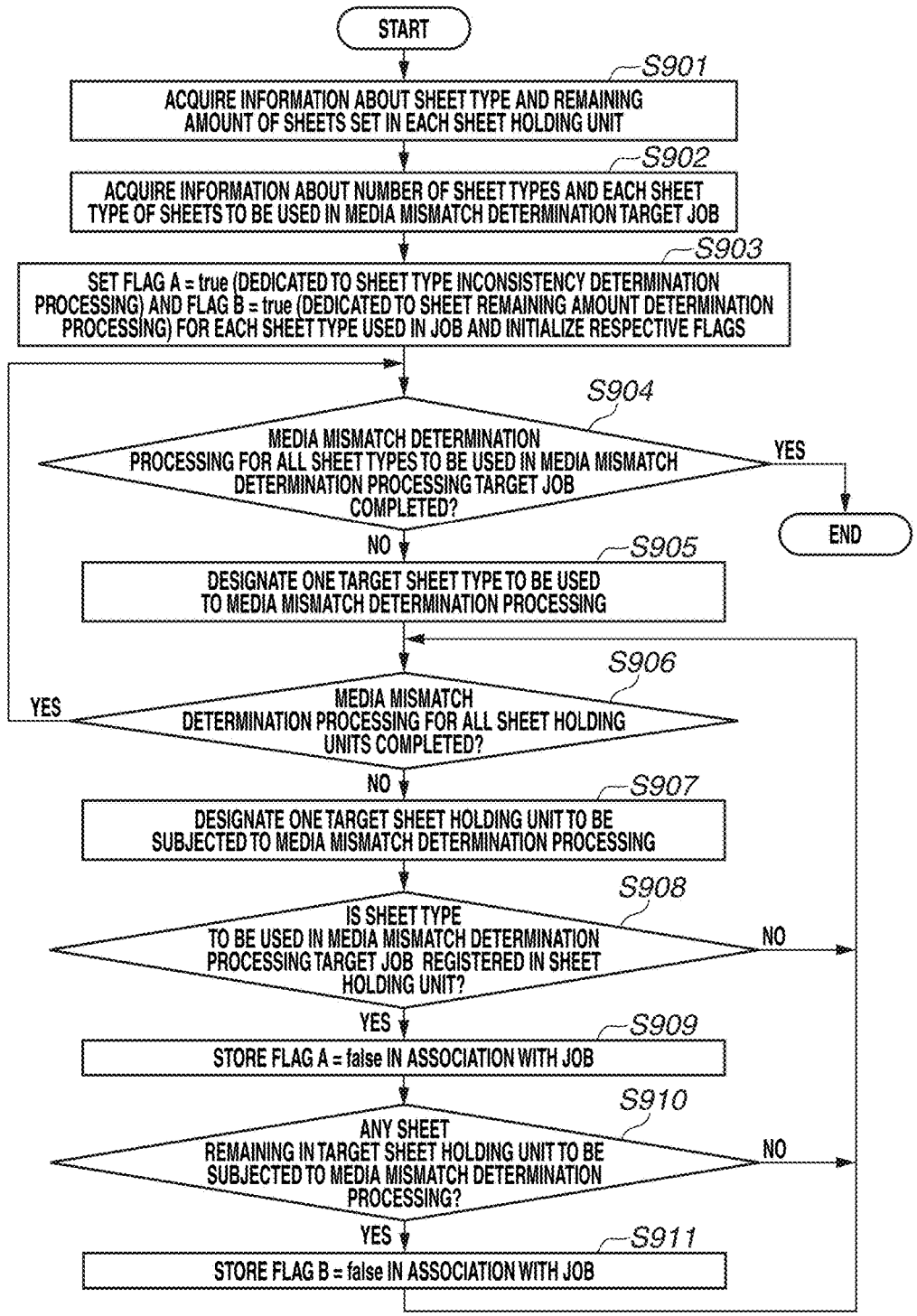
FIG. 9 is a flowchart illustrating media mismatch determination processing (see step S900), which can be performed by the digital printing machine according to the first exemplary embodiment, when the print job illustrated in FIG. 8 is a sheet type designated job.

FIG. 9 is a flowchart illustrating the media mismatch determination processing to be performed in step S900 when the target print job to be subjected to the media mismatch determination processing is a sheet type designated job. To attain the above-mentioned processing, the CPU 212 of the controller unit 205 executes the media mismatch determination function program that can be read from the ROM 207 or the HDD 209 and loaded into the RAM 208.

In step S901, the CPU 212 acquires information about the sheet type and the remaining amount of sheets set in each sheet holding unit provided in the above-mentioned digital printing machine 102. The CPU 212 instructs the media management unit 211 to perform the processing in step S901, for example, with reference to the above-mentioned sheet management table illustrated in FIG. 16. Then, the operation proceeds to step S902. In step S902, the CPU 212 reads a print job stored in the hold queue buffer 531, with respect to the target print job to be subjected to the media mismatch determination processing. Then, the CPU 212 acquires the number of sheet types being sheet type designated, from among sheet types to be used in the print job illustrated in FIGS. 17A, 17B, and 17C.

FIGS. 17A, 17B, and 17C illustrate sheet information about each of Job A, Job D, and Job E illustrated in FIG. 15. The information illustrated in FIGS. 17A, 17B, and 17C can be stored when the job hold function program stores a print job in the hold queue buffer 531 because print settings can be simultaneously stored. The print settings include sheet information about each print job. FIG. 17A indicates that the Job A uses two types of sheets, in which one sheet is A4 in the sheet size and "plain paper 1" in the media type and the other sheet is A4 in the sheet size and "two-sided coated paper 1" in the media type. Further, FIG. 17B indicates that the Job D uses two types of sheets, in which one sheet is LTR in the sheet size and "plain paper 1" in the media type and the other sheet is 11×17 in the sheet size and "plain paper 1" in the media type. Similarly, FIG. 17C indicates that the Job E uses three types of sheets, in which the first sheet is A4 in the sheet size and "plain paper 1" in the media type, the second sheet is A4 in the sheet size and "colored paper (red)" in the media type, and the third sheet is A3 in the sheet size and "two-sided coated paper 2" in the media type.

Next, the operation proceeds to step S903. The CPU 212 sets two types of flags (i.e., Flag A and Flag B) each holding a result in the media mismatch determination processing, for each sheet type acquired in step S902, and performs initialization processing for respective flags. In this case, the Flag A is a flag that holds a determination result as to whether attribute information about a sheet to be used in the print job is not registered to any one of the sheet holding units. The Flag A is stored in the RAM 208. Flag B is a flag that holds a determination result as to whether the remaining amount of sheets to be used in the print job is zero. The Flag B is stored in the RAM 208. The Flag A having a value "true" indicates a media mismatch (i.e., sheet type inconsistent) state. More specifically, when the Flag A is "true", it means that a sheet type designated by the print job is not set in any one of the sheet holding units. On the other hand, the Flag B having a value "true" indicates a media mismatch (sheet remaining amount zero) state. More specifically, when the Flag B is "true", it means that the remaining amount of sheets having a sheet type to be used in a print job is zero. In the initialization processing, the Flag A and the Flag B are initialized to have an initialization value of true (mismatch), respectively.

Next, the operation proceeds to step S904. The CPU 212 determines whether the above-mentioned media mismatch determination processing has been completed for all sheet types of the target print job to be subjected to the media mismatch determination processing. If the media mismatch determination processing is not yet completed for all sheet types (NO in step S904), the operation proceeds to step S905. In step S905, the CPU 212 designates one target sheet type to be subjected to the media mismatch determination processing in the print job. Then, the operation proceeds to step S906. In step S906, the CPU 212 determines whether the media mismatch determination processing has been completed for all the sheet holding units that are provided in the digital printing machine 102. If the determination result in step S906 indicates that there is at least one sheet holding unit that is not yet subjected to the media mismatch determination processing (NO in step S906), the operation proceeds to step S907. The CPU 212 designates one target sheet holding unit to be next subjected to the media mismatch determination. Then, the operation proceeds to step S908. In step S908, the CPU 212 determines whether the target sheet type to be subjected to the media mismatch determination processing in the print job determined in step S905 coincides with a sheet type being set and registered to the target sheet holding unit to be subjected to the media mismatch determination processing determined in step S907. If the determination result in step S908 indicates that the compared sheet types do not coincide with each other (NO in step S908), the operation returns to step S906. The CPU 212 performs the media mismatch determination processing for the next sheet holding unit.

On the other hand, if the determination result in step S908 indicates that the sheet type in the HDD 209, which has been set and registered by the sheet management program, coincides with the sheet type being set and registered to the sheet holding unit determined in step S907 (YES in step S908), the operation proceeds to step S909. In step S909, the CPU 212 stores the value of Flag A as being "false (match)" indicating that the print job designates the sheet type registered to the sheet holding unit, in association with the print job. Then, the operation proceeds to step S910. The CPU 212 determines whether the remaining amount of sheets in the target sheet holding unit to be subjected to the media mismatch determination processing determined in step S907 is not zero. If the determination result in step S910 indicates that the remaining amount of sheets is not zero (YES in step S910), the operation proceeds to step S911. In step S911, the CPU 212 stores the value of Flag B as being "false (remaining amount is not zero)" indicating that the remaining amount of sheets having the sheet type to be used in the print job is not zero, in association with the print job. Then, the operation returns to step S906 to repeat the processing in step S906 and subsequent steps. On the other hand, if the determination result in step S910 indicates that the remaining amount of sheets is zero (NO in step S910), the operation returns to step S906 to repeat the processing in step S906 and subsequent steps. If the determination result in step S906 indicates that the media mismatch determination processing has been completed for all sheet holding units (YES in step S906), the operation returns to step S904 to repeat the processing in step S904 and subsequent steps. Further, if the determination result in step S904 indicates that the media mismatch determination processing has been completed for all sheet types of the target print job to be subjected to the media mismatch determination processing, the CPU 212 terminates the sequential processing relating to the media mismatch determination to be performed when the target print job is a sheet type designated job. As described above, the CPU 212 performs the media mismatch determination processing in step S900 illustrated in FIG. 8 if the target print job is a sheet type designated job.

Figure 10:
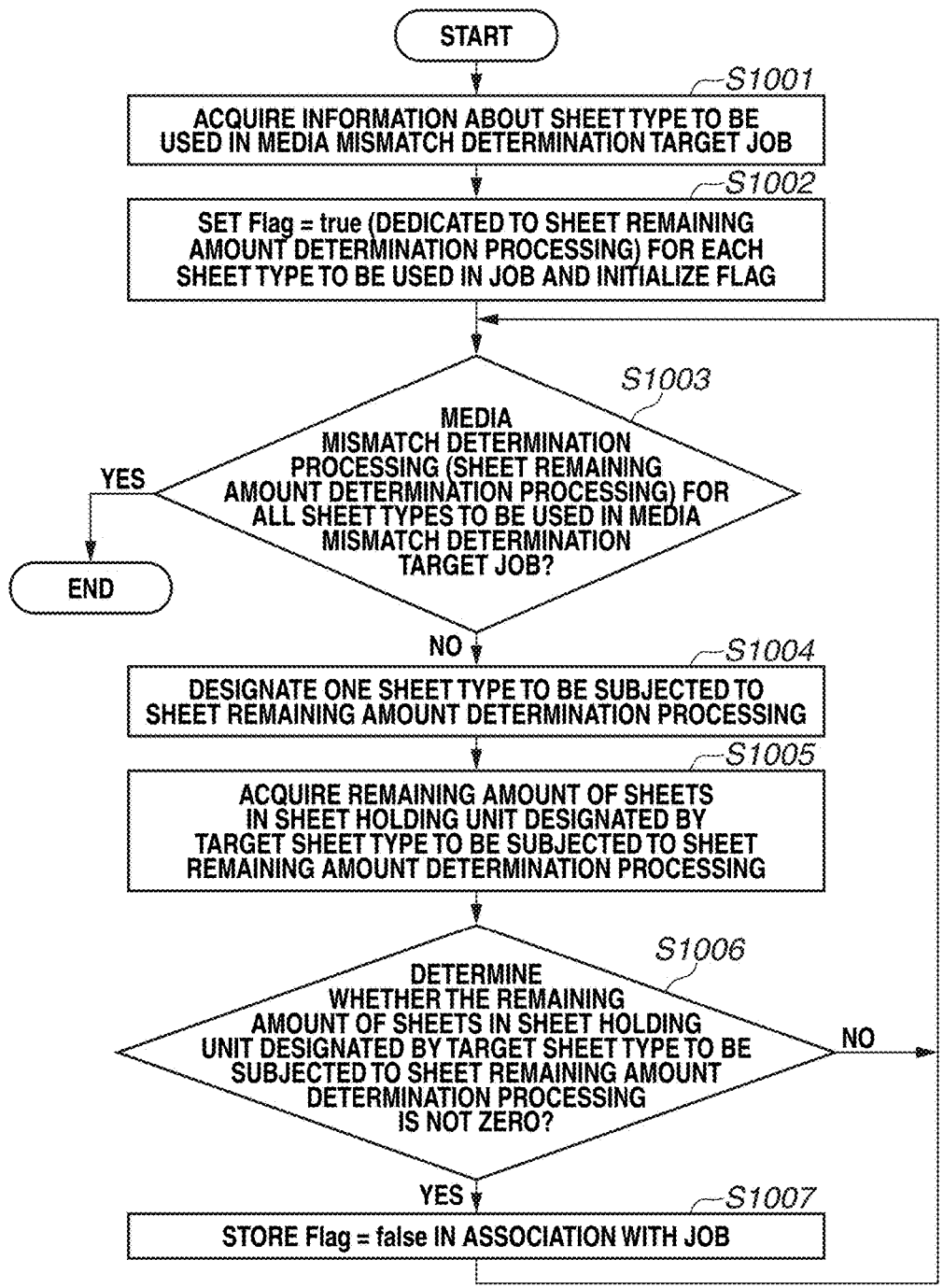
FIG. 10 is a flowchart illustrating media mismatch determination processing (see step S1000) that can be performed by the digital printing machine according to the first exemplary embodiment, when the print job illustrated in FIG. 8 is a sheet holding unit designated job.

On the other hand, if the determination result in step S805 indicates that the target print job is a sheet holding unit designated job (NO in step S805), the operation proceeds to step S1000. FIG. 10 is a flowchart illustrating the media mismatch determination processing that can be performed by the CPU 212 in step S1000 when the target print job to be subjected to the media mismatch determination processing is the sheet holding unit designated job. To attain the above-mentioned processing, the CPU 212 of the controller unit 205 executes the media mismatch determination function program that can be read from the ROM 207 or the HDD 209 and loaded into the RAM 208.

In step S1001, the CPU 212 acquires the number of sheet types whose sheet holding units are designated and used in the print job, as information about sheets used in the print jobs illustrated in FIGS. 17A, 17B, and 17C, with respect to the target print job to be subjected to the media mismatch determination processing. Then, the operation proceeds to step S1002. The CPU 212 sets a flag (Flag) that holds a result of the media mismatch determination (i.e., sheet remaining amount determination) processing for each sheet type acquired in step S1001 and performs initialization processing for the flag being set. However, the Flag being set in step S1002 is a flag that holds a determination result as to whether the remaining amount of sheets to be used in the print job is not zero. The value of Flag is stored in the RAM 208. The Flag having a value "true (remaining amount is zero)" indicates a media mismatch state. More specifically, when the Flag is "true (remaining amount is zero)", it means that the remaining amount of sheets having a sheet type to be used in the print job is zero. In the initialization processing, the Flag is initialized to have an initialization value of true (remaining amount is zero). However, when the target print job is a sheet holding unit designated job, the CPU 212 does not determine whether a sheet to be used in the job is registered to a sheet holding unit designated by the job. Therefore, a sheet type inconsistency determination flag is not used.

Next, the operation proceeds to step S1003. The CPU 212 determines whether the above-mentioned media mismatch determination (i.e., sheet remaining amount determination) processing has been completed for all sheet types of a target print job to be subjected to the media mismatch determination (i.e., sheet remaining amount determination) processing. If the determination result in step S1003 indicates that the media mismatch determination (i.e., sheet remaining amount determination) processing is not yet completed for all sheet types (NO in step S1003), the operation proceeds to step S1004. In step S1004, the CPU 212 designates one target sheet type to be subjected to the media mismatch determination (i.e., sheet remaining amount determination) processing in the print job. Then, the operation proceeds to step S1005. In step S1005, the CPU 212 acquires information about the remaining amount of sheets in the sheet holding unit designated by the target sheet type to be subjected to the sheet remaining amount determination processing and used in the print job, which has been determined in step S1004. The CPU 212 instructs the media management unit 211 to perform the above-mentioned processing in step S1005, for example, with reference to the sheet management table illustrated in FIG. 16. The operation proceeds to step S1006. The CPU 212 determines whether the remaining amount of sheets in the sheet holding unit acquired in step S1005 is not zero. If the determination result in step S1006 indicates that the remaining amount of sheets is not zero (YES in step S1006), the operation proceeds to step S1007. In step S1007, the CPU 212 stores the value of Flag as being "false (remaining amount is not zero)" indicating that the remaining amount of sheets to be used the print job is not zero, in association with the print job. Then, the operation returns to step S1003 to repeat the processing in step S1003 and subsequent steps.

If the determination result in step S1006 indicates that the remaining amount of sheets is zero (NO in step S1006), the operation returns to step S1003 to repeat the processing in step S1003 and subsequent steps.

Further, if the determination result in step S1003 indicates that the media mismatch determination (i.e., sheet remaining amount determination) has been completed for all sheet types of the target print job to be subjected to the media mismatch determination processing (YES in step S1003), the CPU 212 terminates the sequential processing relating to the media mismatch determination to be performed when the target print job is a sheet holding unit designated job. As described above, the CPU 212 performs the media mismatch determination processing in step S1000 illustrated in FIG. 8 if the target print job is a sheet holding unit designated job.

Figure 11:
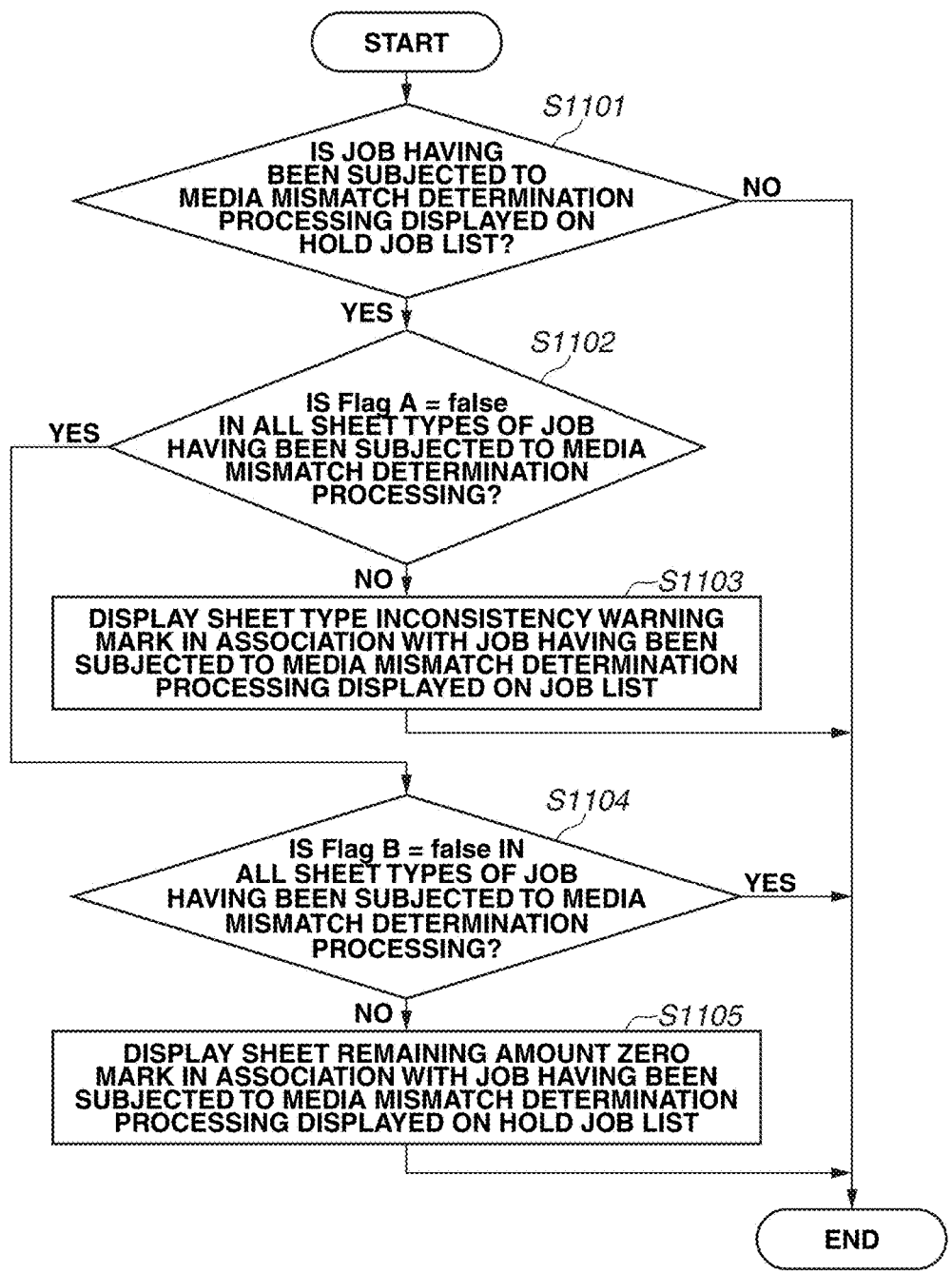
FIG. 11 is a flowchart illustrating media mismatch determination result notification processing illustrated in FIG. 7 (see step S1100) that can be performed by the digital printing machine according to the first exemplary embodiment.

FIG. 11 is a flowchart illustrating the processing to be performed in step S1100 (i.e., the processing to notify a media mismatch determination result in the hold job list 1502). To attain the above-mentioned processing, the CPU 212 of the controller unit 205 executes the UI function program that can be read from the ROM 207 or the HDD 209 and loaded into the RAM 208.

In step S1101, the CPU 212 determines whether the print job having been subjected to the media mismatch determination processing is currently displayed on the hold job list 1502. If it is determined that the print job having been subjected to the media mismatch determination processing is currently displayed on the hold job list 1502 (YES in step S1101), the operation proceeds to step S1102.

In step S1102, the CPU 212 reads the value of Flag A, which is the sheet type inconsistency flag that holds a determination result as to whether attribute information about sheets to be used in the print job having been subjected to the media mismatch determination processing is not registered to any one of the sheet holding units, from the RAM 208. Then, the CPU 212 determines whether the value of Flag A is "false (match)".

If the determination result in step S1102 indicates that the value of Flag A is "true (mismatch)" in at least one sheet type, it indicates a media mismatch (sheet type inconsistent) state. In other words, when the Flag A is "true (mismatch)", it means that a sheet type designated by the print job is not set in any one of the sheet holding units. Accordingly, if the Flag A is "true (mismatch)" (NO in step S1102), the operation proceeds to step S1103. For example, as illustrated in FIG. 18, the CPU 212 displays an inconsistency warning mark 1806 indicating the media mismatch state in the entry of the print job on the hold job list 1502 in association with the print job. The inconsistency warning mark 1806 indicates that the sheet having the sheet type (e.g., size and media type) to be used in the print job is not set in any one of the sheet holding units. Then, the CPU 212 terminates the sequential media mismatch determination result notification processing.

On the other hand, if the determination result in step S1102 indicates that the value of Flag A is "false" in each sheet type (YES in step S1102), the operation proceeds to step S1104. In step S1104, the CPU 212 reads the value of Flag B from the RAM 208 and determines whether the value of Flag B is "false (remaining amount is not zero)". The Flag B is the flag that holds a sheet remaining amount determination result as to whether the remaining amount of sheets to be used the print job having been subjected to the media mismatch determination processing is zero.

If the determination result in step S1104 indicates that the value of Flag B is "true (i.e., the remaining amount is zero)" in at least one sheet type, it indicates the media mismatch (i.e., sheet remaining amount zero) state. In other words, the CPU 212 determines that the remaining amount of sheets having the sheet type to be used in the print job is zero. Accordingly, if it is determined that the value of Flag B is true (NO in step S1104), the operation proceeds to step S1105. For example, as illustrated in FIG. 18, the CPU 212 displays a sheet remaining amount zero mark 1805 indicating the media mismatch state in the entry of the print job on the hold job list 1502 in association with the print job. The sheet remaining amount zero mark 1805 indicates that the remaining amount of the sheet to be used in the print job is zero although the sheet is set to the sheet holding unit. Then, the CPU 212 terminates the sequential media mismatch determination result notification processing. On the other hand, if the determination result in step S1104 indicates that the value of Flag B is "false (i.e., the remaining amount is not zero)" in each sheet type, it indicates that the remaining amount of sheets is not zero in all sheet types to be used in the print job. Therefore, the CPU 212 terminates the sequential media mismatch determination result notification processing.

An example of the operation screen that can be displayed by the digital printing machine 102 according to the first exemplary embodiment, after the media mismatch determination result is notified on the hold job list 1502, is described in detail below with reference to FIG. 18. The screen illustrated in FIG. 18 is an example that can be displayed immediately after an operator A operates the job hold function operation screen displayed on the operation unit 204 to select a print job. Each portion, if it is similar to that illustrated in FIG. 15, is denoted by the same symbol. According to the example illustrated in FIG. 18, the operator A successively selects Job A, Job D, and Job E and therefore each of these jobs is in a selected state. More specifically, each of selection marks 1801, 1802, and 1803 indicates the selected state of a corresponding job if it is displayed on the left side of the job name field. Further, a numerical value indicating the selection order is suffixed to each selection mark. Further, a lastly selected Job E 1804 is displayed reversely to indicate that the Job E 1804 is currently selected on the hold job list 1502. More specifically, if the details/change button 1507 is pressed in the above-mentioned state, it becomes feasible to confirm detailed information and change the settings about the Job E.

In FIG. 18, the media mismatch determination is performed for each of three jobs (i.e., Job A, Job D, and Job E) having been selected by the user, to check whether a sheet to be used in each print job matches with the sheet having been set to the sheet holding unit of the digital printing machine 102.

For example, the sheets to be used in the print job "Job A" are set to the sheet holding units as illustrated in FIGS. 16 and 17 and the remaining amount of sheets is not zero in each sheet holding unit. Therefore, none of the sheet remaining amount zero mark 1805 and the inconsistency warning mark 1806 is not displayed for the Job A. In this case, before instructing start of printing, the user can know that the possibility of causing a media mismatch is extremely low if the user presses the print start button 1508.

Further, the sheets to be used in the print job "Job D" are set to the sheet holding units as illustrated in FIGS. 16 and 17. However, the remaining amount of sheets is zero in at least one of the sheet holding units. More specifically, the remaining amount of sheets having the size "11×17" and the media type "plain paper 1" is 0 although the sheets are set to a "sheet holding unit 9". Accordingly, if the user presses the print start button 1508 in the above-mentioned state, the media mismatch (i.e., the sheet remaining amount zero state) occurs at the sheet supply timing of the above-mentioned sheet being "11×17" sized and therefore the print processing stops. Accordingly, a display of the sheet remaining amount zero mark 1805 appears on the right side in the display field of Job D. When the user recognizes the sheet remaining amount zero mark 1805 displayed on the list, the user can perform an appropriate preparatory operation. More specifically, the user can replenish the sheet holding unit 9 with a sufficient amount of sheets having the size "11×17" and the media type "plain paper 1.

Further, at least one of the sheets to be used in the print job "Job E" is not set to any one of the sheet holding units as illustrated in FIGS. 16 and 17. More specifically, the sheet of "A3" in the size and "two-sided coated paper 2" in the media type is not set to any one of the sheet holding units. Accordingly, a display of the inconsistency warning mark 1806 appears on the right side in the display field of Job E. If the user presses the details/change button 1507 in the state illustrated in FIG. 18, the size and media type information about the sheets to be used in the selected Job E can be displayed, for example, as illustrated in FIG. 17C. In this case, the media information that is not set in any one of the sheet holding units (A3 and two-sided coated paper in the present exemplary embodiment) is, for example, reversely displayed to notify the user of each sheet being not set to any one of the sheet holding units. Accordingly, before instructing start of printing, the user can know that the media mismatch (i.e., sheet type inconsistency state) may occur at the sheet feeding timing and the print job may stop if the user presses the print start button 1508 in the above-mentioned state. When the user confirms the above-mentioned mark 1806 displayed on the list, the user can perform an appropriate preparatory operation. More specifically, the user can designate another sheet holding unit (preferably, a sheet holding unit that is not determined to use in the print job) and change the settings of the designated sheet holding unit to include A3 in the sheet size and "two-sided coated paper 2" in the media type. Further, the user can replenish the designated sheet holding unit with the corresponding sheet. In this case, if there is any sheet remaining in the sheet holding unit, the user can remove all of the remaining sheets.

In the present exemplary embodiment, the sheet remaining amount zero mark 1805 and the inconsistency warning mark 1806 are differentiated from each other in the shape. Therefore, the user can discriminate and recognize whether the sheet to be used in the job is not set in any one of the sheet holding units or whether the remaining amount is zero although the sheet to be used in the job is set. When the media mismatch determination is performed as mentioned above, it becomes feasible to enable the user to prevent the print job from being stopped because the warning mark 1805 or 1806 is displayed in association with the print job that may cause a media mismatch.

Further, if the user selects the Job D and presses the details/change button 1507 in the state illustrated in FIG. 18, information about sheet size and media type of sheets to be used in the Job D can be displayed as illustrated in FIG. 17B. In this case, the CPU 212 blinks sheet information if the remaining amount of sheets is zero. Further, the CPU 212 blinks the sheet holding unit to which the corresponding sheet is set. Thus, the user can identify the information about sheet size and media type of each sheet to be used in the Job D, if the remaining amount is zero, together with the sheet holding unit that stores the identified sheet. As mentioned above, even in a case where the sheet size and the media type are displayed, the CPU 212 differentiates the way of displaying sheet information when the sheet is not set in any one of the sheet holding units from the way of displaying sheet information when the remaining amount of sheets is zero. Accordingly, the user can discriminate and confirm whether the sheet having the displayed size and type is not set in any one of the sheet holding units and whether the remaining amount of sheets is zero. In this case, the printing system reversely displays the media information that is not set in any one of the sheet holding units and blinks the information about each sheet if the remaining amount thereof is zero. However, the present exemplary embodiment can be modified in the following manner. For example, it is feasible to display the sheet information in association with the sheet remaining amount zero mark 1805 or the inconsistency warning mark 1806.

As mentioned above, the media mismatch determination processing for a target job includes comparison with the content of each sheet holding unit ID 1611 registered to the sheet management table 631, for one sheet ID 622 registered to the job attribute details table 621. Therefore, when the target job uses a plurality of types of sheets, the printing system repeats the above-mentioned processing for each sheet ID 622 registered to the job attribute details table 621. More specifically, the printing system is required to repetitively perform comparison with the content of each sheet holding unit ID 1611 registered to the sheet management table 631.

On the other hand, it is desired that the printing system performs monitoring to check the media mismatch state in real time after the media mismatch determination processing is once performed in response to a pressing of the media mismatch determination button 1504 until the print execution instruction is input. However, to monitor the state in real time, it is necessary to periodically and repetitively perform the media mismatch determination based comparison processing. Accordingly, if the CPU or the memory of the printing apparatus is insufficient in performance, it will be difficult to perform the real-time monitoring.

However, even when the CPU and the memory of the printing apparatus are insufficient in their capabilities, it is desired to notify the user of the changed media mismatch state after the media mismatch determination processing is once performed until the print execution instruction is input. Therefore, the technique described in the present exemplary embodiment is characterized by notifying the user of the changed media mismatch state after the media mismatch determination processing is once performed until the print execution instruction is input, even when the CPU and the memory of the printing apparatus are insufficient in their capabilities.

Figure 12:
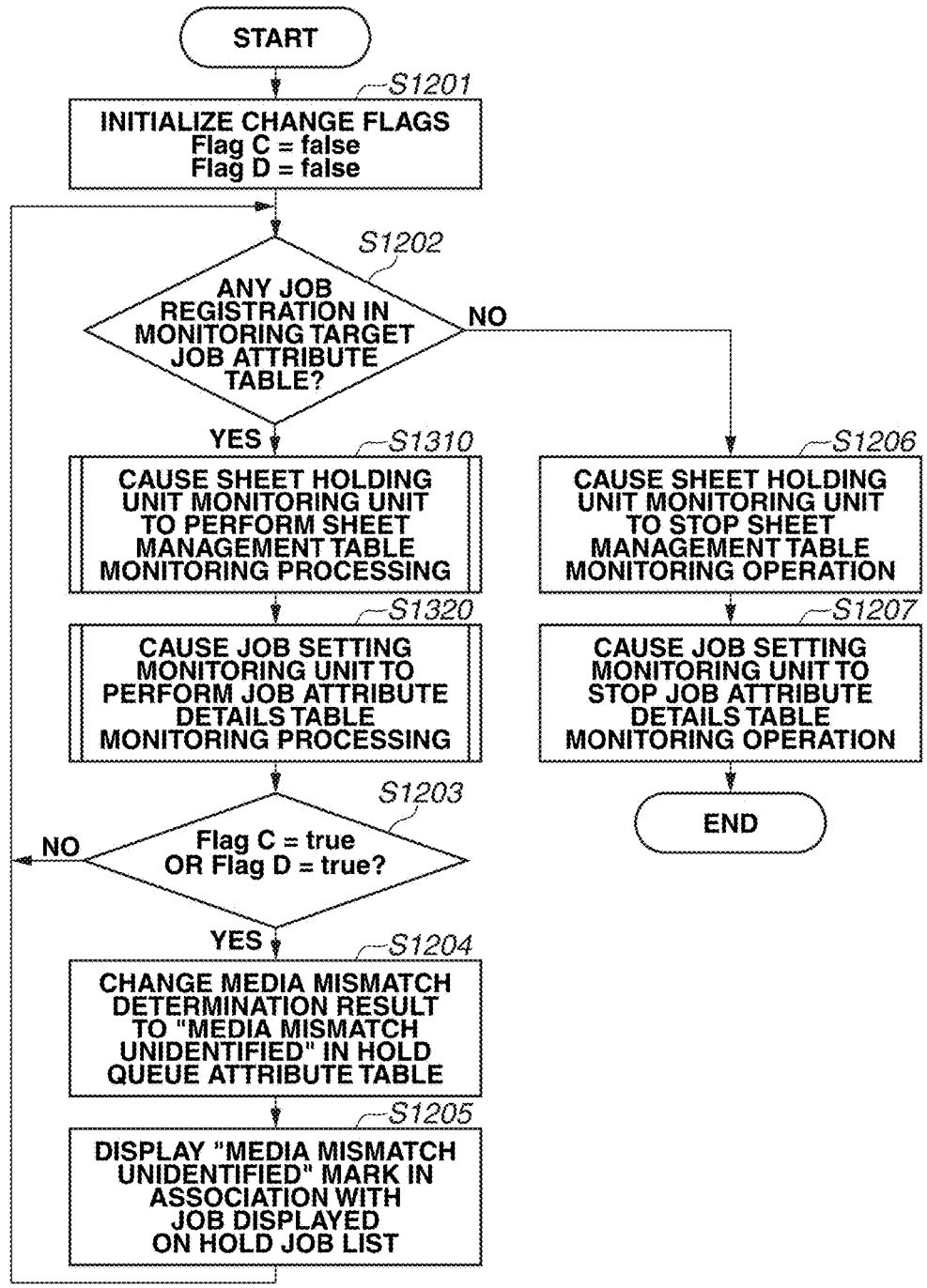
FIG. 12 is a flowchart illustrating sequential monitoring processing that can be performed by a sheet holding unit monitoring unit and a job setting monitoring unit of the digital printing machine according to the first exemplary embodiment.

FIG. 12 is a flowchart illustrating sequential processing for monitoring the sheet management table 631, which can be performed by the sheet holding unit monitoring unit 213, and monitoring the job attribute details table 621, which can be performed by the job setting monitoring unit 214, as described in detail below. To attain the above-mentioned processing, the CPU 212 of the controller unit 205 executes the UI function program that can be read from the ROM 207 or the HDD 209 and loaded into the RAM 208.

First, in step S1201, the CPU 212 initializes a setting value of Flag C, which is a flag indicating whether a value registered to the monitoring job attribute table 611 is different from a value registered to the sheet management table 631. Further, the CPU 212 initializes a setting value of Flag D, which is a flag indicating whether a value registered to the monitoring job attribute table 611 is different from a value registered to the job attribute details table 621. More specifically, the CPU 212 sets the value of Flag C to "false (not different)" and sets the value of Flag D to "false (not different)". Then, the operation proceeds to step S1202. The CPU 212 determines whether there is any job registered to the monitoring job attribute table 611. If the determination result in step S1202 indicates that there is at least one job registered to the monitoring job attribute table 611 (YES in step S1202), the operation proceeds to step S1310.

The processing to be performed in step S1310 (i.e., the operation to monitor the sheet management table 631), which can be performed by the sheet holding unit monitoring unit 213, is described in detail below with reference to a flowchart illustrated in FIG. 13A. To attain the above-mentioned processing, the CPU 212 of the controller unit 205 executes the sheet holding unit monitoring program that can be read from the ROM 207 or the HDD 209 and loaded into the RAM 208.

Figure 13A:
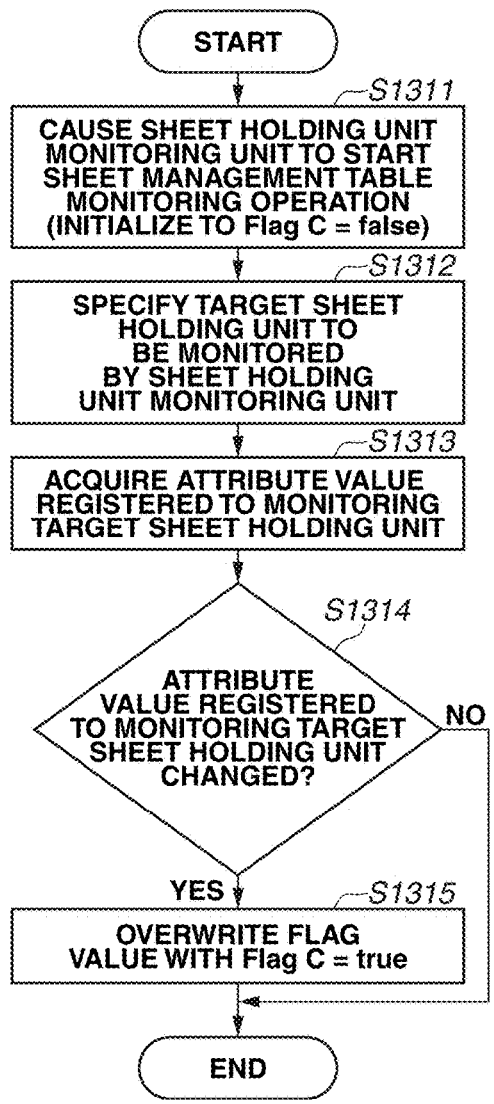
FIGS. 13A and 13B are flowcharts illustrating a monitoring operation (step S1310) that can be performed by the sheet holding unit monitoring unit and a monitoring operation (step S1320) that can be performed by the job setting monitoring unit in the digital printing machine, which are illustrated in FIG. 12, according to the first exemplary embodiment.

In step S1311 of FIG. 13A, the CPU 212 causes the sheet holding unit monitoring unit 213 to start monitoring the sheet management table 631. In this case, the CPU 212 overwrites the value of the Flag C (i.e., the change flag indicating whether an attribute value of the sheet management table 631 has changed) with "false (there is not any change)". Then, the operation proceeds to step S1312. The CPU 212 acquires sheet holding unit information, which is registered to the monitoring condition 1 (column 613) of the monitoring job attribute table 611. Then, the CPU 212 collects sheet holding unit information registered to the monitoring condition 1 (column 613), for all jobs registered to a monitoring target job attribute table 1611. Thus, the target sheet holding unit to be monitored by the sheet holding unit monitoring unit 213 can be specified. For example, the CPU 212 entirely collects the sheet holding unit information registered to the monitoring condition 1 (column 613) for three jobs registered to the monitoring job attribute table 611 illustrated in FIG. 6A. As a result of the above-mentioned processing, the CPU 212 specifies each of the sheet holding unit 1, the sheet holding unit 2, the sheet holding unit 3, and the sheet holding unit 5 as the target sheet holding unit to be subjected to the monitoring processing.

Subsequently, the operation proceeds to step S1313. The CPU 212 acquires the attribute value (e.g., size 633 and media type 634) registered to the monitoring target sheet holding unit specified in step S1312 from the sheet management table 631. Then, the operation proceeds to step S1314. The CPU 212 determines whether the attribute value registered to the monitoring target sheet holding unit has changed in the sheet management table 631. If the determination result in step S1314 indicates that the attribute value has changed (YES in step S1314), the operation proceeds to step S1315. The CPU 212 overwrites the value of Flag C with "true (there is a change)" to indicate that the attribute value has changed. Then, the CPU 212 terminates the sequential processing in step S1310. The operation proceeds to step S1320 illustrated in FIG. 12. On the other hand, if the determination result in step S1314 indicates that the attribute value has not changed (NO in step S1314), the CPU 212 terminates the sequential processing in step S1310. Subsequently, the operation proceeds to step S1320 illustrated in FIG. 12.

The processing to be performed in step S1320 (i.e., the operation to monitor the sheet attribute details table 621), which can be performed by the job setting monitoring unit 214, is described in detail below with reference to a flowchart illustrated in FIG. 13B. To attain the above-mentioned processing, the CPU 212 of the controller unit 205 executes the job setting monitoring program that can be read from the ROM 207 or the HDD 209 and loaded into the RAM 208.

Figure 13B:
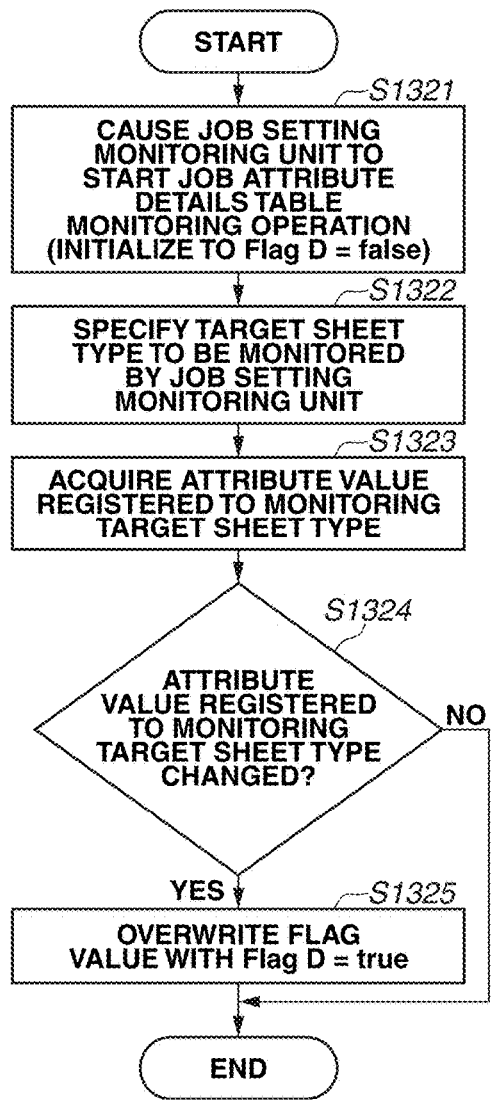

In step S1321 of FIG. 13B, the CPU 212 causes the job setting monitoring unit 214 to start monitoring the sheet attribute details table 621. In this case, the CPU 212 overwrites the value of the Flag D (i.e., the change flag indicating whether an attribute value of the job attribute details table 621 has changed) with "false (there is not any change)". Then, the operation proceeds to step S1322. The CPU 212 acquires sheet type information defined by a combination of sheet size and media type, which is registered to the monitoring condition 2 (column 614) of the monitoring job attribute table 611. The CPU 212 specifies a sheet type to be monitored by the job setting monitoring unit 214. For example, according to the monitoring job attribute table 611 illustrated in FIG. 6A, the CPU 212 specifies each of A4 plain paper 1, A4 coated paper 1, A3 plain paper 1, and A4 tab paper, as four sheet types to be subjected to the monitoring processing for three jobs registered to the monitoring job attribute table 611.

Subsequently, the operation proceeds to step S1323. The CPU 212 acquires setting information about attribute value (i.e., a combination of size designation 624 and media type designation 625) of the job registered to the job attribute details table 621.

Then, the operation proceeds to step S1324. The CPU 212 determines whether the attribute value of the monitoring target job registered to the job attribute details table 621 has changed. If the determination result in step S1324 indicates that the attribute value has changed (YES in step S1324), the operation proceeds to step S1325. The CPU 212 overwrites the value of Flag D with "true (there is a change)" to indicate that the attribute value has changed. Then, the CPU 212 terminates the sequential processing in step S1320. Then, the operation proceeds to step S1203. On the other hand, if the determination result in step S1324 indicates that the attribute value has not changed (NO in step S1324), the CPU 212 terminates the sequential processing in step S1320. Subsequently, the operation proceeds to step S1203.

In step S1203, the CPU 212 determines whether the value of Flag C is "true (there is a change)" or the value of Flag D is "true (there is a change)". If the determination result in step S1203 indicates that at least one of the values of Flag C and Flag D is "true (there is a change)" (YES in step S1203), the operation proceeds to step S1204. In step S1204, the CPU 212 changes the value of a media mismatch determination identification flag 532b to "media mismatch unidentified" state in the hold queue job attribute table 532. In this case, the "media mismatch unidentified" state indicates a state where the validity of a determination result "media mismatch nonexistence", which is an execution result of the media mismatch processing, has expired. Then, the operation proceeds to step S1205. The CPU 212 displays a media mismatch unidentified mark 1901 (i.e., a mark indicating the "media mismatch unidentified" state) in the entry of the processed print job in the hold job list 1502, in association with the processed print job. Subsequently, the operation returns to step S1202. On the other hand, if the determination result in step S1203 indicates that each of the values of Flag C and Flag D is false (NO in step S1203), the operation returns to step S1202.

On the other hand, if the determination result in step S1202 indicates that there is not any job registered to the monitoring job attribute table 611 (NO in step S1202), the operation proceeds to step S1206. In step S1206, the CPU 212 causes the sheet holding unit monitoring unit 213 to stop monitoring the sheet management table 631. Then, the operation proceeds to step S1207. In step S1207, the CPU 212 causes the job setting monitoring unit 214 to stop monitoring the job attribute details table 621. Then, the CPU 212 terminates the sequential processing for monitoring the sheet management table 631 (i.e., the processing to be performed by the sheet holding unit monitoring unit 213) and monitoring the job attribute details table 621 (i.e., the processing to be performed by the job setting monitoring unit 214).

Figure 19:
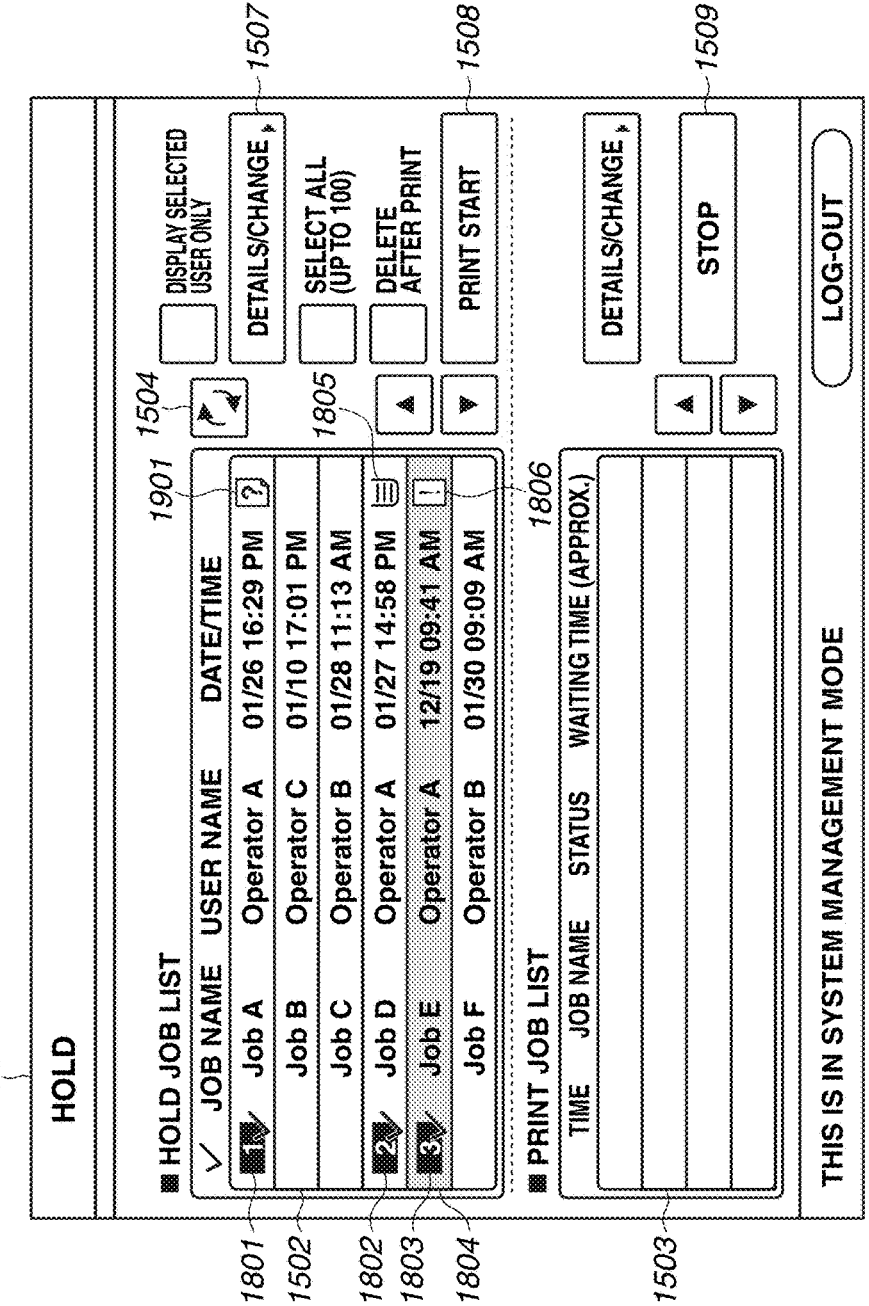
FIG. 19 illustrates an example of the job hold function operation screen, which can be displayed on the operation unit of the digital printing machine according to the first exemplary embodiment.

An example of the operation screen of the digital printing machine 102 according to the first exemplary embodiment, which can be displayed after the media mismatch unidentified mark 1901 is added to the hold job list, is described in detail below with reference to FIG. 19. In a hold job list illustrated in FIG. 19, portions similar to those illustrated in FIGS. 15 and 18 are denoted by the same symbols. The hold job list illustrated in FIG. 19 is different from the hold job list illustrated in FIG. 18 and the hold job list illustrated in FIG. 19 in that the media mismatch unidentified mark 1901 is displayed on the right side in the display field of Job A. For example, when the sheet to be used in the Job A (see FIG. 17A) changes from "A4 plain paper 1" to "A3 plain paper 1" and job attribute setting is changed, the state of Job A changes from the "media mismatch nonexistence" state to the "media mismatch unidentified" state.

Through the above-mentioned processing flow, if an attribute value changes in response to a change in the sheet holding unit registration settings or a change in the job attribute settings, the printing system changes the state of the job from the "media mismatch nonexistence" state to the "media mismatch unidentified" state and displays the updated state. Therefore, the user can confirm that the job being not in the media mismatch state, determined as a result of the media mismatch determination processing, has shifted into the "media mismatch unidentified" state. The user can operate the printing system to perform the media mismatch determination processing on the above-mentioned job being in the "media mismatch unidentified" state. As a result of the media mismatch determination processing performed again, if a media mismatch occurs, the user can perform a work capable of eliminating the media mismatch state. Through the above-mentioned work, the user can start printing in the "media mismatch nonexistence" state.

If there is any change in the attribute value registered to the monitoring target sheet holding unit or the attribute value registered to the monitoring target sheet type, the printing system displays the media mismatch unidentified icon 1901 in the above-mentioned processing in step S1205 illustrated in FIG. 12. However, the present exemplary embodiment can be modified in the following manner. For example, if it is determined that any change occurs in the attribute value registered to the monitoring target sheet holding unit or in the attribute value registered to the monitoring target sheet type, the operation can proceed to step S800 illustrated in FIG. 8 to cause the CPU 212 to perform the media mismatch determination processing again. Further, when the media mismatch determination processing is performed again, the operation can proceed to the above-mentioned step S1100 illustrated in FIG. 8 to update and notify the result of the media mismatch determination processing.

Further, in the above-mentioned step S704, the CPU 212 registers only the job being not media mismatch, which has been determined in the media mismatch determination processing performed in step S800, to the monitoring job attribute table 611. However, the present exemplary embodiment can be modified in the following manner. For example, the CPU 212 can register all jobs having been subjected to the media mismatch determination processing in step S800 to the monitoring job attribute table 611.

The CPU 212 repeats the above-mentioned monitoring processing if the determination result in step S1202 indicates that there is a job registered to the monitoring job attribute table 611. However, the present exemplary embodiment can be modified in the following manner. For example, the CPU 212 can be configured to start the monitoring operations in steps S1310 and S1320 in response to a change in the setting value of the sheet management table 631 or the job attribute details table 621. This is useful in that the number of determinations to be performed in the above-mentioned monitoring processing can be reduced, especially in a case where the CPU and the memory of the printing apparatus are insufficient in their capabilities.

However, if the result of the media mismatch determination processing indicates that the sheet type inconsistency occurs in a target job, the printing system displays the inconsistency warning mark 1806 in association with the job to notify the result of the media mismatch determination processing. Further, if the "sheet remaining amount zero" state occurs in a target job, the printing system displays the sheet remaining amount zero mark 1805 in association with the job to notify the "sheet remaining amount zero" state. However, the present exemplary embodiment can be modified in the following manner. For example, any other mark (or sound or light) is usable if it can be recognized by a user to confirm the above-mentioned situation that the sheet type inconsistency occurs or the remaining amount of sheets is zero in the currently processed job, before instructing the execution of the job.

In the above-mentioned first exemplary embodiment, after performing the media mismatch determination processing, the printing system registers the job being in the "media mismatch nonexistence" state in the monitoring job attribute table 611. Then, the printing system registers attribute values of all sheet types to be used in the job to the monitoring condition 2 (614), for each job registered to the monitoring job attribute table 611, and performs monitoring processing.

On the other hand, a printing system according to a second exemplary embodiment is characterized by registering only the sheet type being in the media mismatch state to the monitoring job attribute table, for a job being in the media mismatch state that have been determined in the media mismatch determination processing. The printing system according to the second exemplary embodiment can notify a user about a situation that a job determined as being in the media mismatch state through the media mismatch determination processing has subsequently changed into a "media mismatch unidentified" state, as described below.

Similar to the printing system described in the first exemplary embodiment, the printing system according to the second exemplary embodiment is configured to include the digital printing machine 102 and the computer 101 that are connected via the network 100. Further, a functional block diagram illustrating a functional configuration of the digital printing machine 102 according to the second exemplary embodiment and a block diagram illustrating a configuration of the computer (PC) 101 according to the second exemplary embodiment are similar to those described in the first exemplary embodiment. Therefore, redundant description thereof will be avoided. A series of flowcharts that describe processing to be performed by the digital printing machine 102 according to the second exemplary embodiment are similar to those described in the first exemplary embodiment (see FIGS. 7 to 13). Therefore, redundant description thereof will be avoided.

Figure 7:
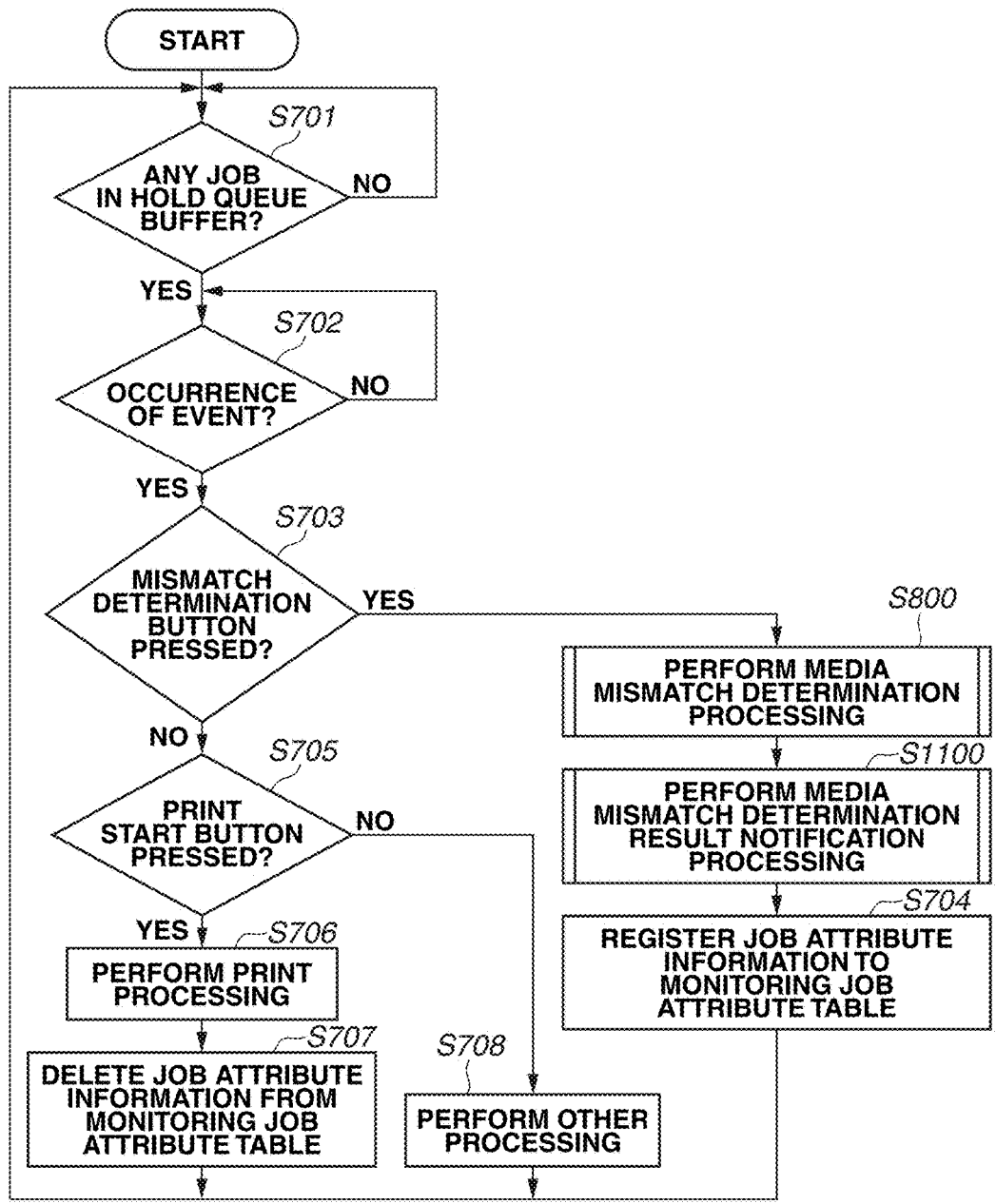
FIG. 7 is a flowchart illustrating sequential processing relating to media mismatch determination, which can be performed by the digital printing machine according to the first exemplary embodiment.

In the second exemplary embodiment, attribute information about a job to be registered to the monitoring job attribute table in step S704 illustrated in FIG. 7 is described in detail below with reference to a monitoring job attribute table 2011 illustrated in FIG. 20. In FIG. 20, portions similar to those illustrated in FIG. 6A are denoted by the same symbols. Further, a job details table that can be referred to in the monitoring processing to be performed in the second exemplary embodiment is similar to that illustrated in FIG. 6B. A sheet management table is similar to that illustrated in FIG. 6C.

The monitoring job attribute table 2011 illustrated in FIG. 20 includes a job having a job ID value "00001009", which has been determined as being in the media mismatch state in step S800 illustrated in FIG. 7 and registered in step S704. The above-mentioned job is a job determined as being mismatch (media mismatch is present) with respect to the "sheet 2" to be used in the job, as understood from the job attribute details table 621 illustrated in FIG. 6B. Therefore, the monitoring job attribute table 2011 includes ID information "sheet 2" of the sheet determined as being in the media mismatch state in the media mismatch determination processing, as a registered value stored in the column of the monitoring condition 3 (column 615) of the monitoring job attribute table 2011. Further, the monitoring job attribute table 2011 includes an attribute value "AUTO" (sheet type designation) relating to the sheet holding unit determination method for the "sheet 2" (i.e., the sheet to be used in the job), as a registered value stored in the column of the monitoring condition 1 (column 613). Further, the monitoring job attribute table 2011 includes an attribute value "A4 coated paper 3" relating to the combination of size designation and media designation (i.e., sheet type information) of the "sheet 2" (i.e., the sheet to be used in the job), as a registered value stored in the column of the monitoring condition 2 (column 614).

A sheet management table monitoring operation (i.e., the processing in step S1310) according to the second exemplary embodiment, which can be performed by the sheet holding unit monitoring unit 213, is described in detail below with reference to the flowchart illustrated in FIG. 13A, mainly about characteristic features not described in the first exemplary embodiment. To attain the above-mentioned processing, the CPU 212 of the controller unit 205 executes the job setting monitoring program that can be read from the ROM 207 or the HDD 209 and loaded into the RAM 208.

In step S1312, the CPU 212 acquires the sheet holding unit information registered to the monitoring condition 1 (column 613) of the monitoring job attribute table 2011. Then, the CPU 212 collects the sheet holding unit information registered to the monitoring condition 1 (column 613) for all jobs registered to the monitoring job attribute table 2011. Thus, the target sheet holding unit to be monitored by the sheet holding unit monitoring unit 213 can be specified. For example, in the monitoring job attribute table 2011 illustrated in FIG. 20, the number of registered jobs is only one. As a result of collecting the sheet holding unit information registered to the monitoring condition 1 (column 613), the target sheet holding unit to be subjected to the monitoring processing can be specified as being "not present". The reason why the target sheet holding unit to be subjected to the monitoring processing can be specified as being "not present" is because the sheet holding unit information registered to the monitoring condition 1 (613) is only AUTO (sheet type designation). Processing to be performed in steps S1311 to S1315 is similar to the processing described in the first exemplary embodiment. Therefore, redundant description thereof will be avoided.

Subsequently, a job attribute details table monitoring operation (i.e., the processing in step S1320) according to the second exemplary embodiment, which can be performed by the job setting monitoring unit 214, is described in detail below with reference to the flowchart illustrated in FIG. 13B, mainly about characteristic features not described in the first exemplary embodiment. To attain the above-mentioned processing, the CPU 212 of the controller unit 205 executes the job setting monitoring program that can be read from the ROM 207 or the HDD 209 and loaded into the RAM 208.

In step S1322, the CPU 212 acquires the combined information about sheet size and media type (i.e., sheet type information) registered to the monitoring condition 2 (column 614) from the monitoring job attribute table 2011. For example, the CPU 212 collects the combined information about sheet size and media type (i.e., sheet type information) registered to the monitoring condition 2 (column 614) of the monitoring job attribute table 2011 illustrated in FIG. 20. As a result of the above-mentioned processing, only one type "A4 coated paper 3" can be specified as the monitoring target sheet type. Processing to be performed in steps S1321 to S1325 is similar to the processing described in the first exemplary embodiment. Therefore, redundant description thereof will be avoided.

As mentioned above, the printing system according to the second exemplary embodiment determines whether a job determined as being in the media mismatch state through the media mismatch determination processing has subsequently changed into the "media mismatch unidentified" state in response to a change of settings of the job.

As a display of the job being in the media mismatch unidentified state, the printing system changes the warning marks 1805 and 1806 to the media mismatch unidentified mark 1901. In this case, the "media mismatch unidentified" state indicates that the validity of the "media mismatch presence" state (i.e., the execution result obtained in the media mismatch determination processing) has expired. Therefore, the user can operate the printing system to perform the media mismatch determination processing again on the job being in the "media mismatch unidentified" state. If an execution result of the media mismatch determination processing performed again indicates an occurrence of media mismatch, the user can perform the work capable of eliminating the media mismatch state. Through the above-mentioned work, the user can start printing in the "media mismatch nonexistence" state.

As mentioned above, the printing system according to the present exemplary embodiment changes the warning marks 1805 and 1806 to the "media mismatch unidentified" state mark 1901 as the display of the job being in the media mismatch unidentified state. However, the present exemplary embodiment can be modified in the following manner. If the job determined as being in the media mismatch state through the media mismatch determination processing is subsequently determined as being in the media mismatch unidentified state, the printing system can delete the display of the warning marks 1805 and 1806 associated with the entry of the job.

In this case, the printing system according to the present exemplary embodiment uses the same mark 1901 to indicate a transition from the "media mismatch nonexistence" state to the "media mismatch unidentified" state and a transition from the "media mismatch presence" state to the "media mismatch unidentified" state. However, the present exemplary embodiment can be modified in the following manner. The printing system according to the present exemplary embodiment can use mutually different marks to discriminate and recognize each of the transition from the "media mismatch nonexistence" state to the "media mismatch unidentified" state and the transition from the "media mismatch presence" state to the "media mismatch unidentified" state.

If a significant time elapses after the media mismatch determination processing has been completed, a different operator may use the printing system or the remaining amount of sheets stored in a sheet holding unit may decrease or the sheets may be removed entirely.

Therefore, in a third exemplary embodiment, the expiration date is introduced with respect to the media mismatch determination result of a job having been subjected to the media mismatch determination processing.

Similar to the printing system described in the first exemplary embodiment, a printing system according to the third exemplary embodiment is configured to include the digital printing machine 102 and the computer 101 that are connected via the network 100. Further, a functional block diagram illustrating a functional configuration of the digital printing machine 102 according to the third exemplary embodiment and a block diagram illustrating a configuration of the computer (PC) 101 according to the third exemplary embodiment are similar to those described in the first exemplary embodiment. Therefore, redundant description thereof will be avoided.

However, in the third exemplary embodiment, an expiration date determination program is added as the program that can be executed by the digital printing machine 102 as described below. The expiration date determination program is a program to be executed to determine the validity with respect to the media mismatch determination result of each job being subjected to the media mismatch determination processing, according to predetermined conditions received via an expiration date setting screen 2601 illustrated in FIG.

26. Information about the determination result obtained by the expiration date determination program is stored in the HDD 209.

Hereinafter, sequential processing relating to the media mismatch determination, which can be performed on a job stacked in the hold queue buffer 531 according to the third exemplary embodiment, is described in detail below with reference to a flowchart illustrated in FIG. 21. To attain the above-mentioned processing, the CPU 212 of the controller unit 205 executes the expiration date determination program that can be read from the ROM 207 or the HDD 209 and loaded into the RAM 208.

Figure 21:
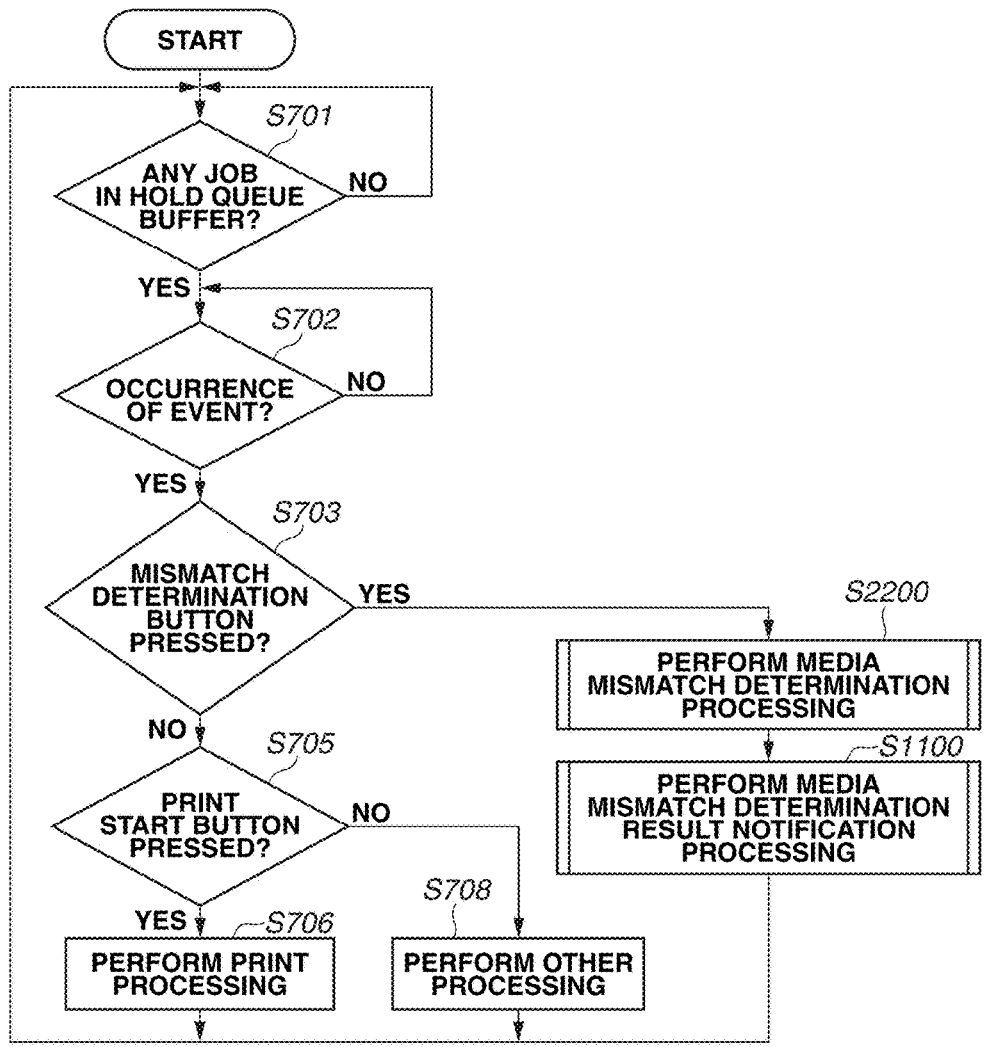
FIG. 21 is a flowchart illustrating sequential processing relating to media mismatch determination, which can be performed by a digital printing machine according to a third exemplary embodiment.

In FIG. 21, portions similar to those illustrated in FIG. 7, which is the sequential processing relating to the media mismatch determination according to the first exemplary embodiment, are denoted by the same symbols. Therefore, redundant description thereof will be avoided.

In the third exemplary embodiment, as another processing that can be performed in step S708, it is feasible to open the expiration date setting screen 2601 relating to the media mismatch determination result in response to a pressing of the setting change button 2503. The processing that can be performed using the expiration date setting screen 2601 illustrated in FIG. 26 is described in detail below.

Figure 22:
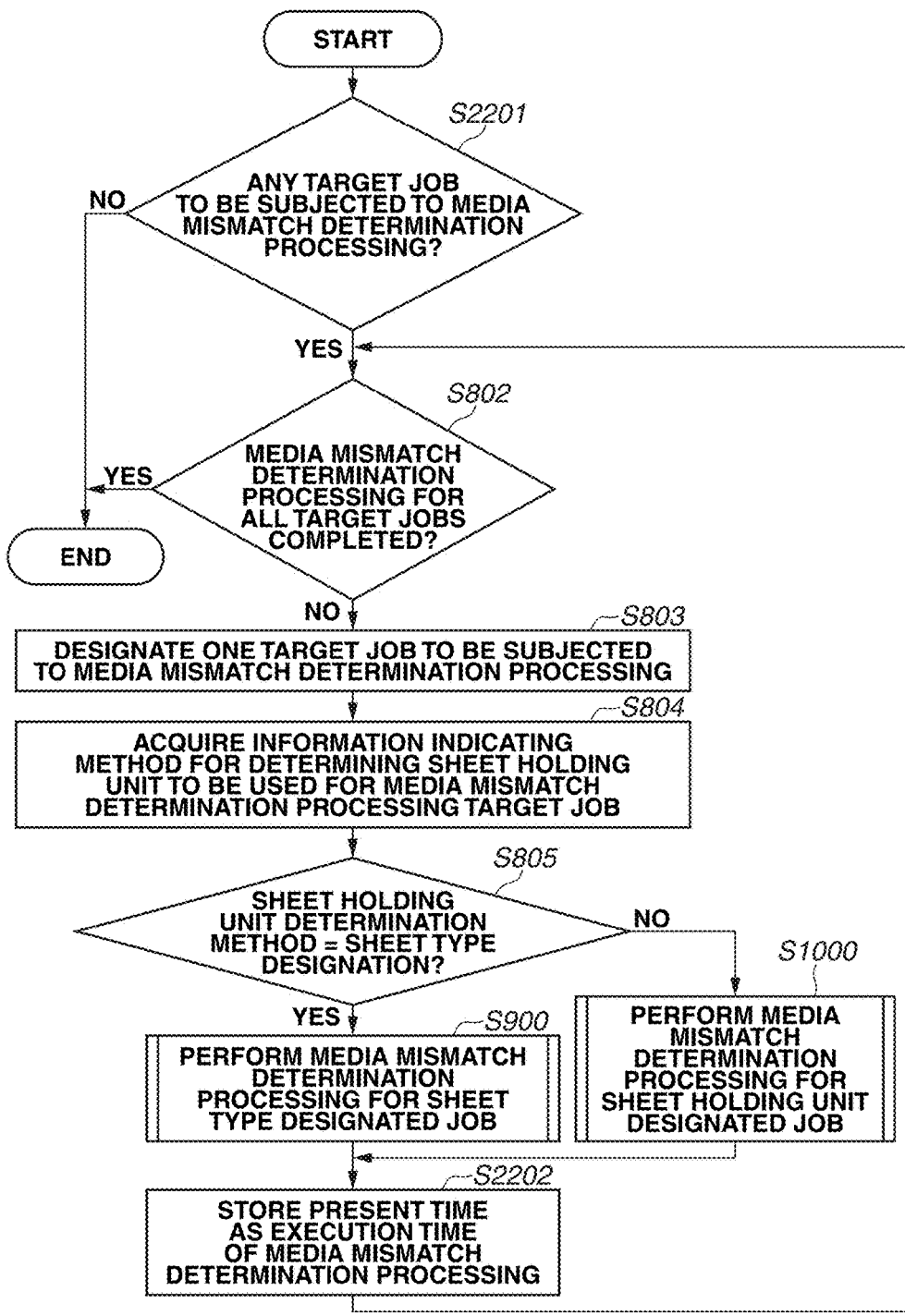
FIG. 22 is a flowchart illustrating media mismatch determination processing (see step S2200), which can be performed by the digital printing machine according to the third exemplary embodiment.

The media mismatch determination processing to be performed in step S2200 illustrated in FIG. 21 is described in detail below with reference to a flowchart illustrated in FIG. 22. In FIG. 22, portions similar to those illustrated in FIG. 8, which is the media mismatch determination processing according to the first exemplary embodiment, are denoted by the same symbols. Therefore, redundant description thereof will be avoided.

In step S2201, the CPU 212 determines whether the number of target print jobs to be subjected to the media mismatch determination processing is equal to or greater than 1. In this case, the target print job to be subjected to the media mismatch determination processing can be a print job selected by the user. Alternatively, the target print job to be subjected to the media mismatch determination processing can be each of all print jobs displayed on the hold job list 1502 illustrated in FIG. 15. If the determination result in step S2201 indicates that the number of target print jobs to be subjected to the media mismatch determination processing is equal to or greater than 1 (YES in step S2201), the CPU 212 performs an operation similar to that described in steps S802 to S805 illustrated in FIG. 8.

Further, in step S900 or step S1000, the CPU 212 performs the media mismatch determination processing when the sheet holding unit determination the method is "sheet type designation" or "sheet holding unit designation". Processing to be performed in step S900 or step S1000 is similar to the processing described in the first exemplary embodiment with reference to FIGS. 9 and 10. Therefore, redundant description thereof will be avoided. After the processing in step S900 or step S1000 is completed, the operation proceeds to step S2202. In step S2202, the CPU 212 stores the present time, as execution time of the media mismatch determination processing, in the HDD 209 in association with the job. Then, the operation returns to step S802.

Figure 23B:
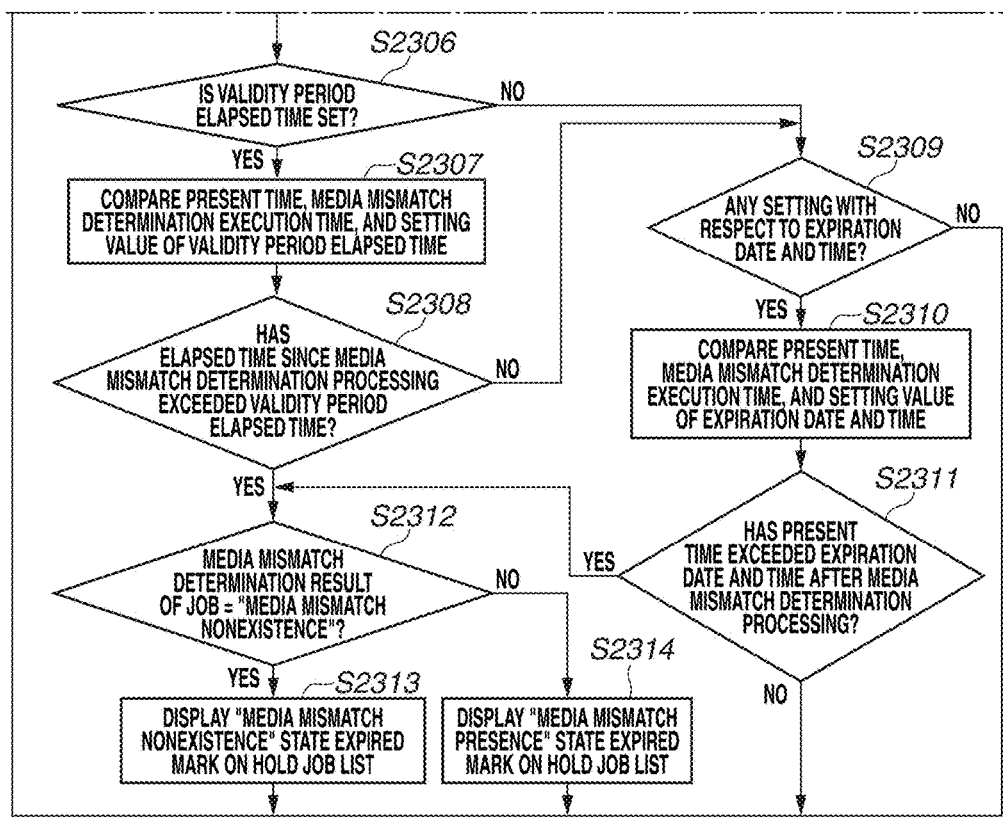
FIG. 23 (23A+23B) is a flowchart illustrating sequential processing relating to expiration determination with respect to the media mismatch determination result, which can be performed by the digital printing machine according to the third exemplary embodiment.

Sequential processing relating to the expiration determination with respect to the media mismatch determination result (to be performed based on validity period elapsed time setting and expiration date and time setting) according to the third exemplary embodiment is described in detail below with reference to a flowchart illustrated in FIG. 23. To attain the above-mentioned processing, the CPU 212 of the controller unit 205 executes the expiration date determination program that can be read from the ROM 207 or the HDD 209 and loaded into the RAM 208. The CPU 212 starts the processing to be performed according to the flowchart illustrated in FIG. 23 when a screen illustrated in FIG. 25 is displayed on the display section of the operation unit 204.

The job hold function operation screen illustrated in FIG. 25 to be displayed on the operation unit 204 is described in detail below.

First, in step S2301, the CPU 212 determines whether the job stacked in the hold queue buffer 531 illustrated in FIG. 5 is displayed on the hold job list 1502 illustrated in FIG. 25. If the determination result in step S2301 indicates that there is a job displayed on the hold job list 1502 (YES in step S2301), the operation proceeds to step S2302. On the other hand, if the determination result in step S2301 indicates that there is not any job displayed on the hold job list 1502 (NO in step S2301), the CPU 212 terminates the sequential processing relating to the expiration determination with respect to the media mismatch determination result.

In step S2302, the CPU 212 determines whether the expiration determination processing with respect to the media mismatch determination result has been completed for all jobs displayed on the hold job list 1502. If the determination result in step S2302 indicates that the expiration determination processing with respect to the media mismatch determination result has been completed for all jobs displayed on the hold job list 1502 (YES in step S2302), the CPU 212 terminates the sequential processing of the flowchart illustrated in FIG. 23. On the other hand, if the determination result in step S2302 indicates that the expiration determination processing with respect to the media mismatch determination result is not yet completed for all jobs displayed on the hold job list 1502 (NO in step S2302), the operation proceeds to step S2303. In step S2303, the CPU 212 selects one target job to be subjected to the expiration determination processing with respect to the media mismatch determination result, from the hold job list 1502. Then, the operation proceeds to step S2304. In step S2304, the CPU 212 determines whether the target job selected in step S2303 has been already subjected to the media mismatch determination processing. If the determination result in step S2304 indicates that the target job has been already subjected to the media mismatch determination processing (YES in step S2304), the operation proceeds to step S2305. On the other hand, if the determination result in step S2304 indicates that the target job is not yet subjected to the media mismatch determination processing (NO in step S2304), the operation returns to step S2302.

In step S2305, the CPU 212 determines whether the job selected in step S2303 is a job determined as having been already expired through the expiration determination processing with respect to the media mismatch determination result. If the determination result in step S2305 indicates that the target job is not yet expired (NO in step S2305), the operation proceeds to step S2306. On the other hand, if the determination result in step S2305 indicates that the target job is already expired (YES in step S2305), the operation returns to step S2302.

In step S2306, the CPU 212 determines whether the setting of the validity period elapsed time has been performed to discriminate whether the media mismatch determination result has been expired with reference to the elapsed time since the media mismatch determination processing performed using the time setting screen 2711.

Figure 27A:
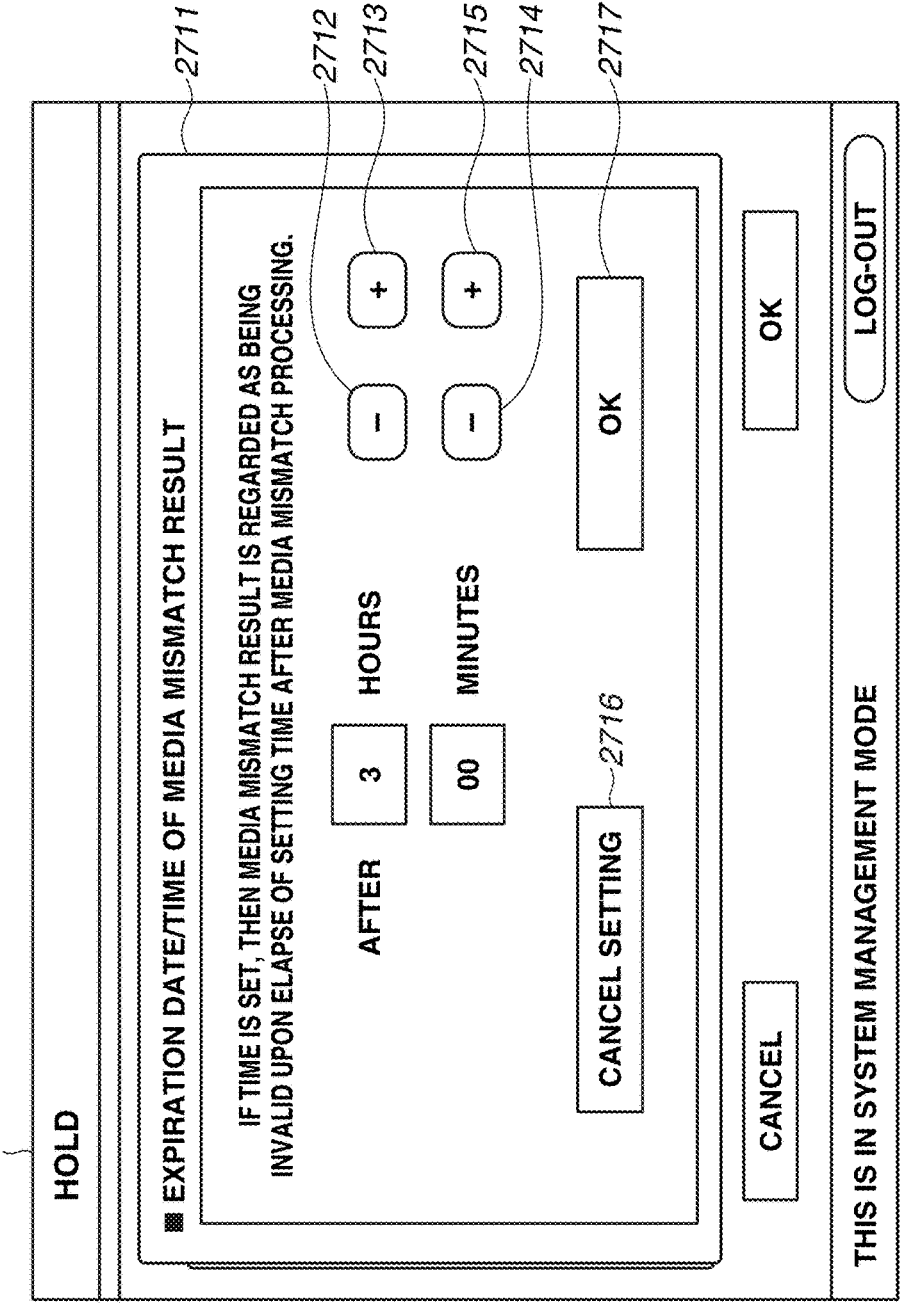

The time setting screen 2711 relating to the media mismatch determination result illustrated in FIG. 27A, which can be displayed on the operation unit 204, is described in detail below. If the determination result in step S2306 indicates that the setting of the validity period elapsed time has been performed (YES in step S2306), the operation proceeds to step S2307. On the other hand, if the determination result in step S2306 indicates that the setting of the validity period elapsed time has not been performed (NO in step S2306), the operation proceeds to step S2309. Processing to be performed in step S2309 is described in detail below.

In step S2307, the CPU 212 acquires the present time, the media mismatch determination execution time of the target job (i.e., the information stored in the HDD 209 in the above-mentioned step S2202), and the validity period elapsed time having been set using the time setting screen 2711, and compares the acquired values.

Then, the operation proceeds to step S2308. The CPU 212 determines whether a result of the comparison performed in step S2307 indicates that the elapsed time since the media mismatch determination of the target job has exceeded the validity period elapsed time. If the determination result in step S2308 indicates that the elapsed time since the media mismatch determination has exceeded the validity period elapsed time (YES in step S2308), the operation proceeds to step S2312. Processing to be performed in step S2312 is described in detail below.

On the other hand, if the determination result in step S2308 indicates that the elapsed time since the media mismatch determination has not exceeded the validity period elapsed time (NO in step S2308), the operation proceeds to step S2309.

In step S2309, the CPU 212 determines whether there is any setting with respect to the expiration date and time, to discriminate whether the media mismatch determination result has been expired when a predetermined time comes after the completion of the media mismatch determination processing using a time setting screen 2721 illustrated in FIG. 27B. The time setting screen 2721 relating to the media mismatch determination result (i.e., the screen illustrated in FIG. 27B), which can be displayed on the operation unit 204, is described in detail below.

If the determination result in step S2309 indicates that there is the setting about the expiration date and time (YES in step S2309), the operation proceeds to step S2310. On the other hand, if the determination result in step S2306 indicates that there is not any setting relating to the expiration date and time (NO in step S2309), the operation returns to step S2302.

In step S2310, the CPU 212 acquires the present time, the media mismatch determination execution time of the target job (i.e., the information stored in the HDD 209 in step S2202 illustrated in FIG. 22), and the expiration date and time having been set using the time setting screen 2721 described below, and compares the acquired values.

Then, the operation proceeds to step S2311. The CPU 212 determines whether the present time has exceeded the expiration date and time, after the media mismatch determination processing performed on the target job, with reference to a comparison result in step S2310. If the determination result in step S2311 indicates that the present time has exceeded the expiration date and time (YES in step S2311), the operation proceeds to step S2312. On the other hand, if the determination result in step S2311 indicates that the present time does not yet exceed the expiration date and time (NO in step S2309), the operation returns to step S2302.

In step S2312, the CPU 212 determines whether the media mismatch determination result of the target job is "media mismatch nonexistence". More specifically, the "media mismatch nonexistence" state indicates that the value of the sheet type inconsistency determination flag is "false (match)" and the value of the sheet remaining amount determination flag is "false (remaining amount is not zero)", in all sheet types to be used in the target job. Further, none of the inconsistency warning mark 1806 and the sheet remaining amount zero mark 1805 is displayed for each job being in the "media mismatch nonexistence" state on the hold job list 1502.

If the determination result in step S2312 indicates that the media mismatch determination result of the target job is "media mismatch nonexistence" (YES in step S2312), the operation proceeds to step S2313. On the other hand, if the determination result in step S2312 indicates that the media mismatch determination result of the target job is "media mismatch presence" (NO in step S2312), the operation proceeds to step S2314. In this case, either the inconsistency warning mark 1806 or the sheet remaining amount zero mark 1805 is displayed for each job being in the "media mismatch presence" state on the hold job list 1502.

In step S2313, the CPU 212 regards the media mismatch determination result as being expired and displays a "media mismatch nonexistence" state expiration mark 2501 in association with the target job on the hold job list 1502 as illustrated in FIG. 25. Then, the operation returns to step S2302. The job suffixed with the "media mismatch nonexistence" state expiration mark 2501 is a job having been once determined as being not in the media mismatch state though the media mismatch determination processing. If predetermined conditions described below are subsequently satisfied, it indicates that the reliability of the job is low because the validity of the media mismatch determination result has been expired.

On the other hand, in step S2314, the CPU 212 regards the media mismatch determination result of the target job as been expired. Then, the CPU 212 displays a "media mismatch presence" state expiration mark 2502 on the hold job list 1502, instead of displaying the inconsistency warning mark 1806 or the sheet remaining amount zero mark 1805 in association with the target job as illustrated in FIG. 25. Then, the operation returns to step S2302. The job suffixed with the "media mismatch presence" state expiration mark 2502 is a job having been once determined as being in the media mismatch state through the media mismatch determination processing. If predetermined conditions described below are subsequently satisfied, it indicates that the reliability of the job is low because the validity of the media mismatch determination result has been expired.

Figure 24:
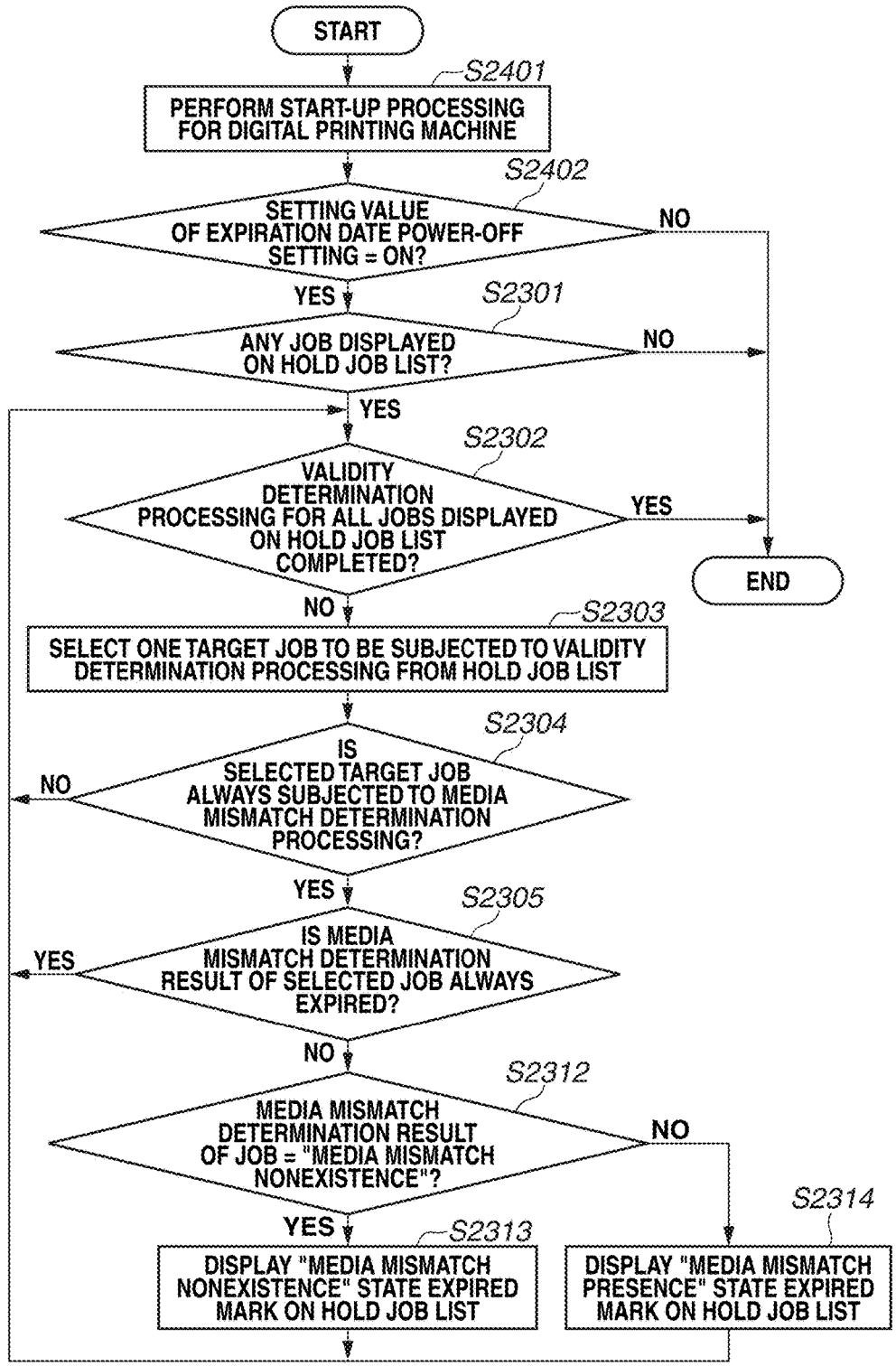
FIG. 24 is a flowchart illustrating sequential processing relating to expiration determination with respect to the media mismatch determination result, which can be performed by the digital printing machine according to the third exemplary embodiment.

Sequential processing relating to an expiration determination with respect to the media mismatch determination result (which can be performed based on an expiration date power-off setting) according to the third exemplary embodiment is described in detail below with reference to a flowchart illustrated in FIG. 24. To attain the above-mentioned processing, the CPU 212 of the controller unit 205 executes the expiration date determination program that can be read from the ROM 207 or the HDD 209 and loaded into the RAM 208. However, the CPU 212 starts the processing illustrated in FIG. 24 in response to a reception of a request to bring the digital printing machine 102 into a power source ON state from a power source OFF state. In FIG. 24, portions similar to those illustrated in FIG. 23 are denoted by the same symbols. Therefore, redundant description thereof will be avoided.

First, in step S2401, the CPU 212 performs start-up processing for the digital printing machine 102 in response to the request to bring the digital printing machine 102 into the power source ON state from the power source OFF state. Then, the operation proceeds to step S2402. In step S2402, the CPU 212 determines whether a setting to discriminate the media mismatch determination result as being expired, if the power source is turned off after the completion of the media mismatch determination processing, on the power-off setting screen 2731 illustrated in FIG. 27. The power-off setting screen 2731 relating to the media mismatch determination result illustrated in FIG. 27C, which can be displayed on the operation unit 204, is described in detail below.

If the determination result in step S2402 indicates that the expiration date power-off setting is set to ON (YES in step S2402), the operation proceeds to step S2301. On the other hand, if the determination result in step S2402 indicates that the expiration date power-off setting is set to OFF (NO in step S2402), the CPU 212 terminates the sequential processing relating to the expiration determination with respect to the media mismatch determination result. Processing to be performed in step S2301 and subsequent steps is similar to the processing of the flowchart illustrated in FIG. 23. Therefore, redundant description thereof will be avoided. If the determination result in step S2305 indicates that the media mismatch determination result of the target job is not expired, the CPU 212 performs the processing in step S2312 and subsequent steps. Therefore, as a result, the CPU 212 regards each media mismatch determination completed job displayed on the hold job list 1502 as being expired, together with all the jobs that are already expired.

An example of the job hold function operation screen that can be displayed on the operation unit 204, in the digital printing machine 102 according to the third exemplary embodiment, is described in detail below with reference to FIG. 25. In FIG. 25, portions similar to those illustrated in FIG. 15 are denoted by the same symbols. FIG. 25 illustrates an example of the job hold function operation screen that can be displayed immediately after the hold function selection button 1402 is pressed on the main screen illustrated in FIG. 14. As illustrated in FIG. 25, the sheet remaining amount zero mark 1805 and the inconsistency warning mark 1806 (i.e., the above-mentioned marks) are initially displayed for respective entries of the job list displayed on the job hold function operation screen. Further, the "media mismatch nonexistence" state expiration mark 2501 and the "media mismatch presence" state expiration mark 2502 are initially displayed.

In FIG. 25, the setting change button 2503 is a button that is operable to instruct to change the screen to perform media mismatch function related setting. If an instruction is received via the above-mentioned button, the instruction is transmitted to the CPU 212 via the operation unit I/F 202. Then, the CPU 212 changes the screen to be displayed on the operation unit 204 to the expiration date setting screen 2601 relating to the media mismatch determination result illustrated in FIG. 26.

The expiration date setting screen 2601 is a screen that can be used to set a predetermined condition to discriminate a media mismatch determination result as being expired. The expiration date setting screen 2601 includes an elapsed time setting button 2602, a time setting button 2603, and a power-off setting button 2604.

The elapsed time setting button 2602 is a button that is operable to perform setting to discriminate the media mismatch determination result as being expired with reference to the time elapsed since the media mismatch determination processing. If a user instruction is received via the elapsed time setting button 2602 of the expiration date setting screen 2601, the CPU 212 changes the screen to be displayed on the operation unit 204 to the time setting screen 2711 illustrated in FIG. 27A. The time having been set via the time setting screen 2711 is displayed at a position adjacent to the above-mentioned elapsed time setting button 2602. More specifically, if the time having been set via the time setting screen 2711 elapses after the completion of the media mismatch determination processing, the "media mismatch nonexistence" state expiration mark 2501 or the "media mismatch presence" state expiration mark 2502 is displayed as illustrated in FIG. 25. Therefore, it becomes feasible to discriminate a job that is less reliable because of expiration of the media mismatch determination result from a job suffixed with an ordinary mark.

On the other hand, the time setting button 2603 is a button that is operable to perform a setting to discriminate the media mismatch determination result as being expired when a predetermined time comes after the completion of the media mismatch determination processing. If a user instruction is received via the time setting button 2603 on the expiration date setting screen 2601, the CPU 212 changes the screen to be displayed on the operation unit 204 to the time setting screen 2721 illustrated in FIG. 27B. The time having been set via the time setting screen 2721 is displayed at a position adjacent to the above-mentioned time setting button 2603. More specifically, the "media mismatch nonexistence" state expiration mark 2501 or the "media mismatch presence" state expiration mark 2502 is displayed when the time having been set via the time setting screen 2721 has elapsed after the completion of the media mismatch determination processing, as illustrated in FIG. 25. Therefore, it becomes feasible to discriminate a job that is less reliable because of expiration of the media mismatch determination result from a job suffixed with an ordinary mark.

Further, the power-off setting button 2604 is a button that is operable to perform a setting to discriminate the media mismatch determination result as being expired when the power source of the digital printing machine 102 is turned off after the completion of the media mismatch determination processing. If a user instruction is received via the power-off setting button 2604 on the expiration date setting screen 2601, the CPU 212 changes the screen to be displayed on the operation unit 204 to the power-off setting screen 2731 illustrated in FIG. 27C. In this case, "ON" or "OFF" being set via the power-off setting screen 2731 is displayed at a position adjacent to the above-mentioned power-off setting button 2604. More specifically, after the completion of the media mismatch determination processing in a state that "ON" is being set, if the power source is first set to the "OFF" state and then returned to the "ON" state, the "media mismatch nonexistence" state expiration mark 2501 or the "media mismatch presence" state expiration mark 2502 is displayed as illustrated in FIG. 25. Therefore, it becomes feasible to discriminate a job that is less reliable because of expiration of the media mismatch determination result from a job suffixed with an ordinary mark.

A cancel button 2605 is a button that is operable to discard the setting conditions (e.g., elapsed time setting, time setting, and power-off setting) temporarily stored through the media mismatch determination result expiration date setting. If a user instruction is input via the cancel button 2605, the CPU 212 discards the expiration date setting condition and then the CPU 212 changes the screen to be displayed on the operation unit 204 to a job hold function operation screen 1501 (i.e., transition source).

On the other hand, an OK button 2606 is a button that is operable to record the setting conditions (e.g., elapsed time setting, time setting, and power-off setting) that are temporarily stored based on the expiration date setting of the media mismatch determination result. If a user instruction is input via the OK button 2606, the CPU 212 records the expiration date setting condition and then the CPU 212 changes the screen to be displayed on the operation unit 204 to the job hold function operation screen 1501 (i.e., transition source).

If the screen displayed on the operation unit 204 changes from the expiration date setting screen 2601 to another screen without receiving any instruction via the above-mentioned button (i.e., the cancel button 2605 and the OK button 2606), the CPU 212 discards the temporarily stored setting conditions (e.g., elapsed time setting, time setting, and power-off setting). However, if the presently displayed screen is a temporary screen (e.g., a screen saver screen) and the screen can subsequently return to the expiration date setting screen 2601, the CPU 212 does not discard the temporarily stored setting values.

The time setting screen 2711 is described in detail below with reference to FIG. 27A.

If a user instruction is received via a minus button 2712 and/or a plus button 2713 dedicated to hour value setting of the "elapsed time setting", the CPU 212 performs hour value setting with respect to the "elapsed time setting". If a user instruction is received via the minus button 2712, the CPU 212 temporarily reduces the hour value of the "elapsed time setting" and updates the currently displayed hour value of the "elapsed time setting". If a user instruction is received via the plus button 2713, the CPU 212 temporarily increases the hour value of the "elapsed time setting" and updates the currently displayed hour value of the "elapsed time setting". Further, in a state where the screen illustrated in FIG. 27A is displayed, if a user inputs a value via a numeric keypad (not illustrated) of the operation unit 204, the CPU 212 can set an hour value of the elapsed time setting and a minute value of the elapsed time setting. In this case, a settable maximum value is 23 hours for the hour value and a settable minimum value is 0 hour for the hour value. When the hour value of the elapsed time setting is 23, the plus button 2713 becomes non-selectable. On the other hand, when the hour value of the elapsed time setting is 0, the minus button 2712 becomes non-selectable.

If a user instruction is received via a minus button 2714 and/or a plus button 2715 dedicated to minute value setting of the "elapsed time setting", the CPU 212 performs minute value setting with respect to the "elapsed time setting". If a user instruction is received via the minus button 2714, the CPU 212 temporarily reduces the minute value of the "elapsed time setting" and updates the currently displayed minute value of the "elapsed time setting". If a user instruction is received via the plus button 2715, the CPU 212 temporarily increases the minute value of the "elapsed time setting" and updates the currently displayed minute value of the "elapsed time setting". In this case, a settable maximum value is 59 minutes for the minute value and a settable minimum value is 0 minute for the minute value. When the minimum value of the elapsed time setting is 59, the plus button 2715 becomes non-selectable. On the other hand, when the minute value of the elapsed time setting is 0, the minus button 2714 becomes non-selectable.

A setting cancel button 2716 is operable to cancel the elapsed time setting. If a user instruction is received via the setting cancel button 2716, the CPU 212 discards the temporarily stored elapsed time setting and stores a result that the elapsed time setting is not set. When the elapsed time setting is not set, the CPU 212 does not perform discrimination with respect to the expiration of the media mismatch determination result based on the elapsed time. After temporarily storing the result that the elapsed time setting is not set, the CPU 212 changes the screen to be displayed on the operation unit 204 to the expiration date setting screen 2601 relating to the media mismatch determination result illustrated in FIG. 26. At the same time, the CPU 212 changes a setting value displayed at a position adjacent to the elapsed time setting button 2602 to "no setting".

An OK button 2717 is operable to terminate the elapsed time setting. If a user instruction is received via the OK button 2717, the CPU 212 changes the screen to be displayed on the operation unit 204 to the expiration date setting screen 2601 relating to the media mismatch determination result illustrated in FIG. 26, while holding the temporarily stored elapsed time setting. At the same time, the CPU 212 changes the setting value displayed at a position adjacent to the elapsed time setting button 2602 to the temporarily stored elapsed time.

If the CPU 212 changes the screen of the operation unit 204 from the time setting screen 2711 to another screen without receiving any instruction via the setting cancel button 2716 or the OK button 2717, the CPU 212 discards the elapsed time setting temporarily stored on the time setting screen 2711. However, if the presently displayed screen is a temporary screen (e.g., the screen saver screen) and the screen can subsequently return to the time setting screen 2711, the CPU 212 does not discard the temporarily stored setting values.

The time setting screen 2721 is described in detail below with reference to FIG. 27B.

If a user instruction is received via a minus button 2722 and/or a plus button 2723 dedicated to hour value setting of the "time setting", the CPU 212 performs hour setting of the "time setting". If a user instruction is received via the minus button 2722, the CPU 212 temporarily reduces the hour value of the "time setting" and updates the currently displayed hour value of the "time setting". If a user instruction is received via the plus button 2723, the CPU 212 temporarily increases the hour value of the "time setting" and updates the currently displayed hour value of the "time setting". Further, in a state where the screen illustrated in FIG. 27B is displayed, if a user inputs a value via the numeric keypad (not illustrated) of the operation unit 204, the CPU 212 can set an hour value of the time setting and a minute value of the time setting. In this case, a settable maximum value is 23 hours for the hour value and a settable minimum value is 0 minute for the minute value. When the hour value of the time setting is 23, the plus button 2723 becomes non-selectable. On the other hand, when the hour value of the time setting is 0, the minus button 2722 becomes non-selectable.

If a user instruction is received via a minus button 2724 and/or a plus button 2725 dedicated to minute value setting of the "time setting", the CPU 212 performs minute value setting with respect to the "time setting". If a user instruction is received via the minus button 2724, the CPU 212 temporarily reduces the minute value of the "time setting" and updates the currently displayed minute value of the "time setting". If a user instruction is received via the plus button 2725, the CPU 212 temporarily increases the minute value of the "time setting" and updates the currently displayed minute value of the "time setting". In this case, a settable maximum value is 59 minutes for the minute value and a settable minimum value is 0 minute for the minute value. When the minute value of the time setting is 59, the plus button 2725 becomes non-selectable. On the other hand, when the minute value of the time setting is 0, the minus button 2724 becomes non-selectable.

A setting cancel button 2726 is operable to cancel the time setting. If a user instruction is received via the setting cancel button 2726, the CPU 212 discards the temporarily stored time setting and stores a result that the time setting is not set. When the time setting is not set, the CPU 212 does not perform discrimination with respect to the expiration of the media mismatch determination result based on the time. After temporarily storing the result that the time setting is not set, the CPU 212 changes the screen to be displayed on the operation unit 204 to the expiration date setting screen 2601 relating to the media mismatch determination result illustrated in FIG. 26. At the same time, the CPU 212 changes a setting value displayed at a position adjacent to the time setting button 2603 to "no setting".

An OK button 2727 is operable to terminate the time setting. If a user instruction is received via the OK button 2727, the CPU 212 changes the screen to be displayed on the operation unit 204 to the expiration date setting screen 2601 relating to the media mismatch determination result illustrated in FIG. 26, while holding the temporarily stored time setting. At the same time, the CPU 212 changes the setting value displayed at a position adjacent to the time setting button 2603 to the temporarily stored time.

If the CPU 212 changes the screen of the operation unit 204 from the time setting screen 2721 to another screen without receiving any instruction via the setting cancel button 2726 or the OK button 2727, the CPU 212 discards the temporarily stored time setting. However, if the presently displayed screen is a temporary screen (e.g., the screen saver screen) and the screen can subsequently return to the time setting screen 2721, the CPU 212 does not discard the temporarily stored setting values. In the above-mentioned exemplary embodiment, the number of settable time is only one. However, the screen can be configured to enable a user to set a plurality of time values at the same time.

The power-off setting screen 2731 is described in detail below with reference to FIG. 27C.

An OFF button 2732 dedicated to the expiration date power-off setting is operable to set the power-off setting to OFF and terminate the display of the power-off setting screen 2731. If a user instruction is received via the OFF button 2732, the CPU 212 temporarily stores a result indicating that the power-off setting is OFF and the CPU 212 changes the screen to be displayed on the operation unit 204 to the expiration date setting screen 2601 relating to the media mismatch determination result. At the same time, the CPU 212 changes the setting value displayed at a position adjacent to the power-off setting button 2604 to "OFF".

An ON button 2733 is operable to set the power-off setting to ON and terminate the display of the power-off setting screen 2731. If a user instruction is received via the ON button 2733, the CPU 212 temporarily stores a result indicating that the power-off setting is ON and the CPU 212 changes the screen to be displayed on the operation unit 204 to the expiration date setting screen 2601 relating to the media mismatch determination result illustrated in FIG. 26. At the same time, the CPU 212 changes the setting value displayed at a position adjacent to the power-off setting button 2604 to "ON".

As mentioned above, the system according to the third exemplary embodiment introduces the expiration date with respect to the media mismatch determination result of a job having been subjected to the media mismatch determination processing. More specifically, though the validity period elapsed time, the expiration date and time, and the expiration date power-off settings, the printing system performs expiration determination processing with respect to the media mismatch determination result. Thus, when a significant time has elapsed after the completion of the media mismatch determination processing, even if the printing system is operated by a different operator and the remaining amount of sheets stored in the sheet holding unit decreases, the user can discriminate a job whose validity has expired with respect to the media mismatch determination result. The user can operate the printing system to perform the media mismatch determination again on the low-reliable job whose validity has expired with respect to the media mismatch determination result. If an execution result of the media mismatch determination performed again indicates an occurrence of media mismatch, the user can perform the work capable of eliminating the media mismatch state. Through the above-mentioned work, the user can start printing in the "media mismatch nonexistence" state.

The printing system displays the expiration marks 2501 and 2502 in association with the entry of the low-reliable job whose validity has expired with respect to the media mismatch determination. However, the present exemplary embodiment can be modified in the following manner. For example, in response to the determination result indicating that the validity has expired with respect to the media mismatch determination, the operation of the printing system can proceed to the above-mentioned step S2200 of FIG. 21 to perform the media mismatch determination processing again. Further, when the printing system performs the media mismatch determination processing again, the operation proceeds to the above-mentioned step S1100 of FIG. 22 to update and notify the result of the media mismatch determination.

In the above-mentioned third exemplary embodiment, if each of the sheet remaining amount zero job and the sheet type inconsistency job is already expired with respect to the media mismatch determination result, as a result of the media mismatch determination, the printing system displays the "media mismatch presence" state expiration mark 2502. However, the present exemplary embodiment can be modified in the following manner. For example, it is also useful that the printing system displays different marks to discriminate the expiration of the sheet remaining amount zero job from the expiration of the sheet type inconsistency job. Further, to determine each of the validity period elapsed time and the expiration date and time, the printing system according to the present exemplary embodiment uses a value input by a user via the operation unit 204 of the printing apparatus, as illustrated in FIGS. 26 and 27. However, the present exemplary embodiment can be modified in the following manner. For example, it is also useful to use a value indicating the validity period elapsed time and a value indicating the expiration date and time that can be acquired from an external device. Further, the printing system allows a user to perform expiration date power-off setting via the operation unit 204 of the printing apparatus, as illustrated in FIGS. 26 and 27. For example, it is useful to perform the expiration date power-off setting via an external device.

In the above-mentioned third exemplary embodiment, the printing system displays a result of the media mismatch determination having been performed beforehand in such a way as to enable a user to discriminate the validity thereof based on the settings (e.g., the validity period elapsed time, the expiration date and time, and the expiration date power-off) having been set by a user. In this case, if the user confirms the above-mentioned expiration display, it is necessary to perform the media mismatch determination again before performing a job. However, the user will operate the printing apparatus to start the execution of the expired job if the user fails to confirm the above-mentioned expiration display.

Therefore, in addition to the processing described in the above-mentioned third exemplary embodiment, a printing system according to the fourth exemplary embodiment can additionally display a notification on the operation unit 204 to let a user know the necessity of confirmation if the user instructs executing the job determined as being expired. Further, the printing system according to the fourth exemplary embodiment can perform media mismatch determination processing in a lump only for expired jobs.

Similar to the printing system described in the first exemplary embodiment, a printing system according to the fourth exemplary embodiment is configured to include the digital printing machine 102 and the computer 101 that are connected via the network 100. Further, a functional block diagram illustrating a functional configuration of the digital printing machine 102 according to the fourth exemplary embodiment and a block diagram illustrating a configuration of the computer (PC) 101 according to the fourth exemplary embodiment are similar to those described in the first exemplary embodiment. Therefore, redundant description thereof will be avoided.

Figure 14:
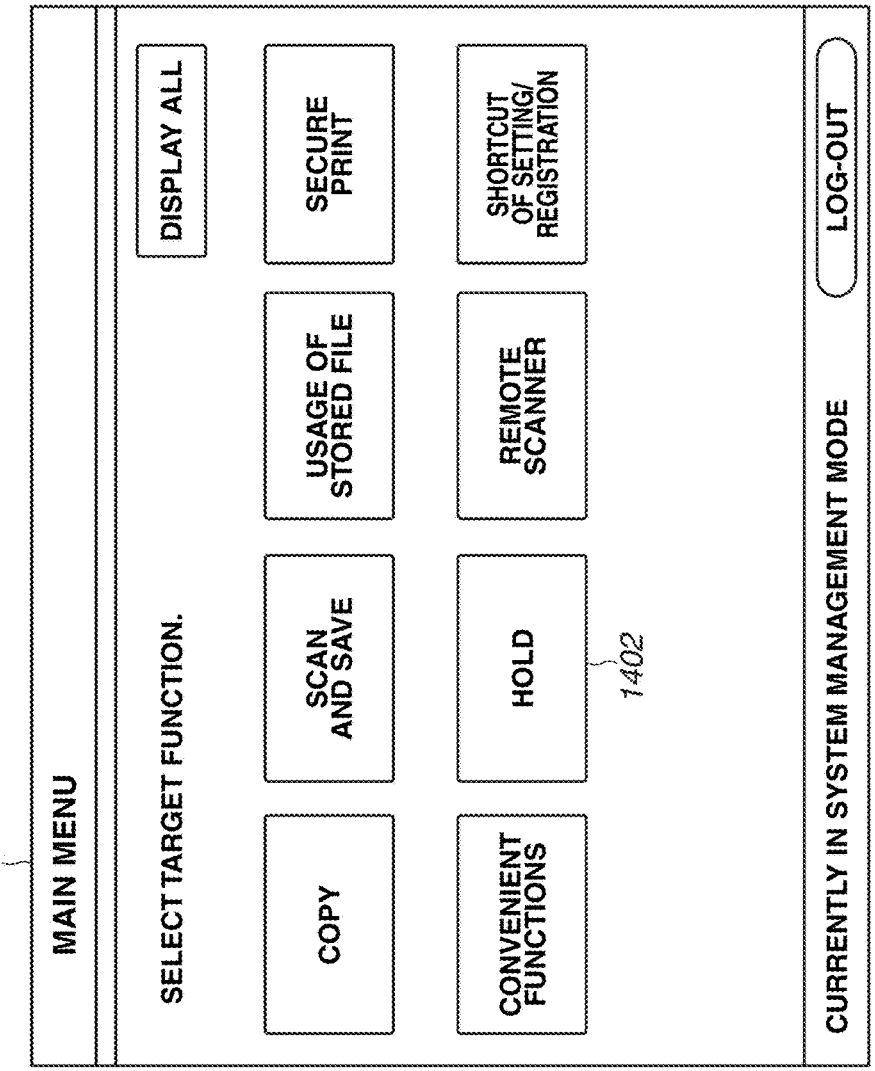
FIG. 14 illustrates an example of a main screen, which can be displayed on the operation unit of the digital printing machine, according to the first exemplary embodiment.

FIG. 28 illustrates an example state of the job hold function operation screen according to the fourth exemplary embodiment, which can be displayed immediately after a user presses the hold function selection button 1402, on the main screen illustrated in FIG. 14. In FIG. 28, portions similar to those illustrated in FIGS. 15 and 25 are denoted by the same symbols. As illustrated in FIG. 28, the sheet remaining amount zero mark 1805 and the inconsistency warning mark 1806 are initially displayed for each entry of a job list displayed on the job hold function operation screen. Further, the "media mismatch nonexistence" state expiration mark 2501 and the "media mismatch presence" state expiration mark 2502 are initially displayed on the job hold function operation screen.

In FIG. 28, a media mismatch redetermination button (i.e., recheck) 2801 is operable to perform media mismatch determination in a lump only for jobs determined as being expired with respect to the media mismatch determination result in the fourth exemplary embodiment. If a user instruction is received via the media mismatch redetermination button 2801, the CPU 212 extracts only jobs being expired with respect to the determination result from the jobs stacked in the hold queue buffer 531 and generates an expired job list 2902 illustrated in FIG. 29. The generated expired job list 2902 can be stored in the RAM 208. Then, the CPU 212 performs media mismatch determination processing again only for the jobs in the expired job list. However, in a case where the CPU and the memory of the printing apparatus are insufficient in their capabilities, it will take a great amount of time if the printing apparatus performs the media mismatch determination processing for many jobs. Therefore, it is useful that the CPU 212 extracts only the job being expired with respect to the media mismatch determination result, from the jobs displayed on the hold job list 1502, as the target to be subjected to the media mismatch determination processing again and generate the expired job list that includes the extracted jobs.

When a user selects a job from the hold job list 1502 and presses the print start button 1508 to instruct executing the job, an expired job may be included in the selected jobs. In such a case, the printing system according to the fourth exemplary embodiment displays a media mismatch determination result expiration warning screen 2901 illustrated in FIG. 29.

For example, it is presumed that a user selects "Job A", "Job C", and "Job E" from the hold job list 1502 illustrated in FIG. 28 and then presses the print start button 1508. In this case, it can be known that the "Job E" is already expired with respect to the media mismatch determination result because the "media mismatch presence" state expiration mark 2502 is attached to the "Job E". In such a case, the printing system displays the media mismatch determination result expiration warning screen 2901 illustrated in FIG. 29 and displays the expired job list 2902 in the expiration warning screen 2901. Information displayed in the expired job list 2902 includes a name of the job being expired with respect to the media mismatch determination result, a name of a user who has registered the job, a registration date of the job, and a mark indicating the state of the media mismatch determination result. In this case, the Job E suffixed with the "media mismatch presence" state expiration mark 2502 is displayed on the expired job list 2902.

An up arrow button 2903 and a down arrow button 2904 are buttons that are operable to instruct scrolling the expired job list 2902. The up arrow button 2903 cannot be operated in a state where the uppermost portion of the expired job list 2902 is displayed. On the other hand, the down arrow button 2904 cannot be operated in a state where the lowermost portion of the expired job list 2902 is displayed. If a user selects the up arrow button 2903 being in operable state, the printing system displays a page that precedes the page presently displayed on the expired job list 2902. If a user selects the down arrow button 2904, the printing system displays a page that follows the page presently displayed on the expired job list 2902.

A cancel button 2905 is a button that is operable to stop the print operation instructed via the print start button 1508. The printing system stops the print processing in response to the selection of the cancel button 2905.

A media mismatch redetermination button (recheck) 2906 is a button that is operable to perform the media mismatch determination processing again for all jobs displayed on the expired job list 2902. After performing the media mismatch redetermination, the printing system updates the media mismatch determination results of all jobs displayed on the expired job list 2902.

A printing execution button 2907 is a button that is operable to instruct starting printing of all print jobs instructed via the print start button 1508. If a user instruction is received via the printing execution button 2907, the printing system does not perform the media mismatch determination processing again.

As mentioned above, the printing system according to the fourth exemplary embodiment performs expiration determination with respect to the media mismatch determination result with reference to the validity period elapsed time, the expiration date and time, and the expiration date power-off settings. Then, the printing system generates the expired job list 2902 relating to the media mismatch determination result illustrated in FIG. 29. If an execution instruction is given to a job determined as being expired, the printing system causes the operation unit 204 to display the expired warning screen 2901 to let a user be careful. Therefore, the printing system can prevent the printing of the expired job from being automatically started even if the user erroneously presses the print start button 1508 for the expired job. In other words, the printing system can prevent a user from performing an erroneous operation. Further, the printing system can perform the media mismatch determination processing in a lump only for jobs determined as being expired with respect to the media mismatch determination result. Therefore, the printing system can simplify a user operation.

In the above-mentioned embodiments, i.e., in the first exemplary embodiment, the second exemplary embodiment, the third exemplary embodiment, and the fourth exemplary embodiment, the printing system displays any one of the inconsistency warning mark 1806 and the sheet remaining amount zero mark 1805 as illustrated in FIG. 18. However, a "sheet remaining amount zero" state in which the remaining amount of sheets stored in a sheet holding unit is zero and a "sheet type inconsistency" state in which the sheet to be used in the print job is not set in any one of the sheet holding units may occur at the same time. For example, it is presumed that a print job is scheduled to use a plurality of sheets and the selected print job designates a sheet A and a sheet B.

More specifically, it is presumed that the remaining amount of the sheet A is zero although there is a sheet holding unit to which the sheet A is set. Further, it is presumed that the sheet B is not set to any one of the sheet holding units. In this case, the sheet A can be determined as an object to be displayed together with the inconsistency warning mark 1806, as illustrated in FIG. 18. The sheet B can be determined as an object to be displayed together with the inconsistency warning mark 1806. However, according to the example illustrated in FIG. 18, it is difficult to confirm that the remaining amount of sheets B is zero in any one of the sheet holding units.

Similar to the printing systems described in the first exemplary embodiment, the second exemplary embodiment, the third exemplary embodiment, and the fourth exemplary embodiment, a printing system according to a fifth exemplary embodiment is configured to include the digital printing machine 102 and the computer 101 that are connected via the network 100. Further, a functional block diagram illustrating a functional configuration of the digital printing machine 102 according to the fifth exemplary embodiment and a block diagram illustrating a configuration of the computer (PC) 101 according to the fifth exemplary embodiment are similar to those described in the first exemplary embodiment. Therefore, redundant description thereof will be avoided.

FIG. 30 is a flowchart illustrating processing that can be performed by the printing system according to the fifth exemplary embodiment to notify a result of the media mismatch determination according to the fifth exemplary embodiment. To realize the above-mentioned processing, the CPU 212 of the controller unit 205 executes the UI function program that can be read from the ROM 207 or the HDD 209 and loaded into the RAM 208. In FIG. 30, portions similar to those of the flowchart illustrated in FIG. 11, which is the flowchart relating to the processing to notify a media mismatch determination result according to the first exemplary embodiment, are denoted by the same symbols. The flowchart illustrated in FIG. 30 is different from the flowchart illustrated in FIG. 30 in the following points. In FIG. 11, the CPU 212 terminates the media mismatch determination result notification processing after completing the display of the inconsistency mark in step S1103. On the other hand, in FIG. 30, the operation of the printing system proceeds to step S1104 after completing the display of the inconsistency warning mark 1806 in step S1103. If it is determined that the sheet remaining amount is zero (NO in step S1104), then in step S1105, the printing system displays the sheet remaining amount zero mark 1805. Therefore, as illustrated in FIG. 31, the printing system according to the present exemplary embodiment can display the inconsistency warning mark 1806 and the sheet remaining amount zero mark 1805 simultaneously for a print job that uses a plurality of sheet types.

In the digital printing machine 102 according to the fifth exemplary embodiment, an example of the job hold function operation screen that can be displayed on the operation unit 204 is described in detail below with reference to FIG. 31. In FIG. 31, portions similar to those illustrated FIG. 15 are denoted by the same symbols. Further, in FIG. 31, a behavior to be performed after completing the media mismatch determination in response to a pressing of the media mismatch determination button 1504 and constituent components of the screen are similar to those described in the first exemplary embodiment, the second exemplary embodiment, the third exemplary embodiment, and the fourth exemplary embodiment. Therefore, redundant description thereof will be avoided.

As illustrated in FIG. 31, both of the inconsistency warning mark 1806 and the sheet remaining amount zero mark 1805 are displayed at a portion corresponding to the Job D. Therefore, a user can discriminate the "sheet remaining amount zero" state where the remaining amount of sheets is zero although the sheet type is set to the sheet holding unit from the "sheet type inconsistency" state where the sheet type to be used in the print job is not set in any one of the sheet holding units state, for each of a plurality of sheet types to be used in one print job.

For example, if a user presses the details/change button 1507 in the state where the Job D is selected on the screen illustrated in FIG. 31, the printing system displays information about sheet size and media type (e.g., FIG. 17B) of the sheets to be used in the Job D. In this case, the operation unit 204 performs a display to let a user recognize the sheet type whose remaining amount is zero and blinks the display of a sheet holding unit to which the sheet is set. Further, the operation unit 204 reversely displays the sheet type that is not set in any one of the sheet holding units. Therefore, the printing system according to the present exemplary embodiment can notify each user of the sheet type whose remaining amount is zero, the related sheet holding unit, and the sheet type that is not set in any one of the sheet holding units, when it is used in the Job D.

In this case, the printing system reversely displays the information about the media that is not set in any one of the sheet holding units and blinks the display of information about sheets whose remaining amount is zero. However, the present exemplary embodiment is not limited to the above-mentioned examples. For example, it is useful to display the sheet remaining amount zero mark 1805 and the inconsistency warning mark 1806 in association with each other for individual sheet information.

As mentioned above, the printing system according to the fifth exemplary embodiment can notify a user of a result of the media mismatch determination, which indicates that the sheet to be used in a print job is not set to any one of the sheet holding units and that the corresponding sheet is not present in any one of the sheet holding units. Accordingly, the printing system according to the fifth exemplary embodiment has higher convenience for each user.

The features described in the fifth exemplary embodiment can be similarly applied to the "media mismatch presence" state expiration mark 2502 described in the third exemplary embodiment and the fourth exemplary embodiment. In the third exemplary embodiment and the fourth exemplary embodiment, it is also useful to display different marks to discriminate the expiration of a job determined as being zero with respect to the sheet remaining amount and the expiration of a job determined as being inconsistent with respect to the sheet type. Therefore, it is useful to display an expiration mark indicating a job determined as being zero with respect to the sheet remaining amount and an expiration mark indicating a job determined as being inconsistent in the sheet type in association with each job.

In the first exemplary embodiment, the second exemplary embodiment, the third exemplary embodiment, and the fourth exemplary embodiment, a target to be subjected to the media mismatch determination processing is only a print job that is selected from the hold job list 1502 illustrated in FIG. 15 and designated by pressing the media mismatch determination button 1504.

Further, in the first exemplary embodiment, the second exemplary embodiment, the third exemplary embodiment, and the fourth exemplary embodiment, the processing to update the media mismatch determination result by pressing the media mismatch determination button 1504 is limited to a print job selected by a user.

It is now assumed that the media mismatch determination has been performed and the print job is brought into a non-selected state after the inconsistency warning mark 1806 and the sheet remaining amount zero mark 1805 are displayed, as illustrated in FIG. 18. As another exemplary embodiment, it may be useful to maintain the display state of the inconsistency warning mark 1806 and the sheet remaining amount zero mark 1805 even after the above-mentioned operation has been completed.

Similar to the printing system described in the first exemplary embodiment, a printing system according to a sixth exemplary embodiment is configured to include the digital printing machine 102 and the computer 101 that are connected via the network 100. Further, a functional block diagram illustrating a functional configuration of the digital printing machine 102 according to the fourth exemplary embodiment and a block diagram illustrating a configuration of the computer (PC) 101 according to the fourth exemplary embodiment are similar to those described in the first exemplary embodiment. Therefore, redundant description thereof will be avoided.

A user performs various works using the job hold function operation screen illustrated in FIG. 15. However, in this case, the user may perform various operations through try and error in the process of the above-mentioned works. For example, the user may bring a print job being in the selected state into the non-selected state. Further, at a later timing, the user may perform an operation to bring the print job into the selected state again. If the above-mentioned convenience in the user operation is taken into consideration, the print job that has been selected by a user and subjected to the media mismatch determination corresponds to a candidate to be selected again at a later timing even if the print job is in the non-selected state. If the above-mentioned situation is taken into consideration, resetting the display of the inconsistency warning mark 1806 and the sheet remaining amount zero mark 1805 may not be useful when the print job being in the selected state is brought into the non-selected state. In such a case, it is believed that maintaining the display state of these warning marks 1805 and 1806 is desired.

Figure 32:
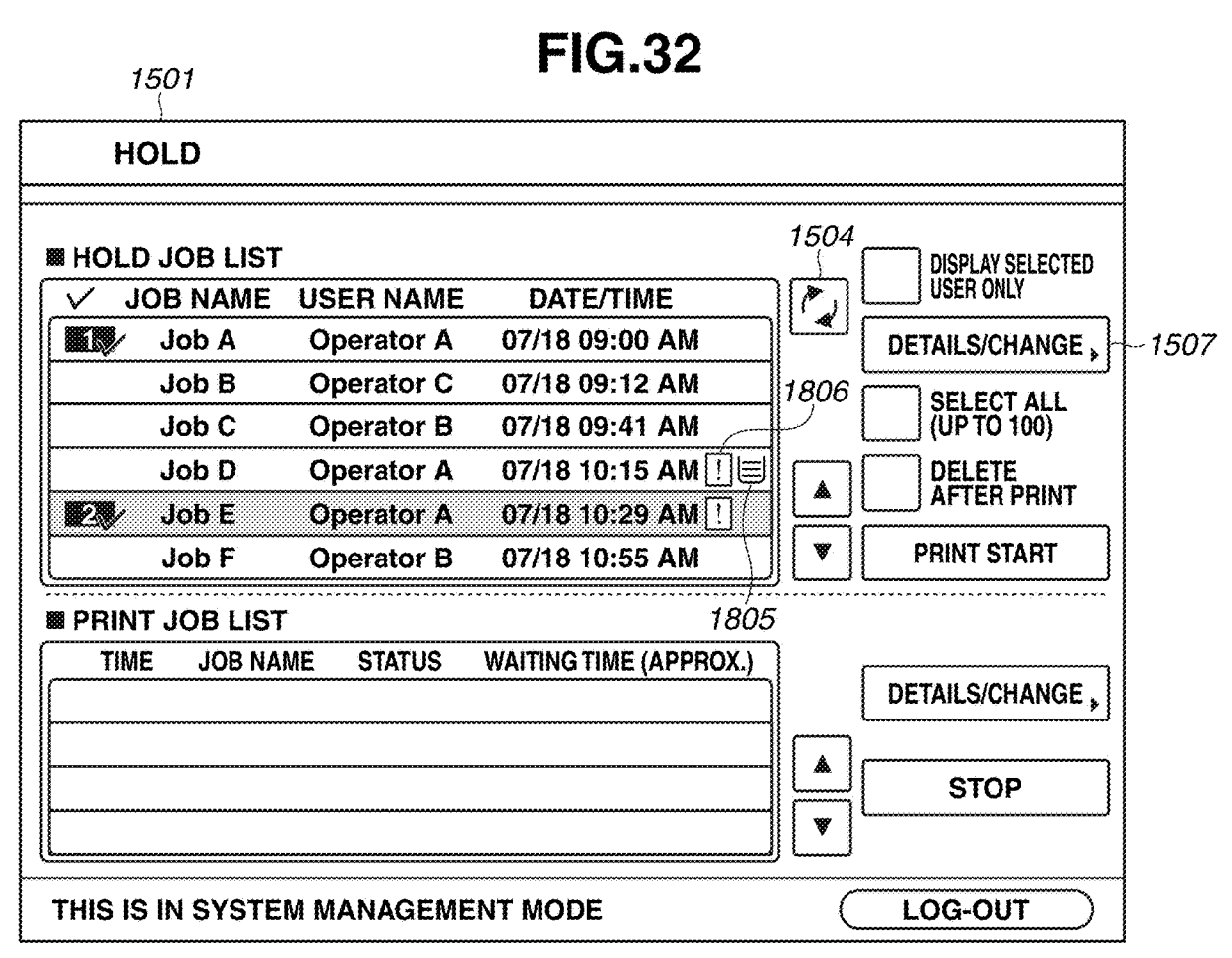

Accordingly, the printing system according to the sixth exemplary embodiment maintains the display state of the warning marks 1805 and 1806 indicating the media mismatch determination result even when the selected print job (i.e., Job D) is changed to the non-selected state, as illustrated in FIG. 32.

The features described in the sixth exemplary embodiment can be similarly applied to the "media mismatch nonexistence" state expiration mark 2501 or the "media mismatch presence" state expiration mark 2502 described in the third exemplary embodiment and the fourth exemplary embodiment. More specifically, it is now presumed that a user selects a job displayed together with the "media mismatch nonexistence" state expiration mark 2501 or the "media mismatch presence" state expiration mark 2502 and the selected job is later changed to the non-selected state. In this case, printing system according to the sixth exemplary embodiment maintains the display state of the "media mismatch nonexistence" state expiration mark 2501 or the "media mismatch presence" state expiration mark 2502.

Similar to the printing system described in the first exemplary embodiment, a printing system according to a seventh exemplary embodiment is configured to include the digital printing machine 102 and the computer 101 that are connected to each other via the network 100. Further, a functional block diagram illustrating a functional configuration of the digital printing machine 102 according to the seventh exemplary embodiment and a block diagram illustrating a configuration of the computer (PC) 101 according to the seventh exemplary embodiment are similar to those described in the first exemplary embodiment and the second exemplary embodiment. Therefore, redundant description thereof will be avoided.

In each of the above-mentioned exemplary embodiments, to indicate a result of the media mismatch determination, the inconsistency warning mark 1806 or the sheet remaining amount zero mark 1805 is displayed in association with each print job on the hold job list 1502 in FIG. 18 or a comparable figure. After the above-mentioned warning marks are displayed, their display states are maintained until the media mismatch determination button 1504 is pressed again to update them. It is feasible to acquire additional effects by storing the above-mentioned display state together with the print job and print settings stored in the hold queue buffer in a nonvolatile memory. More specifically, the printing system according to the present exemplary embodiment can store the result of the media mismatch determination permanently. Therefore, for example, even in a case where the power source of the digital printing machine 102 is once turned off and later turned on again, it is feasible to hold the result of the media mismatch determination performed before the power source is turned off when the power source is next turned on. Thus, the printing system according to the present exemplary embodiment can display the result of the media mismatch determination performed before the power source is turned off again on the hold job list 1502, when the power source is turned on, without pressing the media mismatch determination button 1504.

Therefore, for example, even when a user turns off the power source of the digital printing machine to interrupt a work and then turns on the power source again to restart the work, the user can easily confirm the continuation of the work.

In a case where the expiration date power-off setting is set to OFF on the power-off setting screen 2731 illustrated in FIG. 27C, as described in the third exemplary embodiment and the fourth exemplary embodiment, it is useful to apply the features described in the seventh exemplary embodiment similarly. More specifically, it is feasible to display the expiration date determination result (2501, 2502) of the media mismatch determination performed before the power source is turned off, on the hold job list 1502, when the power source is turned on, without pressing the media mismatch determination button 1504 again.

The present invention is not limited to the above-mentioned exemplary embodiments and can be modified in various ways (for example, by combining two or more exemplary embodiments) within the scope of the present invention. In this respect, the present invention encompasses every modification. For example, in the above-mentioned exemplary embodiments, in determining whether the remaining amount of sheets to be used in a print job is zero, the printing system uses the sensor to detect the "sheet remaining amount zero" state where the remaining amount of sheets accommodated in the sheet holding unit is zero. However, the above-mentioned exemplary embodiment can be modified in the following manner. For example, when the number of sheets stored in a sheet holding unit becomes equal to or less than a minimum limit level determined beforehand, it can be regarded that the sheet holding unit is in the "sheet remaining amount zero" state before the number of sheets actually stored in the sheet holding unit becomes zero.

Further, the control unit of the digital printing machine 102 is not limited to the CPU 212 that performs the above-mentioned various controls. For example, another printing control apparatus (e.g., an external controller provided in a casing separated from the digital printing machine 102) can be configured to execute a part or the whole of the above-mentioned various controls.

Although the present invention has been described based on various exemplary embodiments, the scope of the present invention is not limited to the disclosure of the described exemplary embodiments.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A printing apparatus having a plurality of sheet accommodating sections, the printing apparatus comprising:
a display device;
a storage device that stores sheet attribute information of sheets to be stored in the plurality of sheet accommodating sections; and
at least one processor that, by executing a set of instructions, causes the printing apparatus to perform processing including:
displaying on the display device a screen relating to a print job,
determining, based on the sheet attribute information stored in the storage device, whether there is a sheet accommodating section among the plurality of sheet accommodating sections for which sheet attribute information designated in the print job is registered,
notifying, to a user, a determination result by the determining,
receiving, from the user, a setting instruction for setting the sheet attribute information stored in the storage device, and
setting, according to the received setting instruction, the sheet attribute information stored in the storage device,
wherein the determining is performed at least in response to setting the sheet attribution information according to the received setting instruction.

2. The printing apparatus according to claim 1,
wherein the storage device further stores print jobs including the print job,
wherein, executing the set of instructions causes the printing apparatus to perform further processing including receiving, from the user, an execution instruction for executing the print job stored in the storage device,
wherein the screen is a screen that facilitates selection by the user of a print job that is to be executed from among the print jobs stored in the storage device, and
wherein the determining is performed before receiving the execution instruction.

3. The printing apparatus according to claim 1, wherein the sheet attribute information includes at least one of a sheet size, a sheet grammage, a sheet surface property, a sheet shape, and a sheet color.

4. A method for a printing apparatus having a plurality of sheet accommodating sections, a display device, and a storage device that stores sheet attribute information of sheets to be stored in the plurality of sheet accommodating sections, the method comprising:
displaying on the display device a screen relating to a print job;
determining, based on the sheet attribute information stored in the storage device, whether there is a sheet accommodating section among the plurality of sheet accommodating sections for which sheet attribute information designated in the print job is registered;
notifying, to a user, a determination result by the determining;
receiving, from the user, a setting instruction for setting the sheet attribute information stored in the storage device; and
setting, according to the received setting instruction, the sheet attribute information stored in the storage device,
wherein the determining is performed at least in response to setting the sheet attribution information according to the received setting instruction.

5. A non-transitory computer readable storage medium storing a program to cause a printing apparatus to perform a method, wherein the printing apparatus includes a plurality of sheet accommodating sections, a display device, and a storage device that stores sheet attribute information of sheets to be stored in the plurality of sheet accommodating sections, the method comprising:

displaying on the display device a screen relating to a print job;

determining, based on the sheet attribute information stored in the storage device, whether there is a sheet accommodating section among the plurality of sheet accommodating sections for which sheet attribute information designated in the print job is registered;

notifying, to a user, a determination result by the determining;

receiving, from the user, a setting instruction for setting the sheet attribute information stored in the storage device; and setting, according to the received setting instruction, the sheet attribute information stored in the storage device, wherein the determining is performed at least in response to setting the sheet attribution information according to the received setting instruction.

6. The printing apparatus according to claim 2, wherein the determining is performed for one or more print jobs selected by the user operation.

7. The printing apparatus according to claim 1, wherein a predetermined display item is displayed on the screen, and wherein the determining is performed also in response to receiving a user operation of selecting the predetermined display item.

* * * * *